(12) United States Patent
Korampally et al.

(10) Patent No.: US 8,859,050 B2
(45) Date of Patent: Oct. 14, 2014

(54) PATTERNING OF ULTRA-LOW REFRACTIVE INDEX HIGH SURFACE AREA NANOPARTICULATE FILMS

(75) Inventors: Venumadhav Korampally, Columbia, MO (US); Shubhra Gangopadhyay, Columbia, MO (US); Keshab Gangopadhyay, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 203 days.

(21) Appl. No.: 13/047,498

(22) Filed: Mar. 14, 2011

(65) Prior Publication Data

US 2012/0237677 A1    Sep. 20, 2012

(51) Int. Cl.
*B05D 3/00*     (2006.01)
*B82Y 40/00*    (2011.01)
*G02B 6/122*    (2006.01)
*B82Y 30/00*    (2011.01)

(52) U.S. Cl.
CPC ............... *G02B 6/1225* (2013.01); *B82Y 40/00* (2013.01); *B82Y 30/00* (2013.01); *Y10S 977/89* (2013.01)
USPC ........... 427/300; 427/245; 427/258; 427/261; 427/265; 427/299; 427/373; 977/890

(58) Field of Classification Search
None
See application file for complete search history.

(56) References Cited

U.S. PATENT DOCUMENTS

| | | | |
|---|---|---|---|
| 5,126,284 A * | 6/1992 | Curran | ............................... 438/3 |
| 5,504,042 A | 4/1996 | Cho et al. | |
| 6,204,202 B1 | 3/2001 | Leung et al. | |
| 6,271,273 B1 | 8/2001 | You et al. | |
| 7,169,584 B2 | 1/2007 | Ward et al. | |
| 7,276,224 B2 | 10/2007 | Zachariah et al. | |
| 7,307,343 B2 | 12/2007 | Kirner et al. | |
| 7,459,549 B2 | 12/2008 | Yim et al. | |
| 7,907,809 B2 | 3/2011 | Korampally et al. | |
| 2003/0006477 A1 | 1/2003 | Gallahger et al. | |
| 2003/0008244 A1 | 1/2003 | Khanarian et al. | |
| 2004/0249006 A1 | 12/2004 | Gleason et al. | |
| 2004/0253442 A1 | 12/2004 | Mubarekyan et al. | |
| 2005/0070124 A1 * | 3/2005 | Miller et al. | .................. 438/780 |
| 2005/0163924 A1 | 7/2005 | Anderson et al. | |

(Continued)

FOREIGN PATENT DOCUMENTS

| | | |
|---|---|---|
| EP | 0775669 | 5/1997 |
| WO | 2005055306 | 6/2005 |

OTHER PUBLICATIONS

Hozumi et al., Micropatterned Silica Films with Ordered Nanopores Fabricated through Photocalcination, Nano Letters, vol. 1 No. 8; pp. 395-399; Aug. 2001.*

(Continued)

*Primary Examiner* — Timothy Meeks
*Assistant Examiner* — Michael P Rodriguez
(74) *Attorney, Agent, or Firm* — Senniger Powers LLP

(57) ABSTRACT

A method for forming a nanoporous film pattern on a substrate comprising imparting differential surface energy to a surface of a substrate to define first areas having a first surface energy conducive to maintenance of a nanoporous film thereon and second areas having a second surface energy non-conducive to maintenance of a nanoporous film thereon, said first and second areas defining a differential surface energy pattern on the substrate; depositing a nanoporous film precursor onto the differential surface energy pattern; and curing the nanoporous film precursor to form the nanoporous film pattern.

21 Claims, 37 Drawing Sheets

(56) References Cited

U.S. PATENT DOCUMENTS

| | | | |
|---|---|---|---|
| 2006/0246273 | A1 | 11/2006 | McKeown et al. |
| 2007/0110671 | A1 | 5/2007 | Chamberlin et al. |
| 2007/0185263 | A1 | 8/2007 | Sakamoto et al. |
| 2007/0231559 | A1 | 10/2007 | Kim et al. |
| 2008/0063874 | A1 | 3/2008 | Rakow et al. |
| 2009/0269016 | A1* | 10/2009 | Korampally et al. ......... 385/129 |

OTHER PUBLICATIONS

Kim et al.; Photopatterned Nanoporous Media; Nano Letters; vol. 4 No. 7; pp. 1169-1174; Jul. 2004.*

C. R. Kagan et al., Patterning Organic-Inorganic Thin-Film Transistors using Microcontact Printed Templates, Applied Physics Letters, vol. 79 No. 21; pp. 3536-3538; Nov. 19, 2001.*

Korampally et al.; Entropy Driven Spontaneous Formation of Highly Porous Films from Polymer-Nanoparticle Composites; Nanotechnology 20 (2009); pp. 1-7.*

Kang et al.; Hierarchial Assembly of Nanoparticle Superstructures from Block Copolymer-Nanoparticle Composites; Physical Review Letters 100, 148303 (2008).*

Stoykovich et al.; Directed Assembly of Block Copolymer Blends into Nonregular Device-Oriented Structures; Science vol. 308, pp. 1442-1445; Jun. 2005.*

Memisevic et al., "Characterization of a Novel Ultra-Low Refractive Index Material for Biosensor Application", Sensors and Actuators B: Chemical, vol. 141, Issue 1, Aug. 18, 2009, pp. 227-232.

Koushik Biswas et al., "Nanoporous Organosilicate Films as Antireflection Coatings", Thin Solid Films, Elsevier Science, 2006, vol. 514, pp. 350-354.

Korampally et al., "Entropy Driven Spontaneous Formation of Highly Porous Films from Polymer-nanoparticle Composites", Nanotechnology, vol. 20, No. 42, 2009, 7 pages.

Korampally et al., "A Novel Air/Nanoporous Dielectric Clad Optofluidic Waveguide System for Sensor Applications", University of Missouri-Columbia, <http://nemsmems.org/FrontPageLCW-MICROTAS2008.pdf>, 3 pages.

International Search Report, PCT/US09/34307, dated Apr. 13, 2009, 4 pages.

Written Opinion, PCT/US09/34307, dated Apr. 13, 2009, 9 pages.

* cited by examiner

PATTERNING OF ULTRA-LOW REFRACTIVE INDEX HIGH SURFACE AREA NANOPARTICULATE FILMS

BACKGROUND OF THE INVENTION

Nanoporous dielectric materials are gaining prominence in the recent years as they are finding applications in a wide range of fields including photonics, catalysis, semiconductor processing, biosensors and bioimaging. For example, because of their extremely low refractive index, these materials have been considered as a better and a cheaper alternative to Teflon AF in liquid core waveguide applications. In addition, the relatively large surface area associated with these materials could be efficiently utilized to serve as high density substrates for biomolecule immobilization. With decreasing feature sizes, new materials with ultra low dielectric constant are becoming an increasingly important requirement in the semiconductor industry at present to replace conventional silicon dioxide as the interconnect insulation material. Suitable materials with ultra low dielectric constant have to be obtained in order to minimize the RC interconnect delays.

Various methods have been proposed for the preparation of nanoporous dielectrics. Among the more common are the surfactant templating method for ordered porous structures (see, e.g., Y. Lu, R. Ganguli, C. A. Drewien, M. T. Anderson, C. J. Brinker, W. Gong, Y. Guo, H. Soyez, B. Dunn, M. H. Huang, and J. I. Zink, "Continuous formation of supported cubic and hexagonal mesoporous films by sol-gel dip-coating," *Nature*, vol. 389, pp. 364-368, 1997 and C. J. Brinker, Y. Lu, A. Sellinger, and H. Fan, "Evaporation-Induced Self-Assembly: Nanostructures Made Easy," *Advanced Materials*, vol. 11, pp. 579-585, 1999) and the porogen extraction method for random pore structures (see, e.g., B. Lee, Y.-H. Park, Y.-T. Hwang, W. Oh, J. Yoon, and M. Ree, "Ultralow-k nanoporous organosilicate dielectric films imprinted with dendritic spheres," *Nat Mater*, vol. 4, pp. 147-150, 2005 and M. Ree, J. Yoon, and K. Heo, "Imprinting well-controlled closed-nanopores in spin-on polymeric dielectric thin films," *Journal of Materials Chemistry*, vol. 16, pp. 685-697, 2006). In each of these methods, nanoporosity is introduced by forming a nanocomposite film of a thermally labile species (porogen) within an otherwise monolithic matrix material, followed by a high temperature heating step. Calcination of the porogen leaves behind nanopores in the monolithic matrix material thereby effectively decreasing the dielectric constant and refractive index of the film.

The formation of porous films by conventional porogen or surfactant templating approaches typically requires highly-controlled slow-curing processes to prevent pore collapse. For example, temperature must be closely controlled during heating, at curing, and then heating to volatilization. The formed films may suffer from large residual stresses during the cooling run which may initiate buckling and cracking in the films especially when thick films are desired for waveguide applications. See, e.g., W. Oh, T. J. Shin, M. Ree, M. Y. Jin, and K. Char, "Residual Stress Behavior in Methylsilsesquioxane-Based Dielectric Thin Films," *Molecular Crystals and Liquid Crystals*, vol. 371, pp. 397-402, 2001 and W. Oh and M. Ree, "Anisotropic Thermal Expansion Behavior of Thin Films of Polymethylsilsesquioxane, a Spin-on-Glass Dielectric for High-Performance Integrated Circuits," *Langmuir*, vol. 20, pp. 6932-6939, 2004. The versatility of these materials coupled with growing demand is driving researchers to rethink their fabrication methodology to achieve them in the most energy efficient and commercially attractive way.

Another technique of formation of nanoporous films is based on the deposition of nanoparticles through gas evaporation techniques. See, e.g., S. Nozaki, H. Ono, K. Uchida, H. Morisaki, N. Ito, and M. Yoshimaru, in *Interconnect Technology Conference, 2002. Proceedings of the IEEE 2002 International*, (2002).

Ultra large surface area (201 m$^2$/g) films have previously been reported. See, e.g., T. Miki, K. Nishizawa, K. Suzuki, and K. Kato, "Preparation of nanoporous TiO$_2$ film with large surface area using aqueous sol with trehalose," *Materials Letters*, vol. 58, pp. 2751-2753, 2004 and M. R. Mohammadi, M. C. Cordero-Cabrera, D. J. Fray, and M. Ghorbani, "Preparation of high surface area titania (TiO$_2$) films and powders using particulate sol-gel route aided by polymeric fugitive agents," *Sensors and Actuators B: Chemical*, vol. 120, pp. 86-95, 2006. The surfaces of these ultra large surface area films, however, tend to be relatively hydrophilic and relatively rough.

Ultra large surface areas have also been reported for porous carbon based materials. These materials, however, are generally not transparent or smooth.

Surface area values for silica aerogels have been reported to be 750-1100 m$^2$/g. See, e.g., B. Zhou, J. Shen, Y. Wu, G. Wu, and X. Ni, "Hydrophobic silica aerogels derived from polyethoxydisiloxane and perfluoroalkylsilane," *Materials Science and Engineering: C*, vol. 27, pp. 1291-1294, 2007 and L. L. Aranda, "Silica aerogel," *Potentials, IEEE*, vol. 20, pp. 12-15, 2001. Preparation of these aerogels, however, typically requires controlled supercritical drying, etc. Also, silica based aerogels tend to be relatively hydrophilic which results in a moisture absorption which may, in turn, lead to deterioration of the material. Post treatment is thus typically required to render these materials hydrophobic to minimize moisture absorption.

The formation of porous films by conventional porogen or surfactant templating approaches typically requires highly-controlled slow-curing processes to prevent pore collapse. The formed films may suffer from large residual stresses during the cooling run which may initiate buckling and cracking in the films. See, e.g., W. Oh, T. J. Shin, M. Ree, M. Y. Jin, and K. Char, "Residual Stress Behavior in Methylsilsesquioxane-Based Dielectric Thin Films," *Molecular Crystals and Liquid Crystals*, vol. 371, pp. 397-402, 2001 and W. Oh and M. Ree, "Anisotropic Thermal Expansion Behavior of Thin Films of Polymethylsilsesquioxane, a Spin-on-Glass Dielectric for High-Performance Integrated Circuits," *Langmuir*, vol. 20, pp. 6932-6939, 2004.

To achieve seamless integration of nanoporous thin films in a miniaturized format, it is important to be able to generate microscale patterns of these materials, while preserving their unique properties. For example, high density microarrays of such films can enable massive multiplexing and low cost fabrication per chip for the development of biological assays and sensors. Significant cost reduction can be achieved through simpler patterning processes for extant back end integration schemes currently practiced in the semiconductor industry.

Patterning nanoporous thin films presents a formidable challenge. The high surface areas typically associated with these materials together with accessible porosities, especially for films with porosities >50%, precludes the use of standard lithographic techniques. Standard photolithography followed by wet chemical/plasma etching significantly damages these surfaces and causes loss of functionality, thereby requiring post repair of their damaged structures. Kim et. al., "Photo-patterned Nanoporous Media," Nano Lett., vol. 4, pp. 1169-1174 (2004), report a direct photo-patterning technique for nanoporous dielectrics through the use of a photosensitive acid generator, whereby selective crosslinking of PMSSQ can be achieved through UV exposure via a photomask.

SUMMARY OF THE INVENTION

Among the various aspects of the present invention, therefore, may be noted the provision of nanoporous films; the provision of films having one or more of the following characteristics: relatively high surface areas (at least 600 $m^2/g$; e.g., greater than about 1400 $m^2/g$), relatively low dielectric constant (e.g., less than 2), relatively low refractive index (e.g., less than 1.33), and relatively great thicknesses (e.g., at least 3 micrometers in a single coating); the provision of processes for the preparation of such films, processes which enable the preparation of such films relatively rapidly (e.g., in less than 10 minutes), and the provision of nanoparticles that may be derived from such films.

One aspect of the present invention is a nanoporous film comprising organosilica nanoparticles. The organosilica nanoparticles have a mean particle size of less than about 25 nanometers and a mean pore size of less than 10 nanometers, and the film has a surface area of at least 500 $m^2/g$.

Another aspect of the present invention is a composite comprising a nanoporous film on a substrate. The nanoporous film comprises nanoparticles having a mean particle size of less than about 25 nanometers and a mean pore size of less than 10 nanometers, and the film has a surface area of at least 500 $m^2/g$.

Another aspect of the present invention is a process for the preparation of a nanoporous film comprising nanoparticles, the process comprising forming a solution of a nanoparticle precursor in a mixed solvent system comprising a first solvent and a second solvent, wherein the first solvent is different from the second solvent, wherein the second solvent has a boiling point which is greater than a boiling point of the first solvent, and wherein the nanoparticle precursor has a greater solubility in the first solvent than in the second solvent; removing at least 50% of the first solvent; depositing the solution as a film onto a substrate; and calcining the deposited film at a temperature of at least 200° C. to remove the second solvent from the film to form a nanoporous, nanoparticulate film having a thickness of less than 3 microns, a surface area of at least 500 $m^2/g$, a refractive index of less than 1.33, a dielectric constant of less than 2, and a porosity of at least about 50% by volume.

In another aspect the invention is a waveguide comprising at least two spaced-apart opposed surfaces defining a channel therebetween; a waveguide inlet; a waveguide outlet; and a film on each of the two spaced-apart opposed surfaces wherein the film comprises organosilica nanoparticles having a mean particle size of less than about 25 nanometers and a mean pore size of less than 10 nanometers; wherein the film has a surface area of at least 500 $m^2/g$ and a porosity of at least about 50% by volume; the film has a thickness of less than about 3 microns; the film has a dielectric constant of less than 2; and the film has a refractive index of less than 1.33.

A further aspect of the invention is a method for forming a nanoporous film pattern on a substrate comprising imparting differential surface energy to a surface of a substrate to define first areas having a first surface energy conducive to maintenance of a nanoporous film thereon and second areas having a second surface energy non-conducive to maintenance of a nanoporous film thereon, said first and second areas defining a differential surface energy pattern on the substrate; depositing a nanoporous film precursor onto the differential surface energy pattern; and curing the nanoporous film precursor to form the nanoporous film pattern.

Other aspects, objects and features of the invention will be in part apparent and in part pointed out hereinafter.

DETAILED DESCRIPTION OF THE INVENTION

Figure 1:
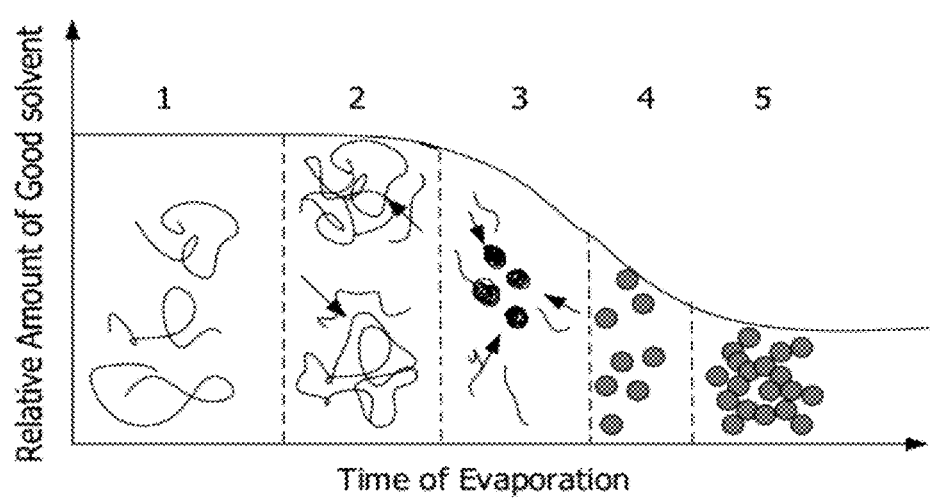
FIG. 1 is a schematic illustration of a proposed mechanism for the formation of a nanoparticulate dispersion.

In accordance with one aspect of the present invention, nanoporous films having a relatively high surface area may be prepared. These films are crack-resistant and may additionally be relatively hydrophobic, exhibit an ultra-low refractive index, and/or exhibit a low dielectric constant. Because the films are nanoparticulate, nanoparticles possessing unique properties may also be derived from such films. Consequently, films of the present invention potentially have a wide range of uses including, for example, microbiological applications, the microelectronics industry, and photonics.

Nanoporous Films

In general and as described in more detail below, nanoporous films of the present invention are prepared by steps including but not limited to forming a solution containing a nanoparticle precursor in a solvent system, subjecting the solution to a treatment which causes nanoparticles to form from the nanoparticle precursor, depositing the solution onto a substrate, and curing the deposited solution to form a film. The invention employs a liquid dispersion of a nanoparticle precursor from which discrete nanoparticles are formed and a porogen in a solvent system. Other optional additives include, for example, active pharmaceutical agents, proteins, peptides, nucleic acids, antibodies and other biologicals, metals or fluorescent dyes to tailor the films or nanoparticles derived therefrom for use in microelectronic or bioprobe applications.

In general, the nanoparticle precursor may be any of a range of organic and inorganic solids. In one embodiment, for example, the nanoparticle precursor comprises an organo metal (or semi-metal) such as aluminum, titanium, or silicon. Exemplary organotitanium compositions include titanium (IV) isopropoxide, titanium tetraisopropoxide and methyltitaniumtriisopropoxide. Examplary organoaluminum compositions include aluminum n-butoxide, aluminum d-butoxide, aluminum diisopropoxide ethyl acetoacetate, aluminum ethoxide, aluminum ethoxy ethoxy ethoxide, and aluminum isopropoxide.

In one preferred embodiment, the nanoparticle precursor is an organosilica material containing any of a range of materials including silicon, carbon, oxygen and hydrogen atoms known to those of ordinary skill. Exemplary organosilica materials include, but are not limited to, silsesquioxanes ($RSiO_{1.5}$ where R is an organic substituent), partially condensed halosilanes or alkoxysilanes such as partially condensed by controlled hydrolysis of tetraethoxysilane, organically modified silicates having the composition $RSiO_3$ or $R_2SiO_2$ wherein R is an organic substituent, and partially condensed orthosilicates having $Si(OR)_4$ as the monomer unit. Exemplary silsesquioxanes include alkyl silsesquioxanes such as methyl silsesquioxane, polymethylsilsesquioxane ("PMSSQ"), ethyl silsesquioxane, propyl silsesquioxane, butyl silsesquioxane and the like; aryl silsesquioxanes such as phenyl silsesquioxane and tolyl silsesquioxane; alkyl/aryl silsesquioxane mixtures such as a mixture of methyl silsesquioxane and phenyl silsesquioxane; and mixtures of alkyl silsesquioxanes such as methyl silsesquioxane and ethyl silsesquioxane. PMSSQ, for example, is available from Techneglas of Perrysburg, Ohio under the trade designation GR650F, which is in the form of colorless flakes.

In one embodiment, it is generally preferred that the organosilica material be a silsesquioxane, and more preferably hydrido silsesquioxane, methyl silsesquioxane, ethyl silsesquioxane, propyl silsesquioxane, iso-butyl silsesquioxane, tert-butyl silsesquioxane, phenyl silsesquioxane or mixtures thereof. For example, the silsesquioxanes may be present as a mixture including hydrido silsesquioxanes and alkyl, aryl or alkyl/aryl silsesquioxanes. Other exemplary silsesquioxanes include combinations of alkyl or aryl silsesquioxanes with tetra($C_1$-$C_6$)alkylorthosilicates such as tetraethylorthosilicate, or copolymers or composites thereof. In one embodiment, the silsesquioxane is hydrogen silsesquioxane or methyl silsesquioxane and preferably methylsilsesquioxane. In one preferred embodiment, the organosilica is polymethylsilsesquioxane. In one particularly preferred embodiment, the organosilica is polymethylsilsesquioxane having a hydroxy content of 0.5 to 20%, preferably about 2-14%.

Typically, the silsesquioxane(s) or other organosilica materials included in the liquid disperson have a number average molecular weight, $M_n$, of about 5,000 to about 20,000 daltons. For example, in one embodiment, the silsesquioxane(s) or other organosilica materials included in the liquid disperson have a molecular weight, $M_n$, of about 5,000 to about 15,000 daltons. By way of further example, in one embodiment, the organosilica material included in the liquid disperson is a silsesquioxane or mixture thereof having a molecular weight, $M_n$, of about 6,000 to about 9,000 daltons.

The organosilica (alone, or in combination with another nanoparticle precursor) is dispersed in a solvent system. In one embodiment, the solvent system comprises a mixture of miscible, but different solvents, referred to herein as a first solvent and a second solvent. The first solvent is a "good" solvent in the sense that the nanoparticle precursor is relatively more soluble in this first solvent than in the second solvent. In general, a range of solvents or mixtures of solvents may be employed. In one embodiment, the first solvent may be selected from alcohols, ketones, amides, esters, or combinations thereof. For example, one of the first solvents may be selected from relatively low boiling point solvents such as ethanol, 1-methoxy-2-propanol (propylene glycol monomethyl ether), tetrahydrofuran, acetone, 1,4-dioxane, 1,3-dioxolane, ethyl acetate, and methyl ethyl ketone. In other embodiments, one of the solvents may be selected from relatively high boiling point solvents such as dimethylformamide, dimethylacetamide, N-methylpyrrolidone, ethylene carbonate, propylene carbonate, glycerol and derivatives, naphthalene and substituted versions, acetic acid anyhydride, propionic acid and propionic acid anhydride, dimethyl sulfone, benzophenone, diphenyl sulfone, phenol, m-cresol, dimethyl sulfoxide, diphenyl ether, terphenyl, and the like.

In one embodiment, preferred solvents for use as the first solvent include propylene glycol propyl ether (PGPE), 3-heptanol, 2-methyl-1-pentanol, 5-methyl-2-hexanol, 3-hexanol, 2-heptano, 2-hexanol, 2,3-dimethyl-3-pentanol, propylene glycol methyl ether acetate (PGMEA), ethylene glycol n-butyl ether, propylene glycol n-butyl ether (PGBE), 1-butoxy-2-propanol, 2-methyl-3-pentanol, 2-methoxyethyl acetate, 2-butoxyethanol, 2-ethoxyethyl acetoacetate, 1-pentanol, and propylene glycol methyl ether. One particularly preferred first solvent for use in the solvent system is propylene glycol methyl ether acetate. Still further exemplary solvents include lactates, pyruvates, and diols. The solvents enumerated above may be used alone or in combination of two or more solvents; for example, the solvent may comprise one or more solvents with relatively low boiling points, i.e., boiling points below 160° C., one or more solvents with relatively high boiling points, i.e., boiling points above 160° C., or a mixture of one or more solvents with relatively low boiling points and relatively high boiling points.

To aid in the formation of the nanoparticulate nanoporous film, the liquid dispersion comprises a composition which is used to generate pores, sometimes referred to as a porogen. In many preferred embodiments, the second solvent (bad solvent) functions as the porogen, and is the same component as the second solvent (bad solvent). In general, the porogen has a molecular weight less than 1,500 Daltons. For example, the porogen may be a polymer having a molecular weight, $M_n$, of less than 1500 Daltons. In one embodiment, the porogen is a polymer having a molecular weight, $M_n$, of less than 1000. In one preferred embodiment, the porogen is a polymer having a molecular weight, $M_n$, of about 400 to about 700 Daltons. However, in the two-step process of the invention where the porogen is not incorporated until after formation of the nanoparticles, the molecular weight of the porogen is not important (may be as high as, e.g., 20,000), provided it decomposes at elevated temperatures.

In one preferred embodiment as noted above, the porogen may be considered to be a "bad" or "poor" solvent for the nanoparticle precursor. In this embodiment, and for ease of discussion, the porogen is referred to herein as the "second" or "bad" or "poor" solvent and the other solvent(s) of the solvent system in which the organosilica material (or other nanoparticle precursor(s)) has significantly greater solubility is referred to herein as the "first" or "good" solvent. In this embodiment, the first solvent can be selectively removed from the liquid dispersion by evaporation relative to the second solvent. As a result, when the solvent system is a mixed solvent system, initially containing both first and second solvents, the organosilica molecules are in a relatively uncoiled, i.e., an extended state. In a "good" solvent, the chains are extended and in a "poor" solvent on the other hand, the chain molecules assume a highly coiled (globule) form. See, e.g., Claudine Williams, Francoise Brochard, Harry. L Frisch, Ann. Rev. Phys. Chem. 32, 51 (1981), incorporated herein by reference. When, however, the first solvent is selectively removed from the mixed solvent system of the liquid dispersion, the organosilica molecules (or other nanoparticle precursor(s)) are induced into an increasingly coiled or compacted state to minimize their enthalpic interactions with the second solvent molecules which increase in relative concentration as the first solvent is selectively removed from the system. The dynamic equilibrium is thus shifted towards the formation of small nuclei by the selective removal of the first solvent. See, e.g., Hiroshi Yabu, Takeshi Higuchi, Kuniharu Ijiro, Masatsugu Shimomura, CHAOS 15, 047505, (2005), incorporated herein by reference.

In one embodiment, any of the aforementioned solvents having a boiling point greater than about 200° C. is chosen as the porogen (or "second" solvent). In another embodiment, the porogen is a decomposable polymer, many types of which are well known in the art. See, e.g., the examples of decomposable polymers identified in U.S. Pat. No. 5,895,263, the entire disclosure of which is incorporated herein by reference. In one preferred embodiment, the porogen is a polyol. For example, the polyol may be a monomeric polyol such as pentaerythritol, ethylene glycol or glycerin. Alternatively, and more preferably, the polyol is a polymeric polyol. Preferred polymeric polyols include polyester and polyether polyols. In one embodiment, the porogen is a linear or branched polymer selected from the group consisting of polyesters, polylactides, polystyrenes substituted polystyrenes, poly-alpha methylstyrene, substituted poly-alpha methyl polystyrenes, aliphatic polyolefins, polynorbornenes, polyacrylates, polymethacrylates, and polyethers. Not all porogens function as a second solvent. So there are situations where the porogen and the second solvent are the same element; and there are situations where the porogen and the second solvent are not the same element. Components which have been shown to function as both a porogen and a second solvent include PPG (MW-424), PEG (MW-300), PEG (MW-400). Exemplary polyethers include polyethylene oxide, poly(propylene glycol) and polytetrahydrofuran. Poly(propylene glycol), also known as polypropylene oxide, is particularly preferred.

In one embodiment, the liquid dispersion contains a substantial amount of the porogen relative to the organosilica material (and/or other nanoparticle precursor) and the first solvent. For example, the liquid dispersion will typically contain between about 30:70 and about 70:30 parts by weight of the porogen and the organosilica (and/or other nanoparticle precursor), respectively. In one preferred embodiment, the liquid dispersion will contain between about 40:60 and about 60:40 parts by weight of the porogen and the organosilica (and/or other nanoparticle precursor), respectively. By way of further example, in one embodiment the liquid dispersion contains between about 45:55 and about 55:45 parts by weight of the porogen and the organosilica (and/or other nanoparticle precursor), respectively. Similarly, the liquid dispersion will typically contain between about 10:90 and about 60:40 parts by weight of the porogen and first solvent, respectively. In one preferred embodiment, the liquid dispersion contains between about 20:80 and about 50:50 parts by weight of the porogen and first solvent, respectively. Viewed in combination, therefore, in one embodiment the liquid dispersion may contain about 25:25:50 parts by weight of the organosilica (and/or other nanoparticle precursor), the porogen and the first solvent, respectively.

In addition to the nanoparticle precursor, the porogen, and the solvent system, the liquid dispersion may optionally contain various additives to tailor the film (or particles to be derived therefrom) for particular end-uses. For example, the liquid dispersion may include fluorescent dyes to be incorporated into the film (or particles to be derived therefrom), active pharmaceutical agents, metal nanoparticles, nucleic acids, proteins, and peptides.

The liquid dispersions may be formed by merely combining the nanoparticle precursor, the porogen, the first solvent, and any other desired additives. In a preferred embodiment, however, the liquid dispersion is formed by combining two clear solutions, e.g., solution "A" and solution "B" wherein solution "A" contains the porogen and the first solvent in approximately equal parts by weight of each, and solution "B" contains the organosilica and the first solvent in approximately equal parts by weight. Regardless of the order of mixing, in one preferred embodiment the liquid dispersion initially contains about 10:40:50 to about 40:10:50 parts by weight of the organosilica, porogen, and first solvent, respectively. In addition, solution "A" or "B" or each may be sonicated to improve the rate of dissolution. What is formed is an overall solution of the precursor, porogen, and other components. This solution is then treated to cause the formation of nanoparticles as described more fully below.

After combining, the concentration of the first solvent in the resulting liquid dispersion is reduced by heating and/or evaporation. The liquid dispersion may be heated using microwaves or by conventional, e.g., thermal, heating apparatus such as an oven or hotplate. Regardless of the means employed, the liquid dispersion may be heated to reduce the concentration of the first solvent to, for example, 9:36:45 parts by weight of the nanoparticle precursor, first solvent, and second solvent, respectively. Selectival removal of the second solvent may also be carried out (or supplemented by) vacuum evaporation which typically occurs, at least to some extent, when the precursor solution is deposited on a substrate either by spin coating or dip coating. In one embodiment, therefore, the first solvent is selectively removed by heating the liquid dispersion. In another, the first solvent is selectively removed by reducing the atmospheric pressure over the liquid dispersion. In yet another, the liquid dispersion is heated and the atmospheric pressure is reduced to selectively remove the first solvent. As noted, selective removal of the first solvent is the preferred method of the invention; but there are circumstances and component combinations in which nanoparticle formation may also be observed by simply mixing the two solutions followed by film deposition (skipping the evaporation step). Advantageously, as the concentration of the first solvent decreases, the extent of formation of nanoparticles increases.

In a further alternative embodiment, the solvent system consists entirely of a solvent which functions as a porogen, i.e., it consists entirely of a second solvent in which the nanoparticle precursor particles are relatively insoluble. An example of this approach is PMSSQ precursor nanoparticles in PPG ($M_n$ 424) as the second solvent which also functions as porogen. This is the case when the first solvent is completely evaporated from the system as it happens during film deposition through spin coating or dip coating techniques.

Without being bound to a particular theory, FIG. 1 schematically illustrates the inventors' expected formation mechanism for the nanoparticles employed in the films of the invention. At the outset, as shown in the leftmost segment 1, the liquid dispersion is at e.g., 27° C. and contains random coils of the precursor such as organosilica, e.g., PMSSQ. As time passes, and the liquid dispersion is heated to e.g., 75° C. to evaporate the first solvent, the relative concentration of the second solvent is enriched which forces the precursor chains to assume a globule shape, intramolecular crosslinking is initiated as shown in segment 2 as the first solvent evaporates. This crosslinking continues during the evaporation step through segments 2, 3, and 4, still at 75° C. And as the solution is cooled to, e.g., 27° C. as shown in segment 5, eventually resulting in a sol-gel type of network.

In carrying out one embodiment of the invention to form the nanoparticles, therefore, the solution containing the precursor, first solvent, porogen, and other components is heated to a temperature at which the first solvent evaporates. This temperature is selected depending on the particular solvent system, and is, for example, at least about 0° C., for example, between about 0 and about 75° C. The solution is then held at that temperature for a period of time to achieve the desired evaporation, for example, up to about 30 minutes. In one preferred embodiment, where the precursor is polymethylsilsesquioxane (PMSSQ), the porogen is poly(propylene glycol) ($M_n$ 424), and the first solvent is propylene glycol methyl ether acetate (PGMEA), the liquid dispersion is heated to about 73° C. to remove 2-40% of the PGMEA initially present in the liquid dispersion. So in the preferred embodiment used herein for illustration, as time passes, and the liquid dispersion is heated to evaporate the PMGEA first solvent, the relative concentration of the PPG molecules get enriched forcing the PMSSQ chains to assume a compact globule shape to minimize the enthalpic interactions of the relatively hydrophobic PMSSQ chains with the relatively hydrophilic PPG chains. The precursor PMSSQ molecules further undergo intramolecular crosslinking as time passes. After cooling, the dispersion continues to increase in viscosity and eventually gels with time, e.g., in a period of 0.5-10 days at room temperature.

In general, the film-forming step of the invention is performed by depositing the liquid dispersion onto a substrate to form a film which coats the substrate. Exemplary substrates include, but are not limited to, ceramics, glass, metal, polymers, or even semiconductor materials such as single crystal silicon, polycrystalline silicon, amorphous silicon, silicon dioxide, silicon nitride, compound semiconductors such as gallium arsenide, and combinations thereof. The liquid dispersion may be applied onto the substrate via a variety of methods including, but not limited to, dipping, rolling, brushing, spraying, or spin coating. As a general proposition, the thickness of the deposited film at this point is from about 10 (e.g., 12) to several tens of nanometers, e.g., 50 nanometers, to several micrometers, e.g., 2 micrometers, 3 micrometers, or greater than 3 micrometers in a single deposition. During this deposition operation and/or in a subsequent lower temperature operation thereafter, all of the remaining proportion of the first solvent evaporates.

To obtain the desired nanoparticulate porous film, after deposition of the dispersion, the coated substrate is typically calcined at a temperature of at least about 200° C. to remove the porogen from the coating. In certain embodiments, the calcining step is conducted at two or more temperatures rather than as a controlled slow ramp or soak. The first temperature, typically 70° C., is to remove any first solvent remaining in the dispersion and to further crosslink the organosilica. In many embodiments, however, most or all of the first solvent is removed from the dispersion prior to film-forming and residual first solvent is removed during the spin-coating or other film-forming process. Advantageously, therefore, in these embodiments there is no need for a separate temperature hold at e.g. 70° C. or other allowance during the calcining operation for removal of the first solvent.

In one preferred embodiment, the coated substrate is calcined at a temperature of at least 300° C. In another preferred embodiment, the coated substrate is calcined at a temperature of at least 400° C. For example, the coated substrate is calcined at a temperature in the range of about 450° C. to about 600° C. Specific temperature and time durations for calcination vary depending upon the components of the dispersion, the substrate, and the desired pore volume. The calcination temperature of at least 200° C., 300° C., 400° C., e.g., about 450° C. to about 600° C. is to remove the porogen and to substantially, but not necessarily completely, crosslink the material. The calcining step is typically conducted for a time of about 30 minutes or less, preferably about 15 minutes or less, and more preferably about 6 minutes or less. A slow temperature ramp rate results in densification and loss of porosity; so it is preferred to expose the films instantaneously to the calcination temperature, for example using a pre-heated hot plate. In this way the films at a temperature and in an environment of, e.g., less than 100° C. are exposed instantaneously (e.g., in less than about 10 seconds) to the calcining temperature of at least 200° C., 300° C., 400° C., e.g., about 450° C. to about 600° C.

During calcination, the porogen such as PPG essentially decomposes and the expanding gases offer a great increase in the translational entropy to the PMSSQ particles. The nanoparticles suspended in the gaseous decomposition products of PPG are in a Brownian state of motion with an average kinetic energy of each particle being 3/2 kT. With the existence of a temperature gradient between the substrate and the ambient, the nanoparticles experience a net diffusion outward, away from the substrate. The increased internal energy of each individual nanoparticle results in their intra-particle crosslinking, while the random movement and collision between the particles results in their inter-particle crosslinking finally driving the system to equilibrium and resulting in a porous nanoparticulate film. For this reason, the porosity of the films is greatly dependent on the curing/calcination temperature. Accordingly, the calcination is specifically performed at a temperature beyond the decomposition temperature of the porogen, e.g., polymer such as PPG. An increase in system entropy above the decomposition temperature of the porogen provides a high degree of mobility to the nanoparticles. Calcination may be carried out via thermal methods such as a hot plate, oven, furnace or the like. For thermal methods, the curing of the coated substrate may be conducted under controlled conditions such as atmospheric pressure using nitrogen, inert gas, air, or other $N_2/O_2$ mixtures, vacuum, or reduced pressure having controlled oxygen concentration.

The system employed in the invention therefore consists of functional nanoparticles that can be thermally initiated to undergo interparticle as well as intraparticle crosslinking, dispersed in a thermally labile polymer layer. The behavior of this system depends on the calcining temperature, the temperature ramp rate, and the surface energy of the substrate it is deposited on. In accordance with this invention, thin films of PMSSQ nanoparticles dispersed in PPG result in the formation of porous films when they are deposited on, e.g., hydrogen-passivated silicon substrates and subjected to instant temperature gradients above the decomposition temperature of PPG. In contrast, at temperatures lower than the decomposition temperature of PPG and therefore lower than temperatures employed in this invention, PPG chains play an active role in maximizing the system entropy. Segregation of the nanoparticles takes place at these temperatures whereby the nanoparticles lose their translational entropy. This loss of translational entropy of the nanoparticles is however offset by the gain in the conformational entropy of PPG chains as there is a far greater entropic penalty imposed in stretching the PPG chains around the nanoparticles to maintain a uniform distribution. This results in the eventual expulsion of PPG from the film resulting in a dense film void of any pores. As a corollary, films subjected to slow temperature ramp rates to temperatures well above the decomposition temperature of PPG essentially result in non-porous films. Finally, these films when deposited on high surface energy substrates followed by the high temperature treatment step results in dense, non-porous films. For example, films deposited on freshly piranha cleaned glass substrates and subjected to the instantaneous high temperature curing/calcination step resulted in the formation of dense films void of any porosity. The enthalpic interactions between the nanoparticles and the substrate outweigh their translational entropy gain resulting in the segregation of the nanoparticles to the substrate and the eventual formation of non-porous dense films. Accordingly, to avoid the formation of dense films approaching non-porous, the present invention in a preferred embodiment employs a combination of a relatively high temperature, high temperature ramp rate, and lower surface energy substrate. A preferred surface energy of the substrate lies between 32 mJ/cm$^2$ and 48 mJ/cm$^2$. Films deposited on lower surface energy substrates (e.g., 28 mJ/cm$^2$) result in dewetting and formation of a discontinuous film.

Calcination of the coated substrate according to this invention therefore yields a composite of a nanoporous and nanoparticulate film on a substrate. Depending primarily upon the coating technique and the quantity and viscosity of the liquid dispersion deposited onto the substrate, the nanoporous film may have a thickness ranging from about 10 (e.g., 12) to several tens of nanometers, e.g., 50 nanometers, to several micrometers, e.g., 2 micrometers, 3 micrometers, or greater than 3 micrometers in a single deposition. Layers having a thickness significantly greater than 3 micrometers could, for example, be obtained by repeating the operation, i.e., depositing the liquid dispersion onto a substrate to form a coated substrate, calcining the coated substrate to obtain a composite of a nanoporous film on a substrate, and repeating this sequence of steps at least once to increase the thickness of the nanoporous film with each successive series of steps.

In one embodiment, these methods are used to prepare nanoporous films having pores having a mean size ranging from less than 1 nanometer to 15 nanometers, for example of less than 10 nm. Typically, the pores have a mean size of on the order of 4 nm with size distribution ranging from 0.8 to 10 nanometers. In addition, the film will have a high degree of porosity, e.g., at least 20% of the total volume of the film is pore volume. In one embodiment, the porosity is greater. For example, in one embodiment, the film has a porosity of at least 50%. By way of further example, in one embodiment, the film has a porosity of at least 70% by volume. All porosity values herein are by volume unless indicated otherwise. Pore sizes in these ranges are well below the wavelength of visible light making these films smooth and transparent in the visible range.

In general, as the porosity of the film increases, the surface area of the film increases and the refractive index of the film decreases, along with a decrease in mechanical strength. In accordance with one aspect of the present invention, nanoporous films having a refractive index of less than 1.33 such as less than 1.2 are obtained (as measured at a wavelength of 633 nm). In one preferred embodiment, the nanoporous film has a refractive index of less than 1.15. In another preferred embodiment, the nanoporous film has a refractive index of less than 1.10. Ultra low refractive index nanoporous films, i.e., films having refractive indices of 1.048-1.19 are thus obtainable in accordance with the present invention. Moreover, crack-free, relatively thick (at least 2 micrometers), ultra low refractive index nanoporous films may be obtained in a single coating. Relatedly, nanoporous films of the present invention may be characterized by a surface area of at least 600 $m^2/g$. In one embodiment, the nanoporous films have a surface area of at least 1200 $m^2/g$, and even greater than 1400 $m^2/g$.

The nanoporous films comprise nanoparticles, preferably organosilicate nanoparticles, with diameter sizes that are readily tunable by selection of liquid dispersion components and process conditions. The percentage OH content of the nanoparticle precursor as well as its molecular weight determines the nanoparticle size. For example, nanoparticles having diameters of as little as 2 nanometers or as great as 30 nanometers may be readily obtained. In addition, the nanoparticles may have a relatively narrow size distribution. For example, 30% by weight of the nanoparticles in the film may have a diameter in the range of 2-5 nanometers. By way of further example, 70% by weight of the nanoparticles in the film may have a diameter in the range of 6-10 nanometers. "Diameter" here loosely refers to the largest dimension across a particle because the particles are not strictly spherical.

As previously noted, one aspect of the present invention is nanoporous, nanoparticulate films having relatively low dielectric constants. In general, nanoporous, nanoparticulate films having a dielectric constant of less than 2 may be readily produced. Depending upon the application, nanoporous films having even lower dielectric constants may be desired. Thus, one aspect of the present invention is the preparation of nanoporous films having a dielectric constant of less than 1.8. For example, for some applications, it may be desired that the nanoporous, nanoparticulate film have a dielectric constant of less than 1.5. For other applications, it may be desired that the film have an even lower dielectric constant, e.g., 1.4. The nanoporous, nanoparticulate films of the present invention can be achieve these objectives.

In addition to the organosilica nanoparticles, the nanoporous, nanoparticulate film may include other components to tailor the film (or nanoparticles to be derived therefrom) for a microelectronic, microbiologic or other application. For example, the nanoporous, nanoparticulate film may include a mixture of dielectric materials such as two or more organosilica dielectric materials or a mixture of an organosilica dielectric matrix material with one or more other dielectric matrix materials (e.g., an inorganic material such as carbides, oxides, nitrides or oxyfluorides of silicon, boron, or aluminum; or non-organosilica organic materials such as benzocyclobutenes, poly(aryl esters), poly(ether ketones), polycarbonates, polyimides, fluorinated polyimides, polynorbornenes, poly(arylene ethers), polyaromatic hydrocarbons, such as polynaphthalene, polyquinoxalines, poly(perfluorinated hydrocarbons) such as poly(tetrafluoroethylene), and polybenzoxazoles. In general, it is preferred that when a mixture of an organosilica material and at least one other dielectric matrix material is used, the organosilica material is present as a predominant component. It is further preferred that the organosilica dielectric matrix material in such admixtures is methyl silsesquioxane, phenyl silsesquioxane or mixtures thereof.

Instead of, or in addition to, a plurality of dielectric materials, the nanoporous, nanoparticulate film may also contain a metal, a fluorescent composition, or other functional moiety (e.g., active pharmaceutical agents, proteins, peptides, nucleic acids, antibodies, and the like) to tailor the nanoporous film (or nanoparticles derived therefrom) for various end uses. Exemplary metals include gold, silver, platinum, palladium, iron and cobalt. Similarly, the fluorescent composition may be a fluorescent dye. The fluorescent dye may be short-lived or long-lived in fluorescent emission and further characterized by Stokes shift, and quantum yield. Fluorescein isothiocyanate represents a commonly used reactive fluorescent marker that is short-lived in emission, possesses a relatively narrow Stokes shift, and has a relatively high quantum yield. Rhodamine is another commonly used fluorescent dye, which emits at a longer wavelength than fluorescein. Lanthanide metal chelates represent a class of fluorescent compounds which possess a relatively large Stokes shift and are long-lived in fluorescent emission. This class of fluorescent molecules generally requires another strongly absorbing molecule to transfer the light energy to induce the strong fluorescence. Examples of lanthanide metals are terbium and europium which are commonly chelated by a polydentate chelate. Other examples of fluorescent compounds include napthalenes, pyrenes, coumarin derivatives, pyridyloxazole derivatives, and ruthenium complexes. As previously noted, these components may be conveniently incorporated into the nanoporous film by adding them to the liquid dispersion from which the nanoporous film is derived.

Depending upon the application, the nanoporous, nanoparticulate film may be relatively more hydrophilic, relatively more hydrophobic or intermediate of the two. In general, the degree of hydrophilicity may be determined by the contact angle of a droplet of water with contact angles of at least 90° generally being regarded as hydrophobic and contact angles of less than 90° generally being regarded as hydrophilic. The degree of hydrophilicity may be controlled, at least in part initially, by selection of organosilica materials. In general, those with greater hydroxyl content and less alkyl substitution tend to be more hydrophilic and those with less hydroxyl content and more alkyl substitution tend to be more hydrophobic. In addition, the nanoporous, nanoparticulate films may be rendered more hydrophilic by surface oxidation to introduce silanol groups. One such approach is by exposure to oxygen plasma. In one embodiment, therefore, a droplet of water on the nanoporous film will have a contact angle of less than 90°. For example, in one embodiment the contact angle may be less than 60°. In a further embodiment, the contact angle may be less than 30°. In a still further embodiment, the contact angle may be less than 20° such as, for example, 10°. A significant advantage in comparison to many prior art films is that the films of the invention can be made to be inherently hydrophobic. In many applications this can be critical to avoiding uptake of water during processing, handling, and storage. Moreover, hydrophilicity can be easily imparted to these hydrophobic films shortly prior to their incorporation into, for example, biological applications where hydrophilicity may be required.

Nanoparticles

In one aspect the present invention is directed to nanoparticles having diameters of as little as 2 nanometers or as great as 30 nanometers. The particles may be in form of nanorods, e.g., nanoparticles having a length to diameter (aspect ratio) of at least 2:1, or as particles having an aspect ratio in which the greatest dimension is less than twice the smallest dimension, such as roughly sphere-like shapes. Regardless of aspect ratio, the nanoparticles may have a relatively narrow size distribution. For example, 30% by weight of the nanoparticles may have a diameter in the range of 2-5 nanometers. By way of further example, 70% by weight of the nanoparticles may have a diameter in the range of 6-10 nanometers.

The nanoparticles may be derived from the nanoporous, nanoparticulate films of the present invention, by mechanically or acoustically fracturing the nanoporous, nanoparticulate film, for example, by scraping or sonication, or scraping followed by sonication in a suitable solvent.

Alternatively, nanoparticles may be obtained directly from the solution phase by precipitation, e.g., by addition of a solvent mixture of water and ethanol in the presence of suitable surfactants. Alternatively, the nanoparticles may be obtained by spray pyrolisis as described, for example, in U.S. Pat. No. 7,276,224. When organosilanes are used as the nanoparticle precursor, particle size may be controlled, in part, by treating the organosilane with a silane coupling agent, for example, trimethyl chlorosilane (TMCS), octadecyl trichlorosilane (OTS) or the like, which will reduce the degree of interparticle crosslinking.

In addition to obtaining hydrophobic nanoparticles directly from the nanoporous, nanoparticulate films through scraping, hydrophobic nanoparticles can be directly precipitated from the nanoparticulate precursor solution in bulk quantities. Nanoparticulate precursor solution is prepared as described above. The wt % of porogen such as PPG is kept at 50% with respect to the precursor such as PMSSQ, and, for example, PMA is chosen as the good solvent. In one embodiment, the precursor solution is heated at 70° C. for 20 minutes under stirring to allow the formed PMSSQ nanoparticles to crosslink.

In carrying out this direct formation method, the precursor solution (e.g., 1 mL) following the evaporation step is diluted (e.g., to 10 ml in ethanaol). The silane coupling agent (e.g., 150 microliter TMCS) is added dropwise to this solution and the solution is vortexed to facilitate uniform reaction of the coupling agent with the dispersed nanoparticles in the solution. The coupling agent is allowed to react with nanoparticles for a period of one hour during which the initially clear solution turns milky. TMCS basically reacts with the surface —OH groups present on the PMSSQ nanoparticles making them further hydrophobic resulting in their eventual precipitation from the ethanol. These nanoparticles can be recovered in the form of a gelatanious precipitate through centrifugation and decantation of the supernatant solution. The obtained nanoparticles are then dried using nitrogen flow and can be easily dispersed in any non-polar solvent like toluene, chloroform, etc. Using this approach bulk quantities of these nanoparticles can be obtained that can be easily dissolved in various non-polar solvents at relatively high loadings (50-60%). The particle size ranges, for example, from about 2 to about 5 nm, with a mean particle size of, for example, 3.5 nm.

The nanoparticles of the invention have a relatively large surface area. In general, the free-flowing nanoparticles have a surface area of at least 500 $m^2/g$. In one embodiment, the free-flowing nanoparticles have a surface area of at least 600 $m^2/g$. For example, the free-flowing nanoparticles may have a surface area of at least 1,000 $m^2/g$. In one preferred embodiment, the free-flowing nanoparticles have a surface area of about 500 to about 1700 $m^2/g$.

As previously described, the nanoporous films may contain various components to tailor the film for a microelectronic, microbiologic or other application. Because the free-flowing nanoparticles are obtained directly from the nanoporous, nanoparticulate film, the free-flowing nanoparticles may also contain any of the aforementioned metals, dielectrics, dyes, etc. to tailor the nanoparticles for use in a microelectronic, microbiologic or other application.

Liquid Core Waveguides

Figure 2:
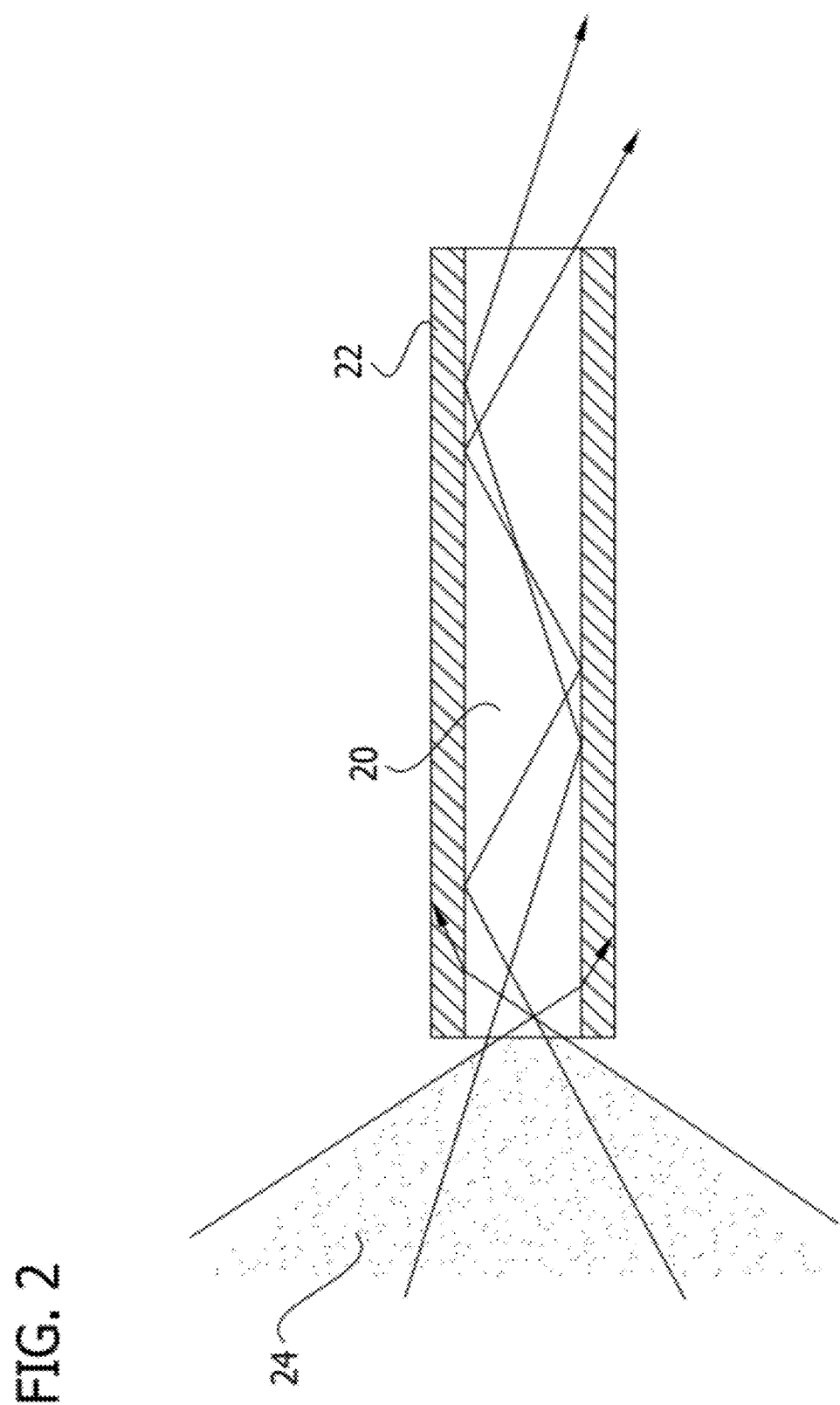
FIG. 2 is a schematic illustration of an optical waveguide.

Light waveguides are structures used to guide light from one point in space to another with minimal losses. The most common design for the waveguides shown schematically in FIG. 2 consists of a dielectric material with high refractive index (core 20) surrounded by a material of lower index of refraction (cladding 22). Light is guided in the core 20 between the waveguide's inlet and outlet by means of total internal reflection. The refractive index contrast between the core 20 and the cladding 22 determines the acceptance angle cone 24 for the light beam. Rays that approach the waveguide with angles within the acceptance cone 24 are guided through the waveguide, while those with angles greater than the acceptance cone 24 are reflected as shown in FIG. 2.

While most of the light waveguides feature a solid core, having an aqueous medium as the core has its added advantages. Research and development of highly target-specific sensors has attained a level of paramount importance because of the burgeoning need for applications in national security, health care, the environment, energy, food safety, and manufacturing. Fluorescence-based sensing is among the most commonly used transduction methods. These sensors utilize fluorescent dye molecules as probes and most sensing applications are performed in aqueous solutions. Since the refractive index of water (1.33) is lower than most solid-state materials, the excitation of the dye and collection of fluorescence are typically performed through either bulk optics such as epifluorescence microscopes or evanescent coupling in solid waveguides. These two configurations impose a number of limitations. For example, in evanescent coupling, efficiency of excitation and fluorescence collection is poor, resulting in low signal-to-noise ratio and sensitivity. Bulk optics adds additional cost and makes it difficult to multiplex sensors on a larger scale. In addition to this, liquid core waveguides can also be applied for use in absorbance spectroscopy and Raman spectroscopy. In Raman spectroscopy, confinement of light in the liquid core improves the efficiency of Raman generation. In addition, a combination of Surface enhanced Raman spectroscopy (for example, by deposition of gold nanoparticles on the nanoporous film surface) with the waveguide design will result in even higher Raman signal sensitivities.

As the refractive index of water is 1.33 which is lower than most readily available materials, construction of a liquid core waveguide with an aqueous core becomes a challenge. Teflon AF 1600 (n~1.31) and Teflon AF 2400 (n~1.29) have long been the only materials reported on being used as the cladding material for such waveguides. These materials however are not the ideal choice for these waveguides, especially in applications for use as a bio or a Raman based chemical sensor. Teflon offers little chance for chemical functionalization desired in most biosensing applications. The refractive index contrast between Teflon and water is at most 0.04 which translates to an acceptance cone of just 18 degrees. For applications in biosensors and Raman based chemical sensors, this poses a significant limitation. As the fluorescence is generated in all directions within the waveguide, it is advantageous for the waveguide to have a large acceptance cone thus guiding most of the generated fluorescence through the length of the waveguide.

Air has the lowest refractive index among all materials (refractive index of 1.0). Incorporating air as the cladding material would yield a waveguide with an ultra high numerical aperture. However, designing an air-clad liquid core waveguide system would be a challenge. Thus for a more efficient liquid core waveguide bio/chemical sensor, new materials with ultra low refractive indices have to be engineered. Nanoporous, nanoparticulate dielectrics such as in accordance with this invention are therefore an ideal choice as the cladding material. With pores in the order of 2-4 nm diameters, these materials have an extremely low refractive index. In one embodiment, refractive indices of 1.15 or less are achieved which correspond to an acceptance cone of at least 42 degrees. These dielectric materials have excellent adhesion to the common substrates and easy functionalization of these surfaces with well established methods makes them all the more attractive for biosensor applications. The large refractive index contrast between the aqueous medium (1.33) and the nanoporous dielectric film (1.10-1.13) results in a large acceptance cone as compared to Teflon AF (1.29). Thus shorter channels can be used in applications such as Raman based sensors and fluorescence based biosensors.

Surface modification of these films can be performed by well established processes, unlike Teflon AF based materials, which is an important requirement in biosensor design. A further attractive aspect of the invention with respect to biosensors is the rapid formation of ultra-low refractive index, low stress, crack free and smooth films based on organosilicate. The fabrication methodology of these nanoporous dielectric films makes them readily amenable to mass production methodologies. In one embodiment, the as-formed films are highly hydrophobic thus no further treatments are necessary to avoid water seepage into the pores and the eventual degradation of the films.

One aspect of the present invention, therefore, is a compact, microfabricated chip based liquid core waveguide (LCW) system employing nanoporous dielectric coatings as the cladding material. Conventional microfabrication of liquid core waveguides involves etching channels in silicon/glass followed by coating of a low refractive index dielectric material and subsequent bonding with a similarly processed glass substrate. Integration of these nanoengineered materials in the liquid core waveguide design is a challenge. Unlike Teflon where thick films could be formed within the etched channels, forming thick nanoporous organosilicate coatings results in a largely stressed film which eventually cracks. To circumvent these issues, a modification has been done in the basic design of the liquid core waveguides in which the sidewalls are eliminated. The new design of device 30 in FIGS. 3 and 4 relies on interaction of water with patterned hydrophobic regions 32 and hydrophilic regions 34 on substrates 36. The patterned hyrdrophobic and hydrophilic regions are the nanoporous, nanoparticulate films of the invention having a refractive index of, e.g., 1.10. In this design, a substrate is patterned such that it consists of super hydrophilic channels 44 (e.g., water contact angles of <20 degrees) separated by super hydrophobic regions 42 (e.g., water contact angles of >90 degrees). Such a layout forces water 38 to be confined within the hydrophilic 44 regions of the substrate. Two such substrates 36 are patterned and held on top of each other with some spacers 40 of, e.g., teflon in between.

Figure 3:
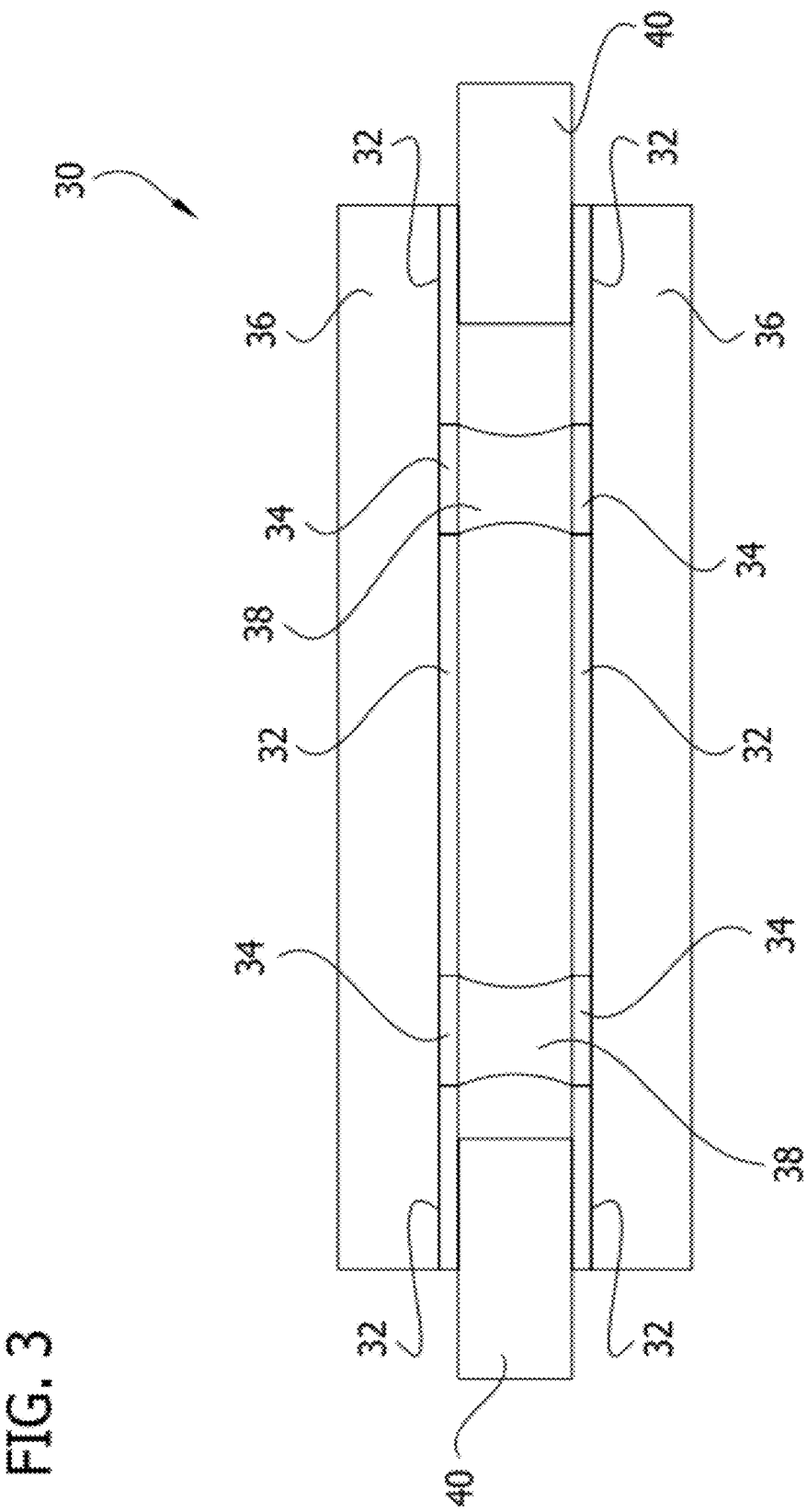
FIG. 3 is a schematic illustration of an optical waveguide of the present invention with hydrophilic and hydrophobic regions.
Figure 4:
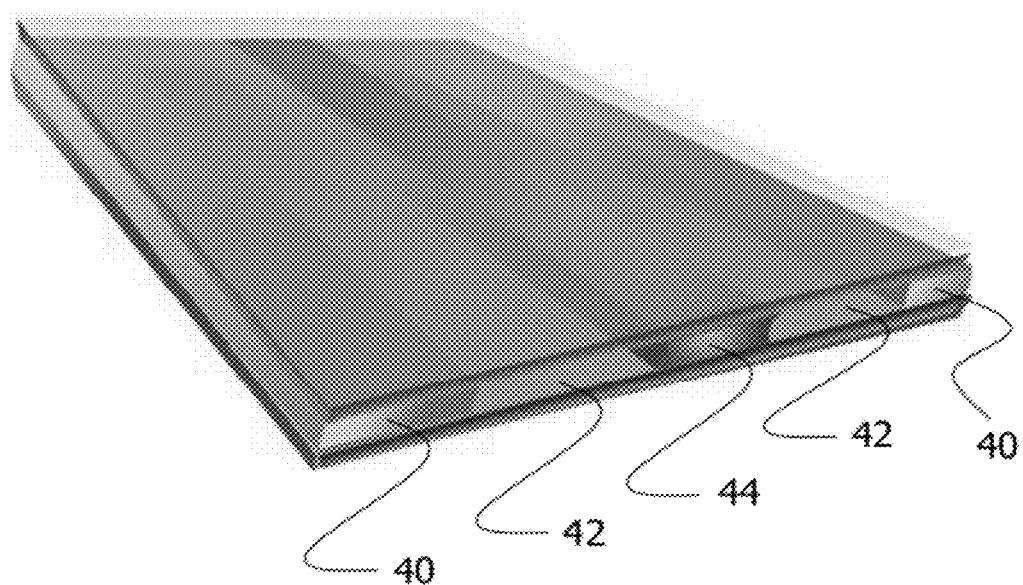
FIG. 4 is a schematic illustration of a liquid core waveguide of the present invention.

As shown in FIGS. 3 and 4, when water 38 is introduced at one end of the channel by placing a drop, the hydrostatic force together with the surface tension of the hydrophilic top and bottom surfaces suck the water to fill the hydrophilic channels 44. The hydrophilic channel 44 in FIG. 4 separates two hydrophobic regions 42, all being between the spacers 40. The hydrophilic channel 44 contains the water with a refractive index of 1.33; the hydrophobic channels 42 contain air with a refractive index of 1.0; and the hydrophobic regions 32 and hydrophilic regions 34 on substrates, being formed from the nanoporous films of the invention, have a refractive index of, e.g., 1.1. Water that is present at the hydrophobic end experiences a force in the opposite direction due to surface tension. As long as this force is larger than the hydrostatic force that is acting to push the water in, the water will not be able to enter the hydrophobic regions. Thus, it is possible to confine the water 38 only in the hydrophilic channels by this design, in effect having a column of water that can serve as a waveguide. FIG. 3 shows two hydrophilic channels defined by the hydrophilic regions 34; but for ease of illustration, FIG. 4 shows just one hydrophilic region 44.

Optical Fiber Waveguides

High numerical aperture (NA) optical fibers are increasingly becoming attractive for medical illumination applications as they provide for broad irradiation patterns enabling the use of small diameter fibers for minimally invasive surgeries. Apart from minimizing the modifications needed to disperse output patterns, these fibers allow lower bend radius without introducing significant losses due to large bends. The power requirements of the lamp source are also greatly reduced as the high acceptance angle associated with these fibers accepts greater percentage of light compared to a low NA optical fiber.

Conventional optical fibers, although designed to be low loss, suffer from having low numerical apertures. Increasing the refractive index contrast between the core and cladding of the optical fiber increases its numerical aperture. This can be accomplished by choosing materials with very low refractive indices to function as the cladding material. However, most of the readily available solid state materials have relatively high refractive indices. Nanoporous dielectric coatings offer a unique opportunity to address this issue. Refractive indices as low as 1.10 (compared to 1.46 of a typical cladding material) can be obtained by packing different volume ratios of air pockets in the matrix material. However, adapting these coatings to the fiber optics is challenging. Existing fabrication processes to obtain these coatings are usually time consuming and require tight heating/cooling cycles making it difficult and uneconomical for practical application.

One challenge is that once the coatings have been applied on the substrates, in order to obtain crack-free porous films, extremely slow temperature ramp-up/ramp-down times (of the order 1° C./min) are used. This places a serious constraint on the adaptability of these coatings for optical fiber manufacture especially while integrating it with the conventional optical fiber manufacturing techniques.

Another challenge associated with these coatings is stability to thermal shocks. Beyond a certain thickness (~1 micron) the films are extremely susceptible to cracking introduced due to thermal stresses. Optical coatings >1 micron thickness are usually required for waveguide applications to confine most of the propagation modes within the fiber core.

Accordingly, nanoporous, nanoparticulate coatings of the present invention are ideal for this application. Apart from rapid formation of these films, with an annealing time typically between about 3 and about 5 minutes after film deposition, these films are stable to temperature shocks resulting from the fast heating and cooling cycles for curing/calcinations process. The obtained coatings are hydrophobic in nature and thereby resist moisture absorption and subsequent film degradation. Furthermore, the chemical precursors required for the preparation of these films are inexpensive, making this an economical solution to produce high numerical aperture optical fibers compared to other methods. These coatings can be directly adapted with the traditional fiber optic manufacturing techniques to yield optical fibers with high numerical apertures.

It is therefore seen that fiber optics with silica core and organosilicate thin film as cladding has large acceptance angle and thus these optical fibers can be used for applications needing large numerical apertures to collect the maximum light possible. Such optical fibers find use in medical illumination applications. Numerical apertures as large as 0.9 can be achieved with the use of such coatings as cladding.

High Surface Area Substrates for Chemical-Biological Assays

The high surface area associated with the nanoporous, nanoparticulate films of the invention can be utilized for chemical-biological assays for increased density of binding to enhance sensitivity. Because of the nanoparticulate nature of the film together with the presence of nanopores, these films feature a high surface area (e.g., >500 m$^2$/g), thus enabling for a greater density of immobilization of biological probes and thereby enhancing the sensitivity. The large surface area can be used for chemical and biological sensor platform to enhance the detection sensitivity. Also, organosilicate particle surface can be easily modified to provide chemically-accessible hydroxy groups (e.g., by oxygen plasma or ozone treatment) for bonding with biological molecules. Advantageously, these films are transparent over the visible spectra and provide a greater density of immobilization, translating into a higher signal to noise ratio, for example, in fluorescence based biosensing.

Imaging

The formation mechanism of the films and nanoparticles can be controlled to incorporate fluorescent dyes, metal nanoparticles intercalated within the organosilicate nanoparticles, as discussed above. Fluorescent dielectric nanoparticles, for example, are biocompatible, thus enabling their use for in vivo imaging applications.

In this application, dye-doped nanoparticles are formed in a mixed solution of good and bad solvent. There are two ways to extract the nanoparticles as discussed above, one of which is precipitation from the solution, and the other of which is by making a thin film of the solution. In the first method, nanoparticles formed in solution are collected by centrifuge. In the second, more preferable method, there is thin film formation since it provides freedom for surface modification by plasma treatment, which is an essential step to create carboxyl or amine groups on the surface of the nanoparticles for biological applications, while dye-doped nanoparticles have methyl group on surface. Once a thin film is obtained by, e.g., spin coating, it is annealed at high temperature depending upon the dye bond in the particle to remove free dye on the surfaces of nanoparticles and enhance crosslinking of nanoparticles. In this annealing step, the role of the porogen (bad solvent) is crucial for preventing inter crosslinking among nanoparticles. For rhodamine 6G doped nanoparticles, 250° C., for example, is optimal. The annealed films are then treated with plasma to render the nanoparticle surfaces hydrophilic so as to disperse the particles in water for biocompatibility. Oxygen plasma is used to create carboxyl groups for the nanoaprticles. For example, ATR spectra have shown COOH groups at 1720 cm-1 after oxygen plasma treatment. Other plasmas such as ammonia, nitrogen and carbon dioxide plasmas are used for other purposes. The plasma treated films are then scraped and dispersed in water. The size of nanoparticles may vary, for example, from 3 nm to 10 nm as demonstrated by TEM imaging, depending upon —OH contents in the PMSSQ. The dye-doped nanoparticles from this synthesis are very photostable. The reason is that the dyes trapped inside particles (hydrophobic core) have an outside protection layer (hydrophilic shell). The hydrophobic core/hydrophilic shell structure is due to hydrophobic nature of PMSSQ and carboxyl group on surface after oxygen plasma. Photobleaching of R6G-doped nanoparticles and pure R6G nanoparticles at an emission wavelength of 581 nm has shown high photostability after 30 minutes continuous exposure to 10× lens under 130 W mercury lamp.

Other Applications

Inasmuch as one aspect of the present invention is a process for the rapid formation of ultra-low refractive index, low stress, crack free and smooth films based on organosilicate, the method, films, and nanoparticles have application elsewhere where its features such as high porosity, low refractive index, and the like are applicable. The fabrication methodology of these nanoporous dielectric films makes them readily amenable to mass production methodologies. As noted, the as-formed films are highly hydrophobic thus no further treatments are necessary to avoid water seepage into the pores and the eventual degradation of the films. For example, these films can also be applied for use as low-k dielectrics in semiconductor industry for silicon microchip technology, as well as, organic thin film transistors. They also have thin film laser application. In nanorod form, the nanoparticles may be used as bioscaffold material for tissue repair.

It has been discovered that porous film formation on a substrate can be achieved by control of the surface energy of the substrate. In one embodiment, it has been discovered that controlling the surface energy of the substrate to between about 28 and about 50 mJ/cm$^2$, facilitates deposition and maintenance of a nanoporous film of the materials of the invention. With these particular materials, if the surface energy of the substrate is less than about 28 mJ/cm$^2$, discontinuous films are obtained due to excessive de-wetting of the film. On the other hand, if the surface energy of the substrate is more than about 50 mJ/cm$^2$, nanopores collapse, causing formation of a non-porous film, upon curing and calcination. Accordingly, in accordance with this aspect of the invention, a substrate is patterned with regions of different surface energies. Then the substrate is subjected to nanoporous film deposition and curing/calcination to yield a spontaneously patterned nanoporous film.

In a first embodiment, the substrate is patterned with differential surface energies by a surface modification technique. This may be achieved in one approach by imparting a particular surface energy to the entire substrate, and then imparting a different surface energy to particular areas of the substrate, so there are areas having the particular surface energy imparted first and also areas having the different surface energy. The method therefore involves imparting to both the first areas and the second areas one of either a) a second surface energy non-conducive to nanoporous film maintenance or b) a first surface energy conducive to nanoporous film maintenance. Then the next step is to treat the first areas to impart thereto the first surface energy conducive to nanoporous film maintenance in the event of (a), or treat the second areas to impart thereto the second surface energy non-conducive to nanoporous film maintenance in the event of (b). In a currently preferred embodiment, the overall substrate, both the first and second areas, are treated to have the surface energy which is not conducive to nanoporous film formation and maintenance. Then the first areas are treated to have the surface energy which is conducive to nanoporous film formation and maintenance.

In one currently preferred method, a plasma treatment is used to manipulate the surface energy of the surface through the creation of active dangling bonds. In particular, a thin polymer film is deposited onto the substrate followed by plasma exposure and lithographic patterning of the polymer film. In one example, the thin polymer film is PMSSQ. The thickness of this polymer film layer is not narrowly critical; and even a monolayer thick film is sufficient to impart the desired surface energy if coverage is complete. In certain preferred embodiments, the thickness is between about 1 nm and about 20 nm, preferably between about 5 nm and about 15 nm.

In accordance with this preferred embodiment, a silicon substrate is first coated with a thin film of, e.g., PMSSQ having thickness of e.g., between about 1 nm and about 20 nm, such as 14 nm, and cured. The coated substrate is then exposed to a brief plasma treatment, such as a brief low power $CO_2$ plasma treatment. This effectively oxidizes the surface and renders the film high in surface energy, for example, about 60 mJ/cm$^2$, which is conducive to pore collapse of a nanoporous film deposited thereover.

Distinct surface energy regions on the silicon substrate are then defined through photolithography and subsequent etching. In particular, a pattern is created which has first areas having a first surface energy conducive to maintenance of a nanoporous film, and second areas having a second surface energy which is non-conducive to maintenance of a nanoporous film. This is achieved in one aspect by applying a photoresist material over the entire surface, for example by spin coating. The photoresist thickness may, for example, be between about 1 µm and about 2 µm, such as between about 1.2 µm and about 1.6 µm.

Then UV light is applied to the photoresist through a mask which defines the pattern. The areas exposed to the UV light cross-link, and the areas masked from the UV light do not cross-link. The light-shielding mask is removed, and a developer solution is then applied to surface to remove the photoresist which had not cross-linked. This leaves a pattern comprising areas of photoresist and areas of exposed polymer film, for example exposed PMSSQ film having the surface energy of about 60 mJ/cm$^2$ as induced by the above-described plasma treatment.

The substrate surface is then subjected to a treatment to convert the areas not covered by the photo resist, i.e., the exposed high surface energy film areas, to a lower surface energy which is not conducive to pore collapse of an NPO film applied thereover. In one embodiment, this is accomplished by etching, for example, with a brief HF dip (e.g., 1:10 HF:DI water by volume), which etches away the exposed polymer (e.g., PMSSQ) film. The etchant also preferably passivates the now-exposed substrate (e.g., silicon) surface, leaving it with a surface energy conducive towards porous film formation, for example between about 20 and about 50 mJ/cm$^2$, for example about 45 mJ/cm$^2$.

The next step is to remove the photoresist, and thereby expose a pattern defined by the passivated areas having a surface energy conducive to formation and maintenance of porous film thereover, and other areas previously under the now-removed photoresist having a surface energy which is not conducive to formation and maintenance of porous film thereover. The photoresist is removed by standard techniques, for example, by rinsing with acetone or other appropriate solvent. What remains then is a substrate surface to which has been imparted differential surface energy to define first areas having a first surface energy conducive to maintenance of a nanoporous film thereon and second areas having a second surface energy non-conducive to maintenance of a nanoporous film thereon, the first and second areas defining a differential surface energy pattern on the substrate.

A nanoporous film precursor is then deposited onto the substrate having the differential surface energy pattern. The nanoporous film precursor is any of the precursor compositions described elsewhere in this application. The deposition method is not critical to the invention, and may be, for example, by spin coating. In particular, the film-forming step, the suitable substrates, the deposition method, and other parameters are not narrowly critical here and are the same as those parameters and variations discussed above in connection with the film-forming operation. The thickness of the NPO precursor film deposited over the differential surface energy pattern may be, for example, between about 100 nm and about 4 µm, such as between about 400 nm and about 800 nm.

The next step is to cure the nanoporous film precursor to form the nanoporous film pattern, also as described hereinabove. This may be achieved, for example, by a high temperature curing/calcination step, which results in spontaneous formation of microscale patterns of nanoporous film defined by the surface energies of the underlying substrate. A stable nanoporous film forms on the surface areas having a surface energy conducive to nanoporous film maintenance, e.g., in the range of, e.g., about 28 to about 50 mJ/cm$^2$, and no stable film forms on the areas having a surface energy not conducive to nanoporous film maintenance. For example, in the embodiment described here, no stable film forms on the second areas with the second surface energy (about 60 mJ/cm$^2$). In alternative embodiments, the second areas may have other surface energies outside the stability range, for example below about 28 mJ/cm$^2$, where de-wetting occurs.

From the foregoing it is evident that in one embodiment of the invention, it requires imparting differential surface energy by depositing a polymer film encompassing the first and second areas on the substrate surface; imparting to the first areas and the second areas the second surface energy non-conducive to nanoporous film maintenance; applying a photoresist material over the substrate surface; selectively exposing and developing the photoresist material to form patterned areas of photoresist film on the second areas and exposed polymer film on the first areas; etching to remove the exposed polymer film from the first areas and to perform said imparting to the first areas the first surface energy conducive to nanoporous film maintenance; and removing the photoresist material from the second areas to expose said second areas having the second surface energy. Thereafter, a nanoporous film precursor is deposited onto the differential surface energy pattern; and nanoporous film precursor is cured to form the nanoporous film pattern, wherein the nanoporous film is on the first areas and is not on the second areas.

In an alternative method of the invention, microcontact printing techniques are used to print patterned surface energies. As with the method described above, this method involves imparting differential surface energy to a surface of a substrate to define first areas having a first surface energy conducive to maintenance of a nanoporous film thereon and second areas having a second surface energy non-conducive to maintenance of a nanoporous film thereon, where the first and second areas defining a differential surface energy pattern on the substrate. This alternative embodiment involves selective deposition of a film of a pattern material to define the pattern. Either the pattern material or the substrate surface has the first surface energy conducive to nanoporous film maintenance and the other has the second surface energy non-conducive to nanoporous film maintenance. Thereafter a nanoporous film precursor is deposited onto the differential surface energy pattern, and the nanoporous film precursor is cured to form the nanoporous film pattern.

In accordance with one embodiment of this alternative approach, in one embodiment a replica molded PDMS (polydimethylsiloxane) surface is used to print patterned polymeric thin films. A mold is prepared to physically manifest the pattern desired. A polymer film precursor is then placed into the mold and cured to a film manifesting the desired pattern. The mold with the film is then brought into contact with the substrate surface, and the film transferred to the substrate. The nature of the mold is not critical to the invention, and may be, for example, along the lines of the mold illustrated by Ro et. al., "The Direct Patterning of Nanoporous Interlayer Dielectric Insulator Films by Nanoprint Lithography," Advanced Materials, pp. 2919-2924 (2007). This effectively results in a substrate with a pre-patterned surface energies, defined by the inherent surface energy of the substrate and the surface energy of the printed polymeric thin film. A variety of polymers may be used as inks. As an example, PMSSQ, trimethyl chlorosilane modified PMSSQ nanoparticles (described hereinabove and referred to simply as PMSSQ nanoparticles) may be conveniently used. After formation of the patterned substrate, the nanoparticle precursor is applied and the remaining steps carried out as described above.

Figure 33:
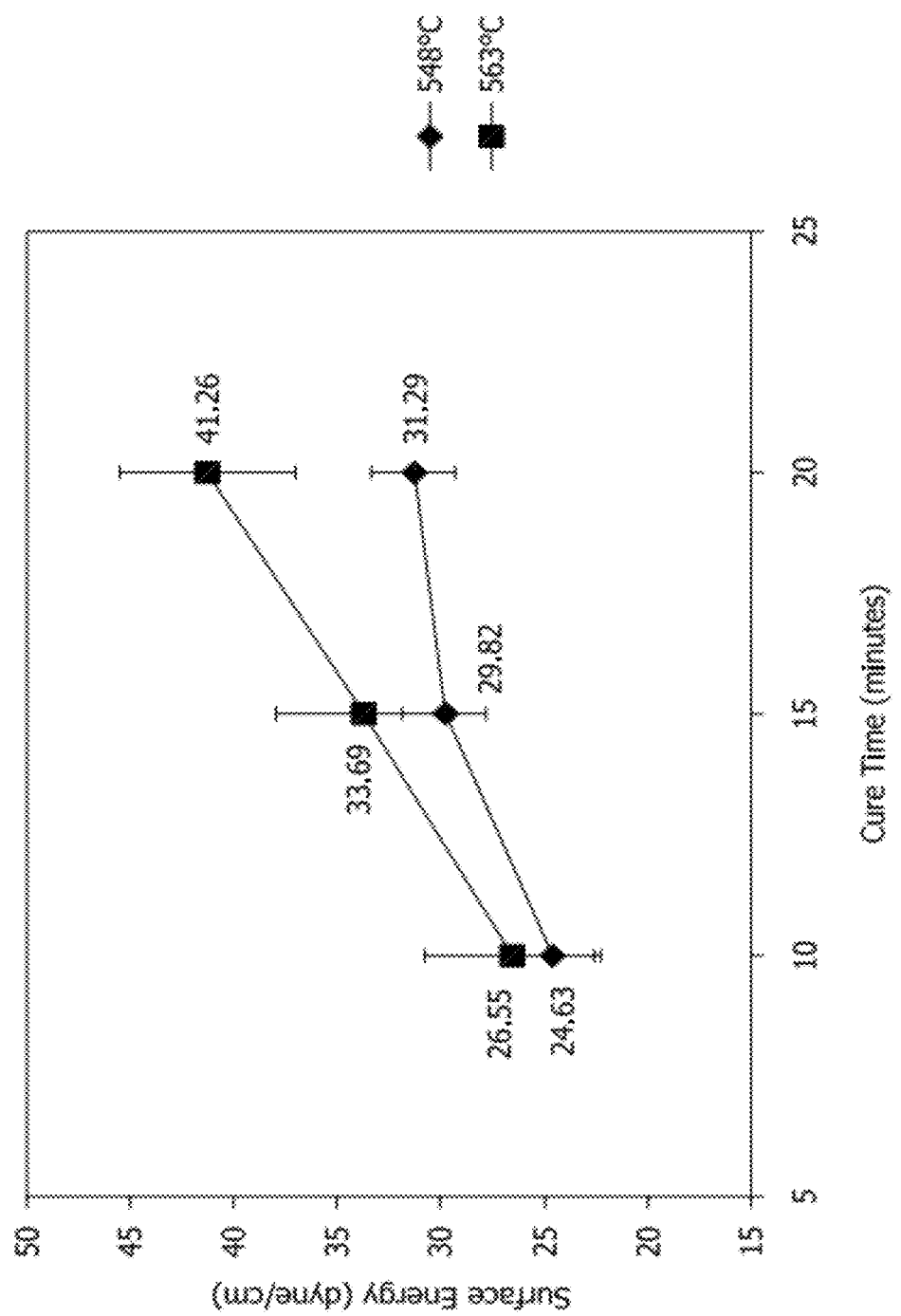
FIG. 33 is a plot of surface energy versus cure time for a thin PMSSQ film.

In a further application of the present invention, the surface energy of certain areas of the patterned substrate is controlled by its temperature dependence. For example, in one embodiment a high surface energy substrate is employed and a PMSSQ nanoparticle thin film is deposited thereon in a desired pattern by microcontact printing. The cure time and temperature are carefully controlled based on a known relationship among cure time, cure temperature, and surface energy so the thin film pattern has a surface energy conducive to nanoporous film formation maintenance, e.g., between about 20 and about 50 mJ/cm$^2$. These films may be printed on inherently high surface energy substrates like glass, with a surface energy of 56-60 mJ/cm$^2$, thereby creating a surface with differential surface energies. FIG. 33, for example, shows the relationship among these parameters for thin film PMSSQ for certain temperatures. Accordingly, this aspect provides an additional degree of flexibility to fine tune the patterned nanostructures based on the surface energy.

Microcontact printing of thin film in a pattern on a high surface energy substrate followed by subjecting the substrate to appropriate annealing conditions results in a substrate with pre-patterned surface energies wherein the exposed substrate (e.g., glass) regions (not covered by the nanoparticle film) are conducive to pore collapse while the regions containing the printed nanoparticle films aid in the nanoporous film formation, when an nanoporous film precursor is subsequently applied.

The following examples illustrate the invention.

Example 1

For the preparation of films, polymethylsilsesquioxane (PMSSQ) having a molecular weight, M$_n$, of 6000-9000 (Techneglas; Perrysburg, Ohio; Gelest, Inc; Mossisville, Pa.), poly(propylene glycol) (PPG) having a molecular weight, M$_n$, of 424 (Sigma-Aldrich; St. Louis, Mo.) and propylene glycol methyl ether acetate (PGMEA) (Sigma-Aldrich; St. Louis, Mo.) were used as supplied. A 50% by weight solution of PMSSQ was prepared by dissolving 5 g of PMSSQ in 5 g of PGMEA and designated as solution A. This solution was then filtered using a 0.25 micron filter. A 50% by weight solution of PPG was prepared in PGMEA by dissolving 5 g of PPG in 5 g of PGMEA and designated as solution B. Solutions A and B were then sonicated separately for at least 10-15 minutes to ensure complete dissolution of the respective solutes. After obtaining clear solutions, Solution A was mixed with solution B and sonicated for an additional 5 minutes to obtain a homogenous solution. This solution was then taken in an open beaker and placed on a hot plate at 70° C. under constant stirring (600 rpm). The weight of the solution was continuously monitored and the solution was removed from the hot plate after a predetermined amount (0.5 g, 1 g, 2 g and 6 g) of the PGMEA was evaporated. The resulting clear, viscous solution was then transferred into a glass bottle and sealed for further use.

Figure 5A:
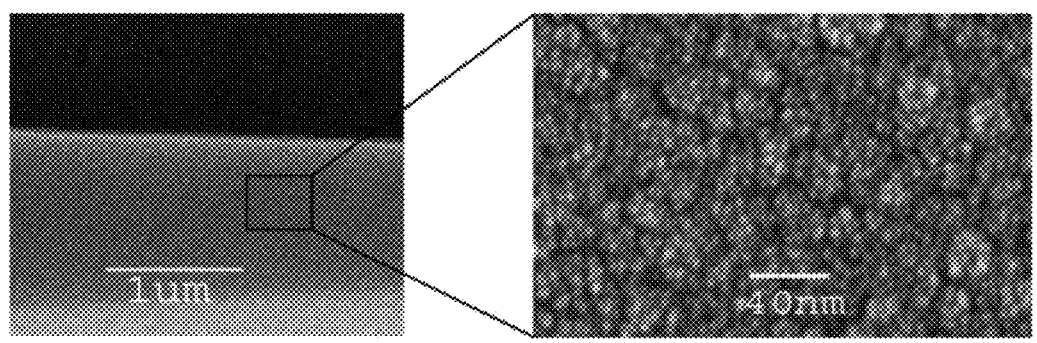
FIGS. 5A and 5B are cross-sectional SEM images of a cross-section of a nanoparticulate film of the present invention at different magnifications, as described in Example 1.
Figure 5B:
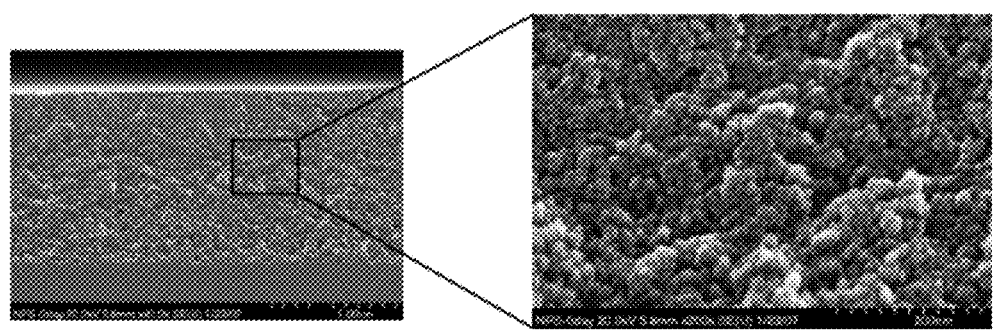

This dispersion was then spin cast onto silicon substrates to form thin films (2 micron thickness). Immediately after the spin coating, the films were calcinated on a hot plate at 470° C. for 5 minutes for PPG burn out resulting in the nanoporous film. In addition to serving as a poor solvent, the PPG molecules act as a plasticizer during the final film formation resulting in a low stress, crack free film. The obtained films could withstand the large thermal stresses resulting from instantly stepping down to room temperature from 470° C. FIGS. 5A and 5B show the cross-sectional SEM of the film along with the magnified view. From the figure it can be seen that the film is smooth and is comprised of nanoparticles with a narrow size distribution in the range 2-3 nm. It can also be seen that it is possible to control the size of the nanoparticles by using different Si—OH content PMSSQ varying the initial compositions of the solution, amount of the solvent evaporated, and the temperature at which the evaporation is carried out.

Figure 6A:
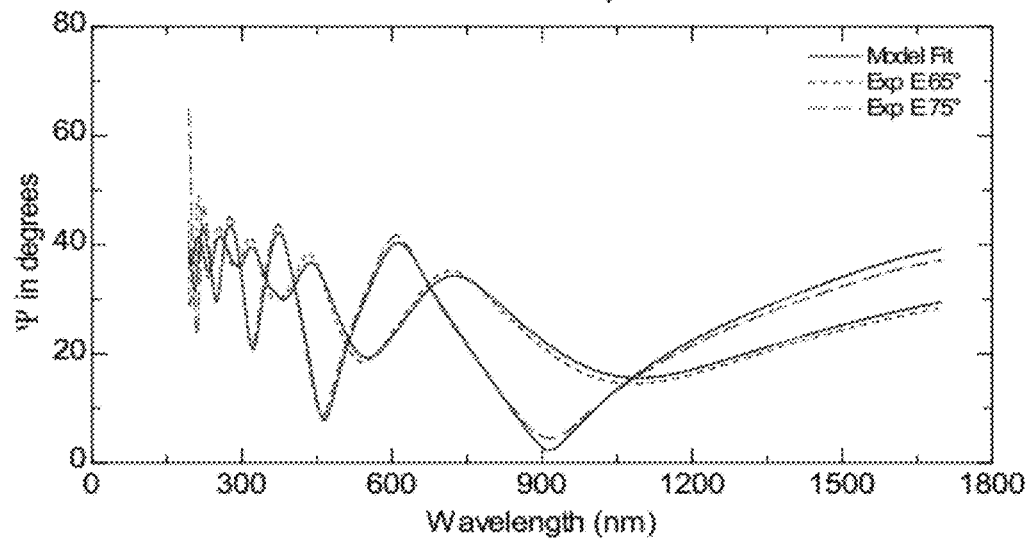
FIGS. 6A and 6B are ellipsometric fitting curves for Psi and Delta, respectively.
Figure 6B:
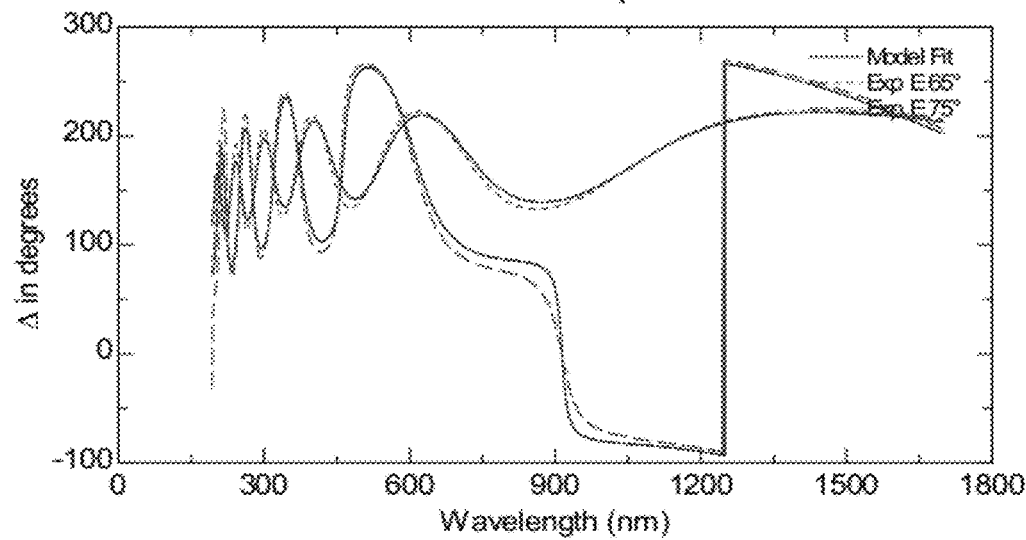

Electrical characterization of these films has been performed in a probe station on the metal/insulator/metal (MIM) structures at room temperature. Capacitance-voltage (C-V) measurements were carried out using an HP 4284A LCR meter at frequencies 100 kHz and 1 MHz. Nanoporous dielectric films were deposited on heavily doped, electrically conductive silicon substrates from one day aged solution. Aluminum dots were then sputter coated on these films through a shadow mask. Dielectric constant measurements performed in this manner gave a value of 1.4 at 100 KHz and 1.42 at 1 MHz. Optical characterization of these films was carried out by variable angle spectroscopic ellipsometry (VASE™, J. A Wollam, Inc.). Ellipsometric measurements were taken on the porous films at 65° and 75° incident angles with wavelength scans performed from 300 nm to 1700 nm. For the data modeling, Cauchy model with non-idealities was used to fit the data. The details of the modeling of nanoporous organosilicate films are described in M. T. Othman, J. A. Lubguban, A. A. Lubguban, S. Gangopadhyay, R. D. Miller, W. Volksen, H.-C. Kim, J. Appl. Phys. 99, 083503 (2006). The porosity of the films has been modeled using the Maxwell Garnet Effective medium approximation model which gave a porosity of about 70% for these films. Refractive index measurements of the films gave a value of 1.10 with a thickness of 884 nm. FIGS. 6A and 6B show the fitting curve as well as the depth profile of the film from the graded Cauchy and non ideal model fit.

Nanoindentation technique (TriboIndenter, Hysitron Inc.), was used to study the mechanical properties of the film. From the nanoindentation measurements, the modulus of elasticity of the film has been calculated to be 0.56 GPa. It is well documented that the modulus of the nanoporous films drop rapidly with increasing porosity. Thus in comparison to the nanoporous dielectric films prepared by the porogen approach of the same porosity (70%) these films are higher in modulus and expected to be more robust. Apart from the good thermal stability (up to 500° C.) these films have shown to have good adhesion to common substrates (Silicon and Pyrex glass). Thus, these films can be used as low-k material in Silicon back-end process as well as a gate dielectric for thin film transistors. Such low-k materials are increasingly becoming attractive for use as dielectrics in organic field effect transistors.

Example 2

Physical Characteristics

Figure 7A:
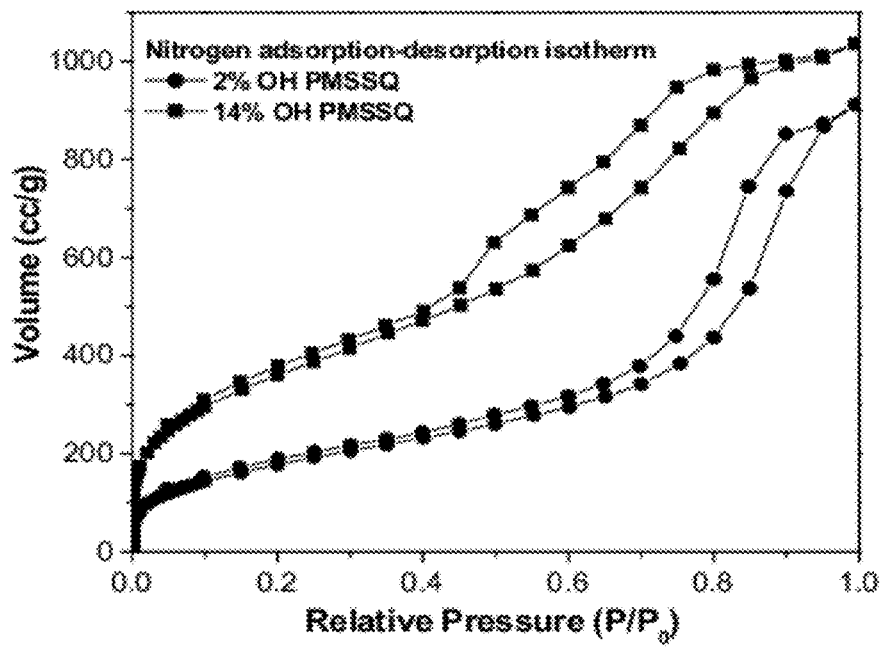
FIG. 7A depicts Nitrogen adsorption-desorption isotherms measured for porous organosilicate nanoparticle networks and 7B depicts BET analysis of the isotherms to determine the surface area, as described in Example 2.

Nitrogen adsorption-desorption isotherms for samples prepared as described in Example 1 were analyzed using a Quantachrome Autosorb-1 automated gas sorption system and the surface areas of the samples were computed using BET method. For the analysis, films were prepared on silicon substrates from one day aged solutions. The nanoparticulate powder was obtained by carefully scraping the film from the substrate. Since the samples are hydrophobic, these were degassed at room temperature for twelve hours. The isotherms obtained for these films shown in FIG. 7A are classified as Type IV, as normally observed in typical mesoporous samples (pore size of 2-50 nm as defined by IUPAC). However, it is seen that that there is a sharp increase of the volume of nitrogen adsorbed at relative pressures ($P/P_o$) in the range of $10^{-7}$-$10^{-4}$. Therefore, it is expected that these samples are likely to exhibit both microporosity and mesoporosity.

Figure 7B:
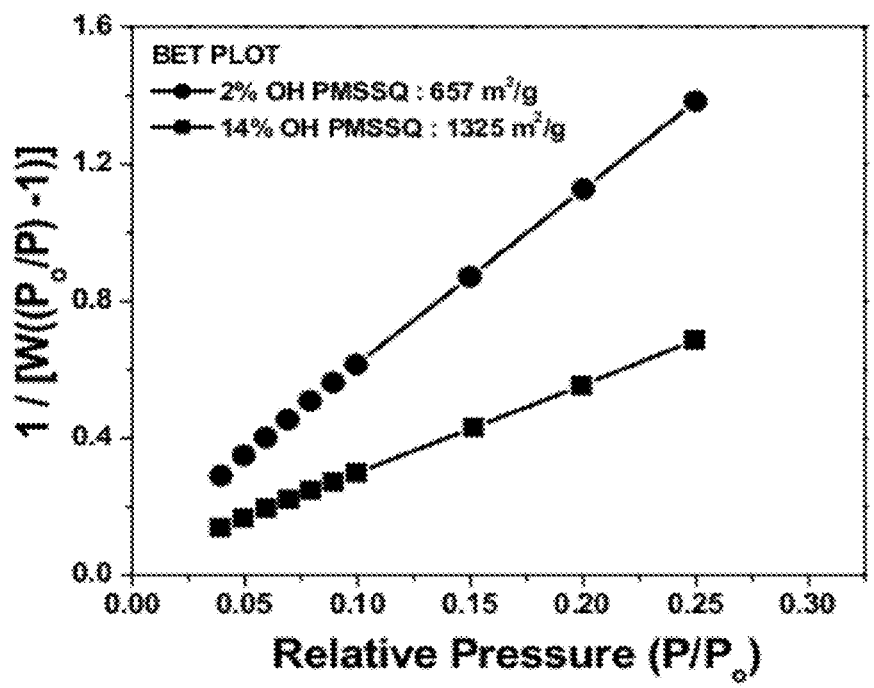

The BET plots shown in FIG. 7B reveal that the surface area of these nanoparticulate porous films prepared using PMSSQ precursor with 2% and 14% OH content are 657 $m^2$/g and 1325 $m^2$/g respectively. The high surface area of these samples is attributed to the large amount of pores created by the removal of PPG, voids between the nanoparticles and extremely small size of these nanoparticles with a narrow size distribution. Smaller nanoparticles with the size range of 10-14 nm were observed in films prepared using PMSSQ precursor with 14% OH content in comparison with that of 20-40 nm sized particles observed in films prepared with 2% OH content.

High surface area porous silica materials reported in the literature are conventionally hydrophilic and therefore those samples require post-treatments with silylating agents like TMCS, HMDS etc. In contrast, the process of the present invention yields high surface area, hydrophobic porous silica nanoparticles in a single step synthesis procedure.

Figure 8A:
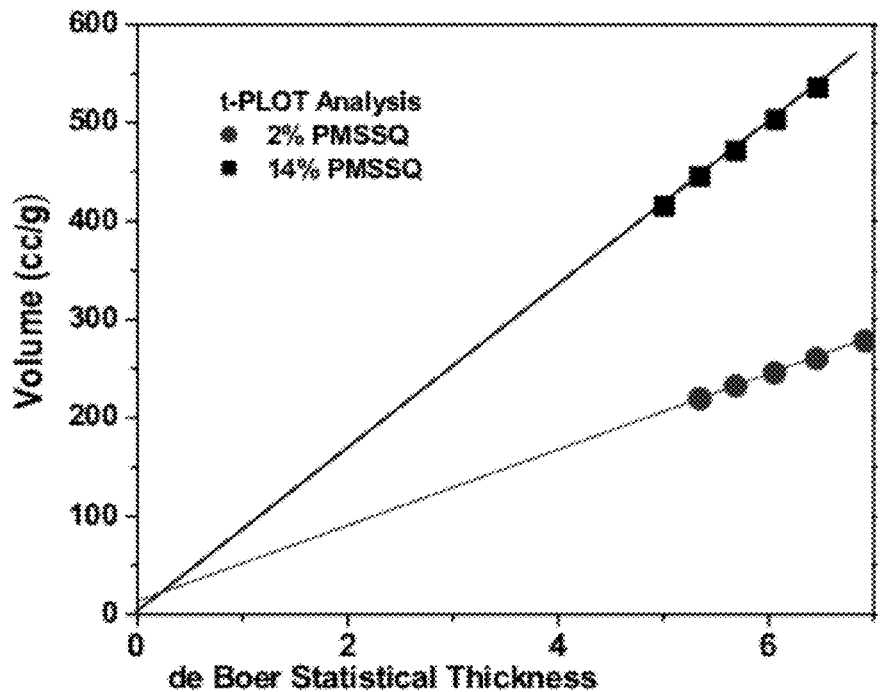
FIG. 8A is a t-plot analysis of the isotherms show positive Y intercept confirming the existence of micropores in the samples described in Example 2. The de Boer Statistical Thickness on the x-axis is in angstroms.

T-plot analysis of the isotherms was performed to determine the amount of microporosity in the samples. T-plots shown in FIG. 8A reveal positive Y-axis intercept for both these samples. The de Boer Statistical Thickness on the x-axis is in angstroms. The obtained micropore volumes for films prepared using precursors with 2% and 14% OH content are 0.03 cc/g and 0.006 cc/g respectively. The microporosity in these samples constitutes 2.3% and 0.4% of the total pore volume observed. For the sample prepared with 2% OH content in MSSQ precursor, the micropore surface area of 80 $m^2$/g and the external surface area of 577 $m^2$/g add up to 657 $m^2$/g which equals the BET surface area. Similarly, for the sample prepared with 14% OH content in MSSQ precursor, the micropore surface area of 42 $m^2$/g and the external surface area of 1273 $m^2$/g add up to 1315 $m^2$/g, which is very close to the total surface area of 1325 $m^2$/g obtained from BET analysis.

Figure 8B:
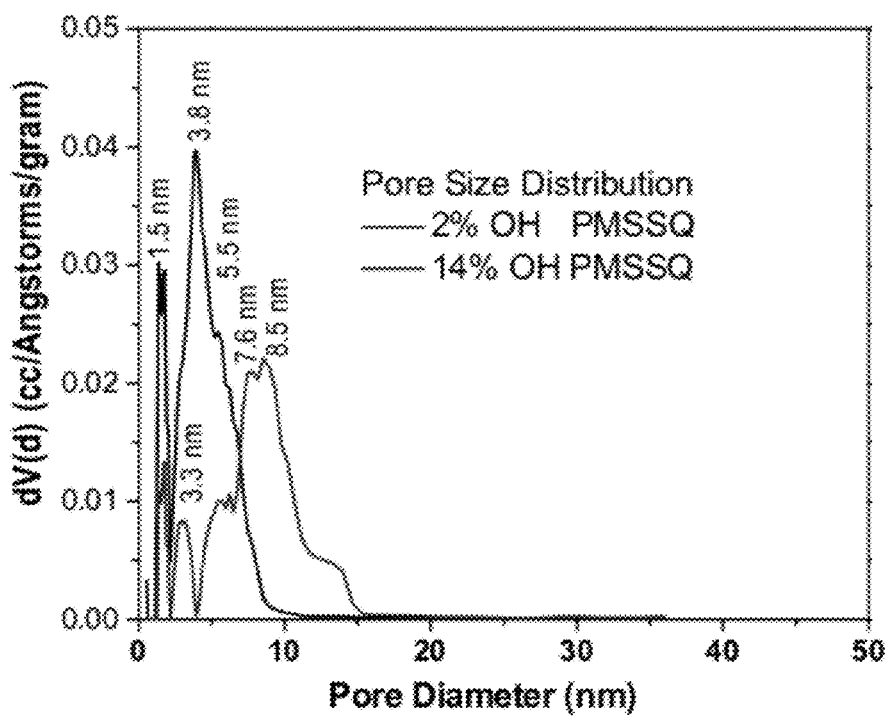
FIG. 8B shows pore size distributions determined for the sample described in Example 2.

Pore size distribution was determined applying the density functional theory and Monte Carlo simulation methods using the AS1 WIN software package. The pore size distributions (FIG. 8B) reveal that the micropore mode is about 1.5 nm for both the samples. The size distribution of mesopores lies in the range of 3-9 nm in case of smaller nanoparticles (10-14 nm) prepared with 14% OH content in PMSSQ precursor and it lies in the range of 3-16 nm in case of larger nanoparticles (20-40 nm). The total pore volume obtained for samples prepared with 2% and 14% OH content in MSSQ precursor are 1.32 cc/g and 1.5 cc/g respectively. The large amount of porosity exhibited these organosilicate hydrophobic films is attributed to the removal of PPG and the voids formation arising from the assembling of the nanoparticles on the substrate at the time of film deposition.

Example 3

Nanoparticulate Films

Figure 9A:
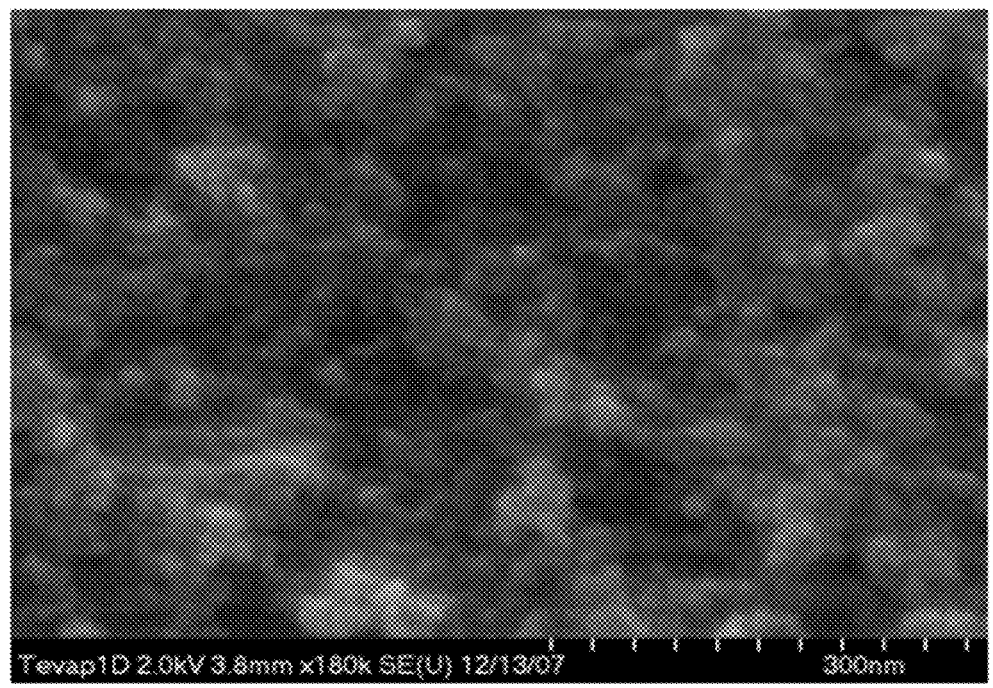
FIGS. 9A and 9B are SEM images of the obtained nanoparticlulate films prepared with 14% OH content polymethylsilsesquioxane (Techneglas Corp. GR650F), solution aged 1 day as described in Example 3. Average particle size ~10 nm.
Figure 9B:
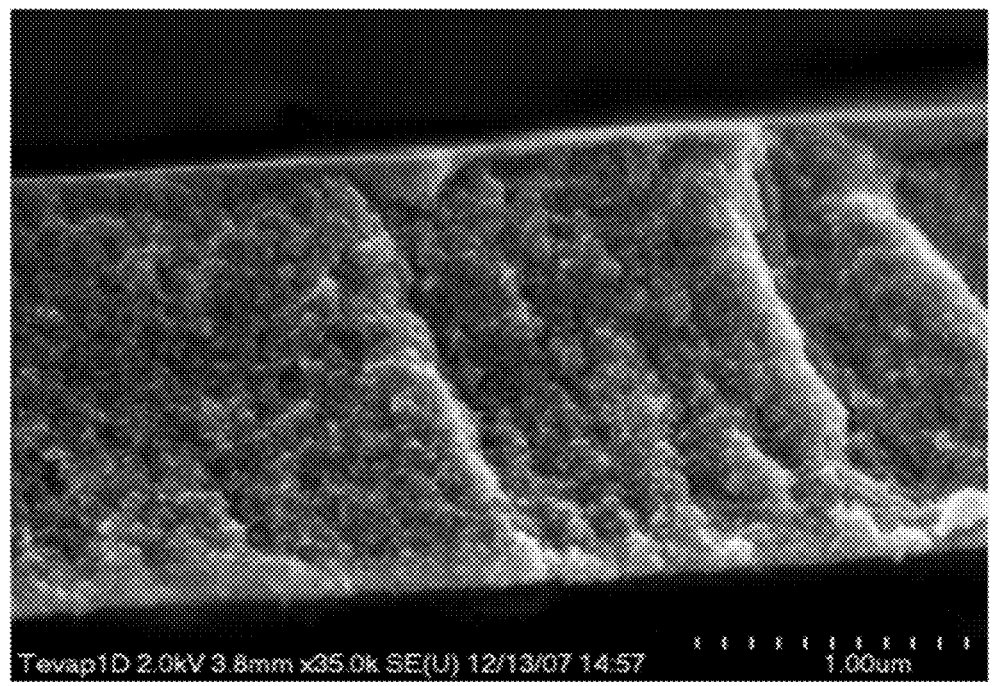

Nanoparticulate films were prepared by spin deposition onto freshly 1:10 HF:DI dipped silicon substrates followed by a heat treatment step of 400 C for 5 minutes, using the procedures described in Example 1 except as otherwise noted. These films were prepared with 14% OH content PMSSQ from Techneglas Inc, (GR650F). The films were prepared with one day aged solution. FIGS. 9A and 9B depict the SEM of the film's cross section. The films prepared from 2% OH content PMSSQ (Gelest, SST-3M02), on the other hand, gave nanoparticulate films with particle sizes ~40 nm (see FIG. 7). The difference in particle size between the 14% (Mw 5000) and the 2% PMSSQ (7000-8000) may be due to the differences in molecular weight between the two different PMSSQ. 2% OH content solutions tend to take longer time to gel because of the presence of less number of reactive sites.

Example 4

Nanoparticulate Dispersions

Figure 10:
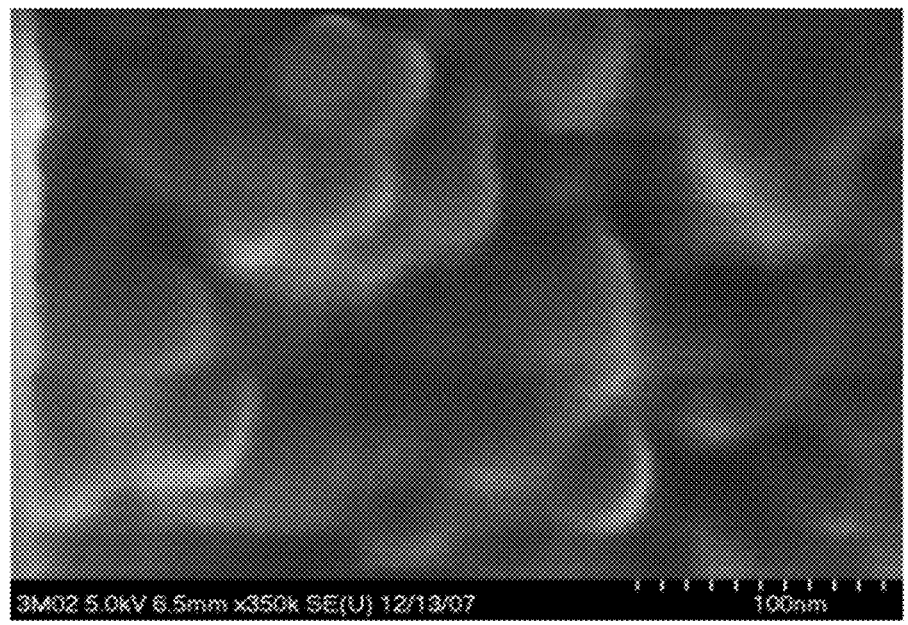
FIG. 10 is a SEM of the nanoparticulate film prepared with 2% OH content polymethylsilsesquioxane (Gelest, SST-3M02) as described in Example 3. The average particle size is about 40 nm.
Figure 11A:
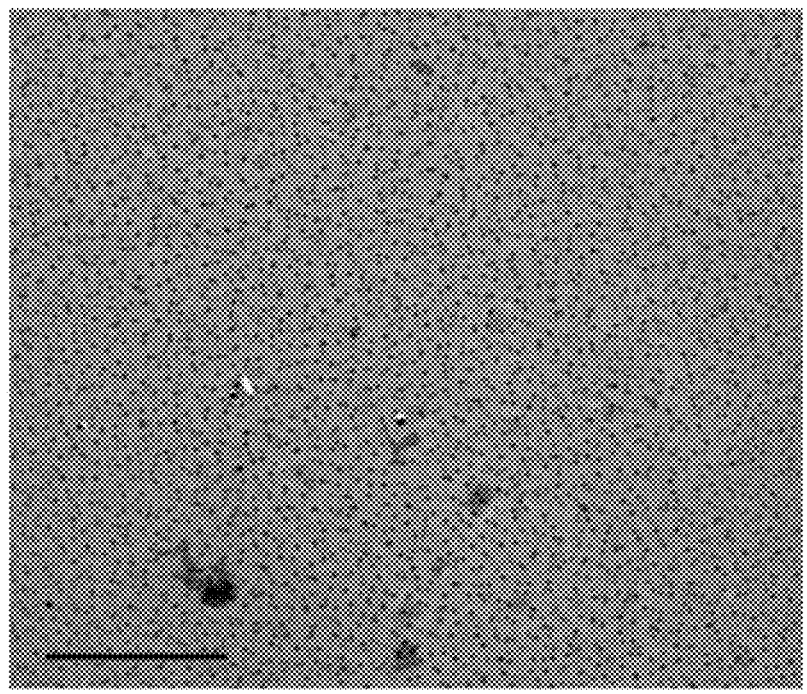
FIGS. 11A, 11B, and 11C are TEM images of the organosilicate nanoparticle dispersions prepared as described in Example 4; (a) and (b) prepared with 14% OH content polymethylsilsesquioxane, and (c) Prepared with 2% OH content polymethylsilsesquioxane. Scale bar for (b) is 200 nm and the scale bar for (c) is 500 nm.
Figure 11B:
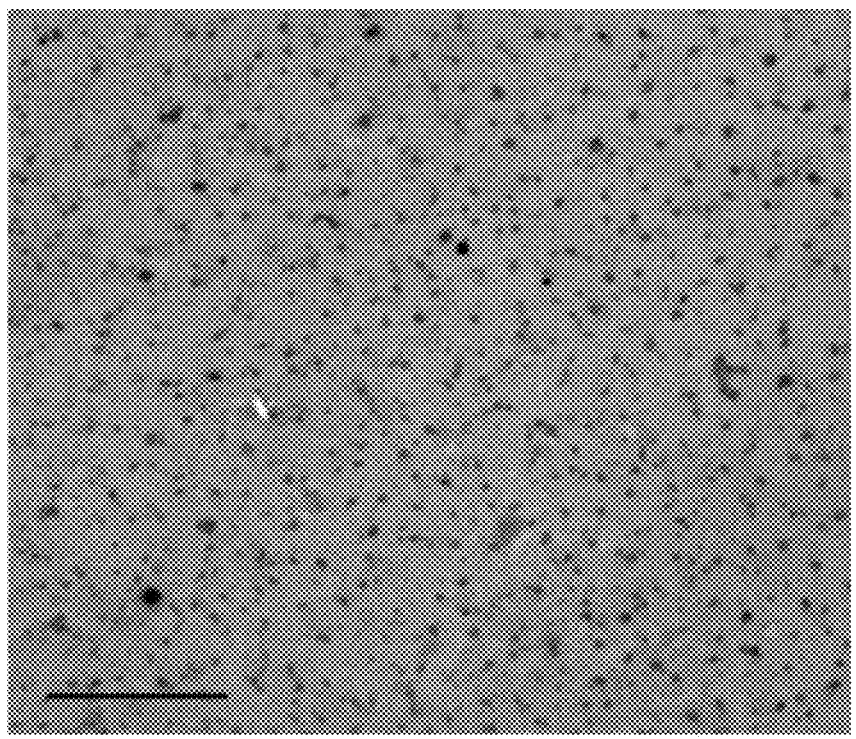
Figure 11C:
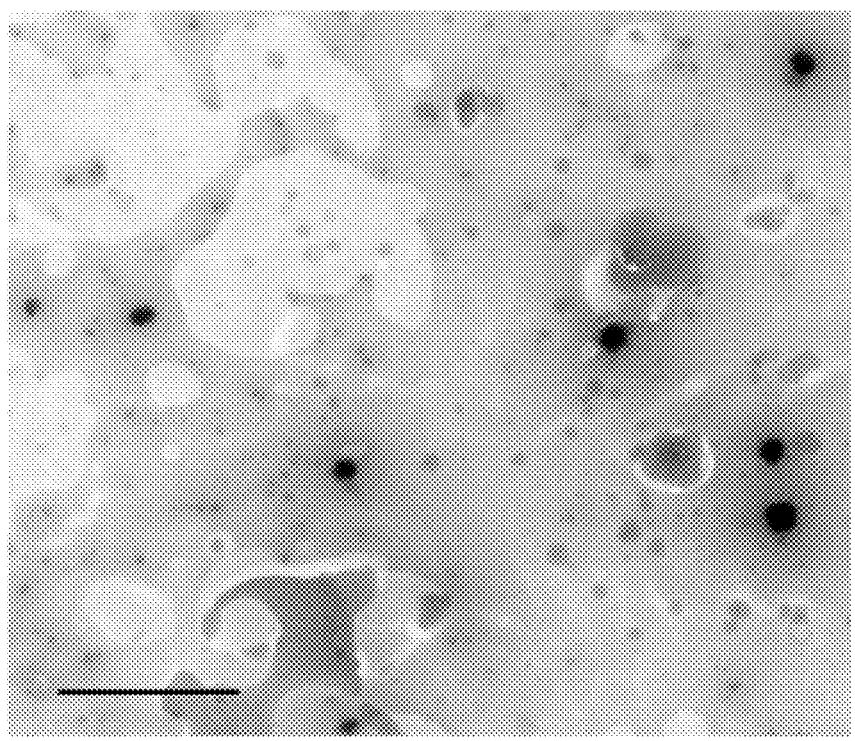

A dispersion of organosilicate nanoparticles was prepared by scraping a film prepared as described in Example 1 with a flat razor blade, collecting the resulting fine powder and dispersing it in a surfactant solution via sonication. The resulting solution was then filtered with a 0.2 micron filter to obtain a clear nanoparticle dispersion. FIGS. 10A, 10B, and 10C are TEM images of the resulting organosilicate nanoparticle dispersions. The scale bars are 1 micron, 200 nm, and 500 nm, respectively in A, B, and C.

Example 5

Figure 12:
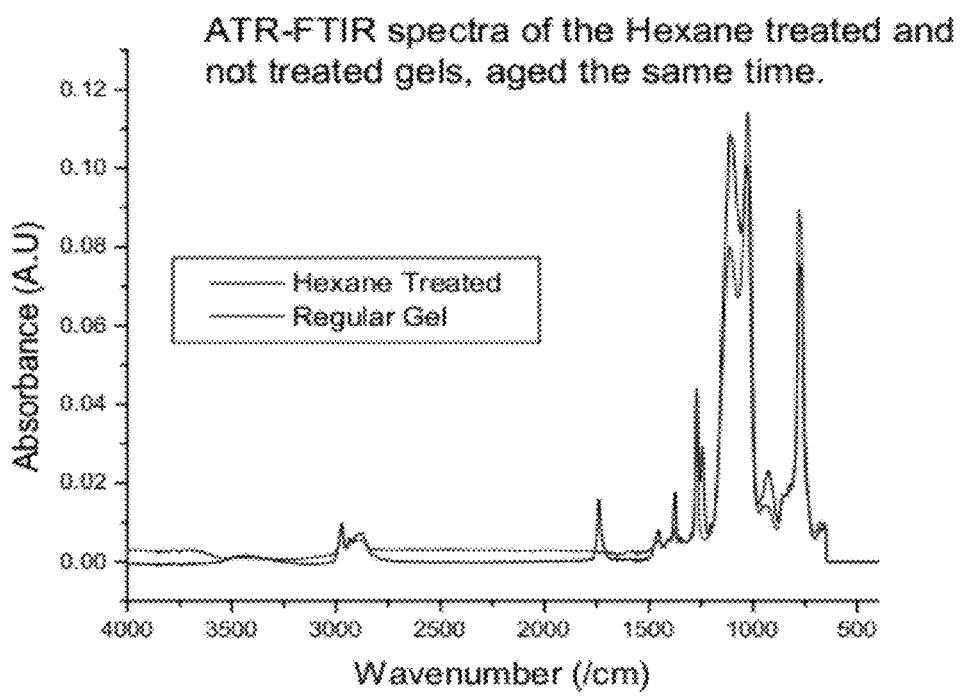
FIG. 12 is an ATR-FTIR spectra of the Hexane treated and untreated gels aged the same time as described in Example 5.

Nanoparticles were obtained directly from a gel prepared as set forth in Example 1 except that the gel was treated with n-hexane. n-Hexane treatment of the gel results in an effective dehydration of the gel thereby freezing the crosslinking reactions occurring within the gel. Solutions were poured into glass Petri dishes and allowed to gel. The gels were later soaked in hexane for a 12 hour period following which excess Hexane was decanted. FIG. 12 shows the ATR-FTIR spectra of the hexane-treated and not treated-gels aged the same time.

Although the gels were aged the same time, in the case of the hexane treated gel, the extent of cross linking (evident from the twin peaks in the region 1100-1000/cm) is considerably reduced. Also, regular gels crack over time as the gel shrinks, oozing out the solvent and PPG in the process and gets densified. This was not observed in the case of the hexane treated gel.

Figure 13:
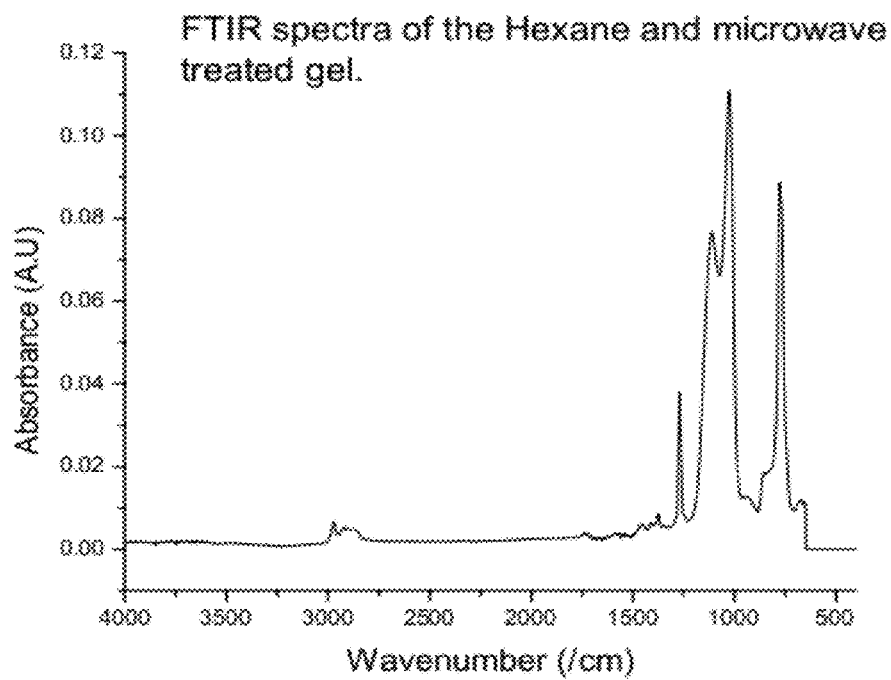
FIG. 13 is an ATR-FTIR spectra of the microwave treated gel as described in Example 5.

In order to crosslink the particles fully before extracting them from the gel, the gel was placed in a conventional microwave oven and microwaved for 5 minutes. Microwaving regular gels under similar conditions results in a phase separation between the liquid and the solid parts; this appears to be due to the accelerated interparticle crosslinking within the gel. However, this behavior was not observed for the hexane treated gels suggesting that the microwave treatment resulted in the intra particle crosslinking while the particles remained separated from each other. No cracking of the gel was observed even after the microwave treatment. FIG. 13 shows the ATR-FTIR spectra of the microwave-treated gel.

Figure 14:
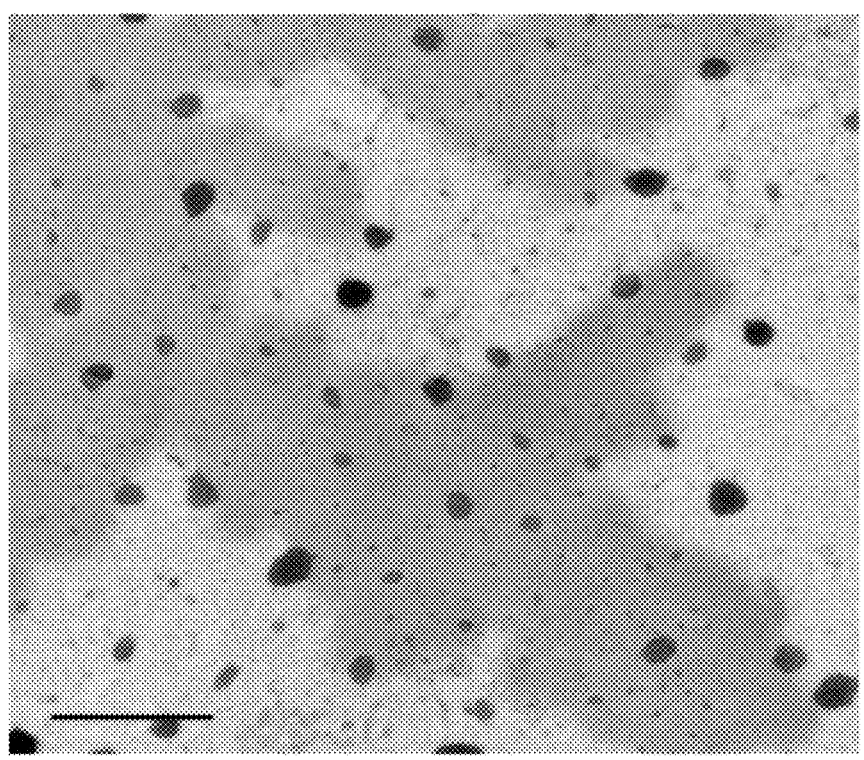
FIG. 14 is a TEM image of the particles obtained from hexane treated gel as described in Example 5. Scale bar is 100 nm.

Extraction of the particles from the gel was accomplished by crushing and grinding the microwave treated gel and dissolving the resultant white powder in surfactant solution. The solution was filtered with a 0.2 micron filter to obtain a clear dispersion. FIG. 14 gives the TEM of the obtained particles, with the scale bar being 100 nm. As can be seen from the TEM, there are bigger particles possibly due to agglomeration as well as smaller particles 10 nm (same size as obtained from films).

Example 6

Organosilicate Nanorod Networks

Nanoporous Organosilicate Nanorods

It has been observed that aging of the nanoporous organosilicate precursor solutions at ambient conditions results in the formation of gel with time. The gelation occurs within 7 days time and is strongly dependant on the amount of the evaporated solvent as well as the amount of —OH content in the PMSSQ starting material. Greater the amount evaporated, quicker the solution gels. Increased —OH content in the PMSSQ starting material results in a quicker gelling precursor solution. The gels have been dried to remove all the solvents and washed and filtered with ethanol to remove most of the PPG. These gels are later subjected to calcinations to result in a fine white powdery substance. When examined under a TEM, it has been observed that the white substance consists of a network of nanorods which can be separated if sonicated in a suspension.

Figure 15A:
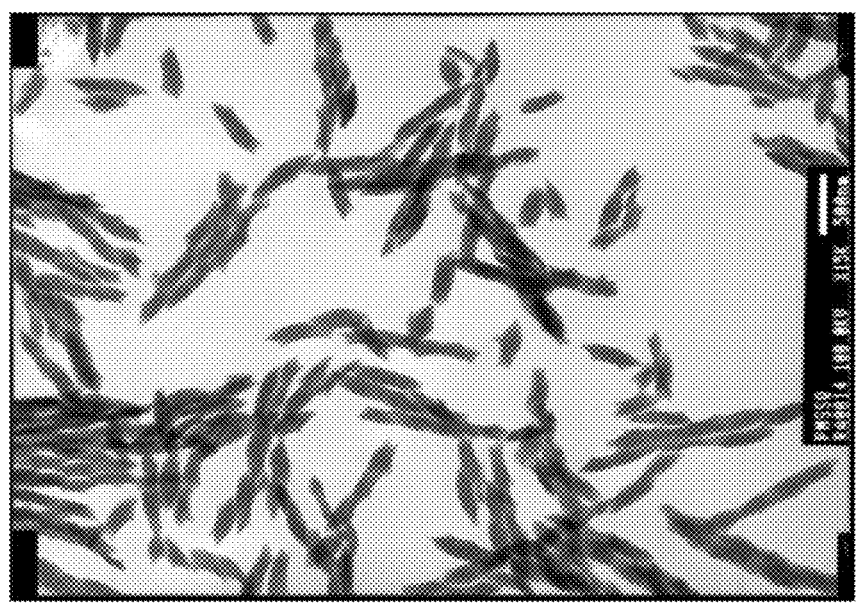
FIGS. 15A and 15B are TEM images of the microtomed samples of the processed gel: A, completely formed nanorod structures, and B, intermediate structure (scale bar=200 nm) as described in Example 6.
Figure 15B:
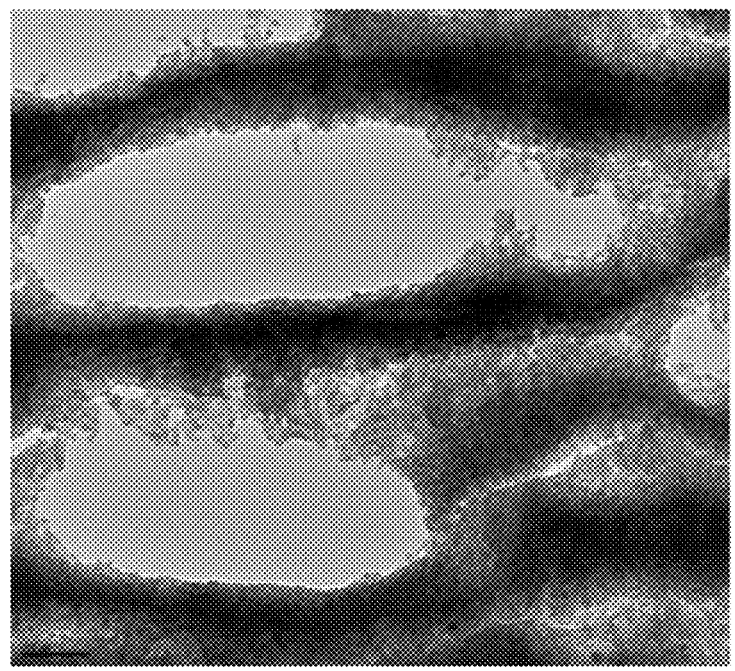
Figure 16:
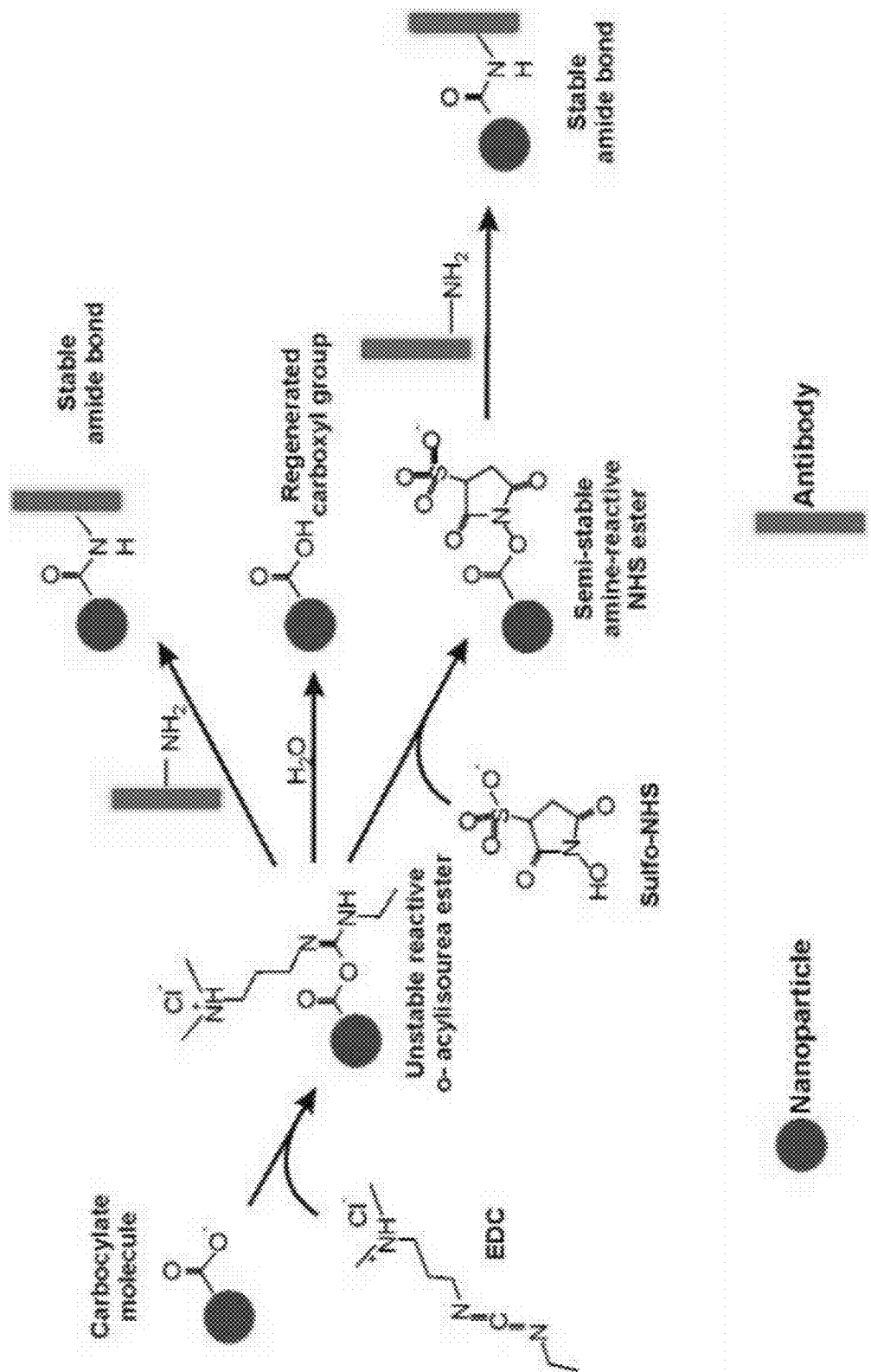
FIG. 16 is a schematic of the conjugation protocol of NPO and as described in Example 9.

Nanorods and nanorod networks can be obtained from the gels by aging the gels sufficiently to let the nanoparticles come together and form networks. The gels are crushed and washed repeatedly with ethanol to remove excess PPG and calcined to remove the PPG and fully crosslink the network. The obtained powders are later sent for microtoming to be observed in TEM. FIG. 15 gives the TEM of the microtomed samples. FIG. 15A (scale bar=500 nm) is from a dense gel aged for a long time while 15B (scale bar=200 nm) is from a fresh gel.

Example 7

Substrate Surface Dependant Properties of the Films

Plasma Treatment of Nanoporous Silicate Films

Low power oxygen plasma treatment of a primary nanoporous organosilicate film followed by deposition of a secondary organosilicate film has been found to collapse the pores of the secondary coating. In a typical process, a thinner film of the primary coating is applied first and heat treated to 470° C. for 2 minutes. This film is later treated to a low power oxygen plasma treatment and immediately a secondary nanoporous organosilicate film (thicker film, no dilution) is spin coated over the primary film and processed at 470° C. for 5 minutes. It has been noted that the dielectric properties of the nanoporous silicate films for the films prepared on plasma treated nanoporous silicate surfaces is altered. The refractive index of the films has been found to increase to the inherent refractive index of the organosilicate films suggestive of the collapse of the pores.

Table gives the refractive index and thickness values of films prepared by normal deposition process and on plasma treated nanoporous silicate surface. The hydroxy groups on the substrate surface have been shown to have an effect on the dielectric as well as the optical properties of the final film.

TABLE 1

Refractive index and thickness of films with and without adhesion layer

| Sample | Adhesion layer | Annealing conditions | Thickness | Refractive index |
|---|---|---|---|---|
| 1 | No | Hot plate 470 C. 5 mins | 760 nm | 1.149 |
| 2 | Yes | Hot plate 470 C. 5 mins | 1150 nm | 1.37 |
| Adhesion layer | | Hot plate 470 C. 5 mins | 201 nm | 1.38 |

Similarly, the coatings on glass substrates have been shown to yield films with properties different from those deposited on silicon substrates. Films deposited on piranha treated glass substrates have been shown to exhibit higher refractive indices than films deposited on glass substrates cleaned with organic wash.

Example 8

Dye Incorporated Organosilicate Nanoparticles

Two solutions (solution of 50% by wt PMSSQ in ethanol and 50% by wt PPG 424 in ethanol) were prepared first as described in Example 1. Rhodamine 590 (0.024 g), a dye, was introduced into solution containing PMSSQ and sonicated to ensure complete dissolution. The solutions were mixed together and subjected to an evaporation step by heating it in an open beaker under stirring at 70° C. Approximately 10% of the solvent was evaporated, and the combined solution was transferred to a bottle, sealed and allowed to cool to room temperature. To obtain the nanoparticles, the combined solution was spin coated onto silicon/glass substrates and heated at 250° C. for 30 seconds to further crosslink the PMSSQ nanoparticles and partially burn-out the PPG.

If desired, the surface functional groups which are predominantly Si—$CH_3$ can be readily modified to Si—OH or Si-carboxy groups by subjecting the films to a brief low power oxygen plasma treatment step (for example, 2 minutes of exposure to a 6 W oxygen plasma). Other plasmas like ammonia plasma creates Si-amine groups. The hydroxy, carboxyl, or amine groups may then be used for immobilization of bioprobes or other functional moieties. The films may then be scraped off and redispersed in DI water for further use.

The choice of dyes depends on the charge on the dyes. For example, rhodamine 6G has a positive charge in solution. Most of rhodamine prospects and derivatives such as rhodamine 560, 575, 590, 610 and 640 and 6-Carboxyl-X-Rhodamine (ROX), Tetramethyl-6-Carboxyrhodamine (TAMRA) and Tetramethylrhodamine-5-(and-6)-isothicyanate (TRITC) are suitable for this requirement. Other dyes include, for example, cyanine (cy 3, cy 5 and cy 7), HIDC, LDS 698, oxazines (oxazin 720, 725, and 750), Texas Red, DvLight Fluors, HvLight Fluors, Alex Fluors, etc. Moreover, a dye without any charge could further be modified to have a positive charge by doping it into the nanoparticles. Dyes that may be treated in such a manner include, for example, Coumarins (Coumarin 440, 445, 460, 480 and 481) and their derivatives (7-Hydroxycoumarin-3-carboxylic acid, 7-Hydroxycoumarin-3-carboxylic acid, etc.), fluorescein isothiocyanate (FITC), etc. The dye itself is not particularly critical to the invention, and such dyes are well understood in the art, such as from U.S. Pat. No. 7,169,584 (Tables 1 and 2).

Example 9

Conjugation of Nanoparticles with Antibodies

Nanoparticles containing rhodamine 590 or other dye and derivatized to contain carboxy or hydroxy groups as described in Example 8 may be linked to antibodies (polyclonal, monoclonal, or functional fragments thereof) or other biological molecules. Antibodies may be linked to the particles, for example, by reaction of the carboxyl groups present on the nanoparticle with amino groups of the antibodies, for example, by a standard method employing EDC and Sulfo-link (from Pierce Biotechnology) to conjugate the nanoparticles to specific antibodies. The resulting bond is a relatively strong and stable bond with minimal distance between the antibody and the fluorescent particle rendering the particle suitable for cell internalization. FIG. 13 depicts a reaction scheme for producing the conjugates.

Figure 17:
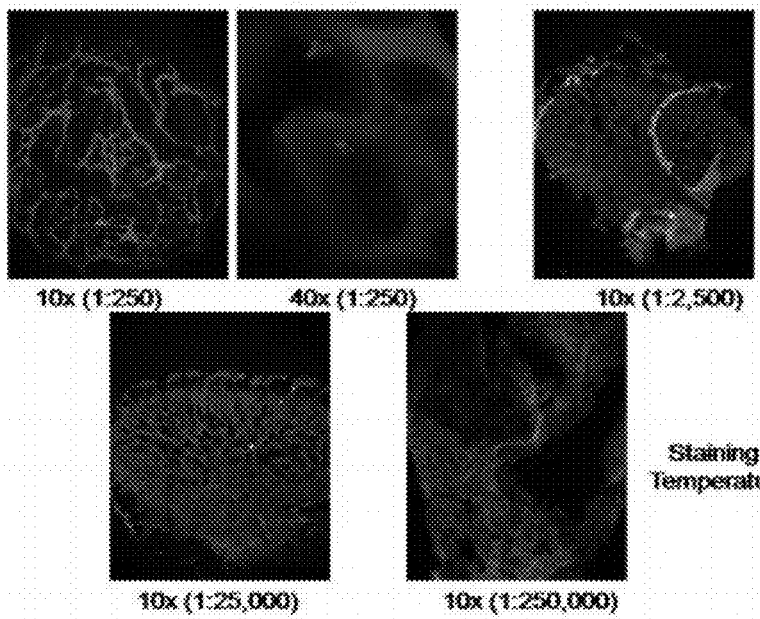
FIG. 17 are photographs depicting immunofluorescences of chick heart staining using an antibody (against laminin-1) conjugate with Rhodamine doped nano-particles as described in Example 9.
Figure 18:
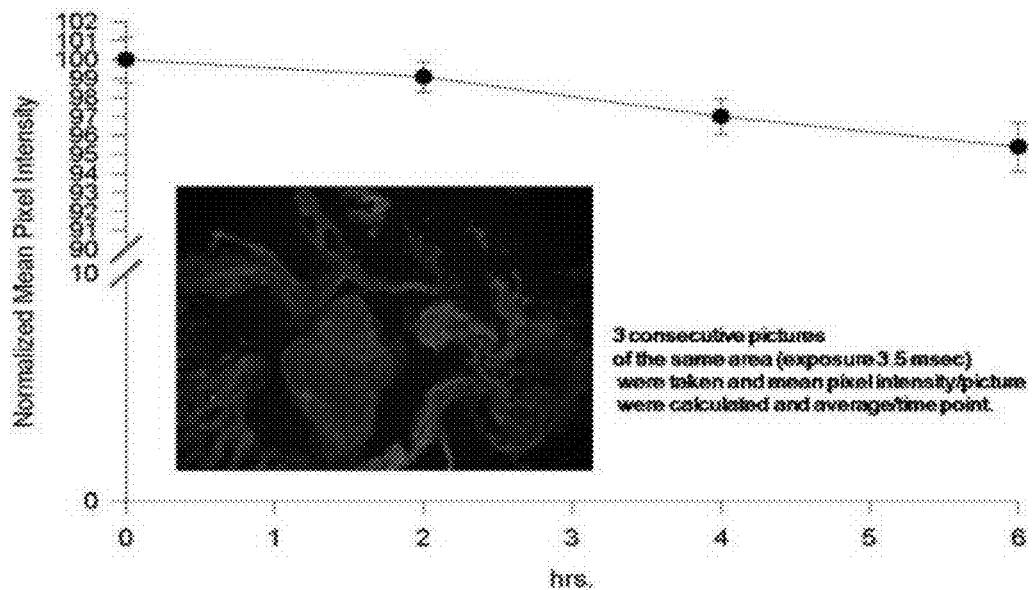
FIG. 18 is a time dependent decay in fluorescence of a tissue stained with an antibody conjugated with doped Rhodamine nanoparticles as described in Example 9.

Preliminary studies using an antibody against the laminin-1 in chick hearts showed an unexpected increase in fluorescence efficiency. This antibody is normally used in a standard two-step procedure where optimal conditions have been reported a 1:250 dilution of the primary antibody in an overnight incubation protocol, followed by the uses as a secondary antibody. With conjugation of the primary antibody to a particle filled with Rhodamine 590, at least 1000-fold increase in fluorescence was observed. Pairs of tissues at room temperature were able to be stained for 30 minutes with 1:250,000 dilution, without loss of resolution (see FIG. 17). A graph depicting the time dependant decay in fluorescence of a tissue stained with the antibody conjugate appears in FIG. 18.

Figure 19:
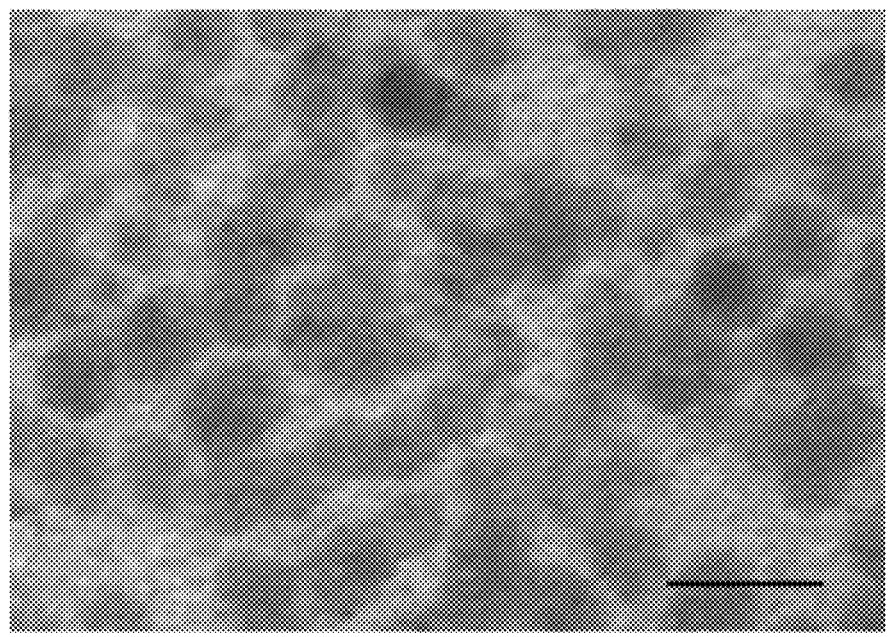
FIG. 19 is a TEM image (scale bar=20 nm) of the rhodamine 6G Doped NPO particles derived from the film as described in Example 9.

To further evaluate the stability of the fluorescence particles over long periods of time, a single slide was exposed under a 150 W Hg lamp for 6 continuous hrs. Three pictures were taken every hour, and the mean pixel intensity for each picture was evaluated and averaged. This is shown in FIG. 19. Rhodamine typically exhibits a marked rapid bleaching (reduction of fluorescence intensity which depends upon the intensity of the light source and the exposure time); in this study, however, the tissue immune-staining with the antibody, conjugate with our nanoparticles, exhibited an extremely low degree of bleaching.

Example 10

Conjugation of Nanoparticles with Biologics

To better understand the effects of clustering or binding materials inside or in the surface of our nanoparticles/rods, several different crosslinkers were tested. Preliminary data show an effective crosslinking of nanoparticles with antibodies using a two step EDC-sulphoNHS system. The resulting complex results in the formation of a stable and strong linker between the nanoparticles and the antibody with an amine group. However, in different conditions, other types of crosslinkers could be necessary to combine different pharmaco-compounds with our particles. These crosslinkers should be able to react with a large arrangement of reactive groups and with different lengths/sizes.

For example, dye-doped nanoparticles could be linked to compounds on the surface of the particle/rod and antibodies simultaneously. The application of this complex into a system will allow the binding of the antibody with a specific cell/tissue type, the dye inside of the particle will be useful to visualize the target and the compound attached to the rest of the particle could be used to treat or modify the cell. This complex series of interactions could be useful in the treatment of diseases, such as, for example, cancer, where a particle could be crosslinked to a specific antibody or peptide that recognizes primarily the material specifically expressed on the surface of the cancer cells. Once the particle is localized on the surface of the cell/tissue, a shock wave generator can be employed to propel the nanomaterials inside the cells where their cargo, inside or on the surface of the nanomaterial, could be delivered to the cell/tissue. Another possible alternative is to dope the nanoparticles with biological crosslinkers. These sequences of amino-acids (crosslinkers) could be degraded by enzymes that are inside the cells, allowing the release of their cargo. A similar system has been used to efficiently transfer and deliver fluorescent dyes, such as Fura 2-AM, BCECF AM, etc. These materials carry acetoxymethyl (AM) and acetate esters. The modification of the carboxylic acids with AM ester groups results in an uncharged molecule that can permeate cell membranes. Once inside the cells, the lipophilic blocking groups are cleaved by nonspecific esterases that leak out of cells more slowly than their parent compound. Frequently, hydrolysis of the esterified groups is essential for binding of the target ion. In some cases, the AM ester is colorless and nonfluorescent until hydrolyzed (e.g., calcein AM). This property is useful in diagnosing spontaneous hydrolysis during storage.

Example 11

Fabrication of the Liquid Core Waveguide

Figure 20A:
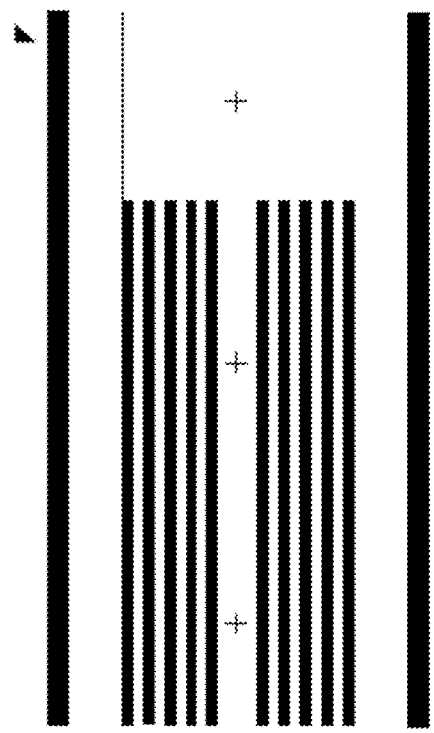
FIG. 20 is a schematic depiction of a mask design for patterning channels on silicon substrates (FIG. 20A) and glass substrates (FIG. 20B) as described in Example 11.
Figure 20B:
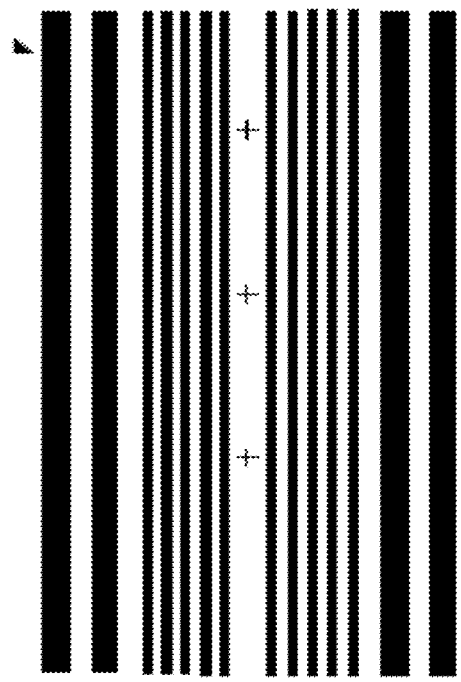

Teflon was used as the hydrophobic coating. Patterning of Teflon was accomplished through an aluminum liftoff process described in detail below. Nanoporous organosilicate films were first deposited on silicon and amorphous silicon (<5 nm) coated borosilicate glass substrates. A 10 s HF (10 DI:1 HF) dip was performed immediately prior to the nanoporous organosilicate coatings on silicon to remove the native oxide. A 300 nm thick aluminum film was later sputter coated on the nanoporous organosilicate coated substrates. The patterning of the channels was performed on the aluminum layer so that the underlying nanoporous organosilicate film was not exposed to photoresist at any instant of time during the whole process. Channel patterns were fabricated on top of the aluminum coated substrates using a positive photoresist (S1813). The masks for the fabrication of the channels is shown schematically in FIG. 20. The channels fabricated were 500 micron in width. The thick bars on either end (1 mm wide) were used for alignment of the bottom (silicon) to top (glass) substrates for the final device.

Figure 21:
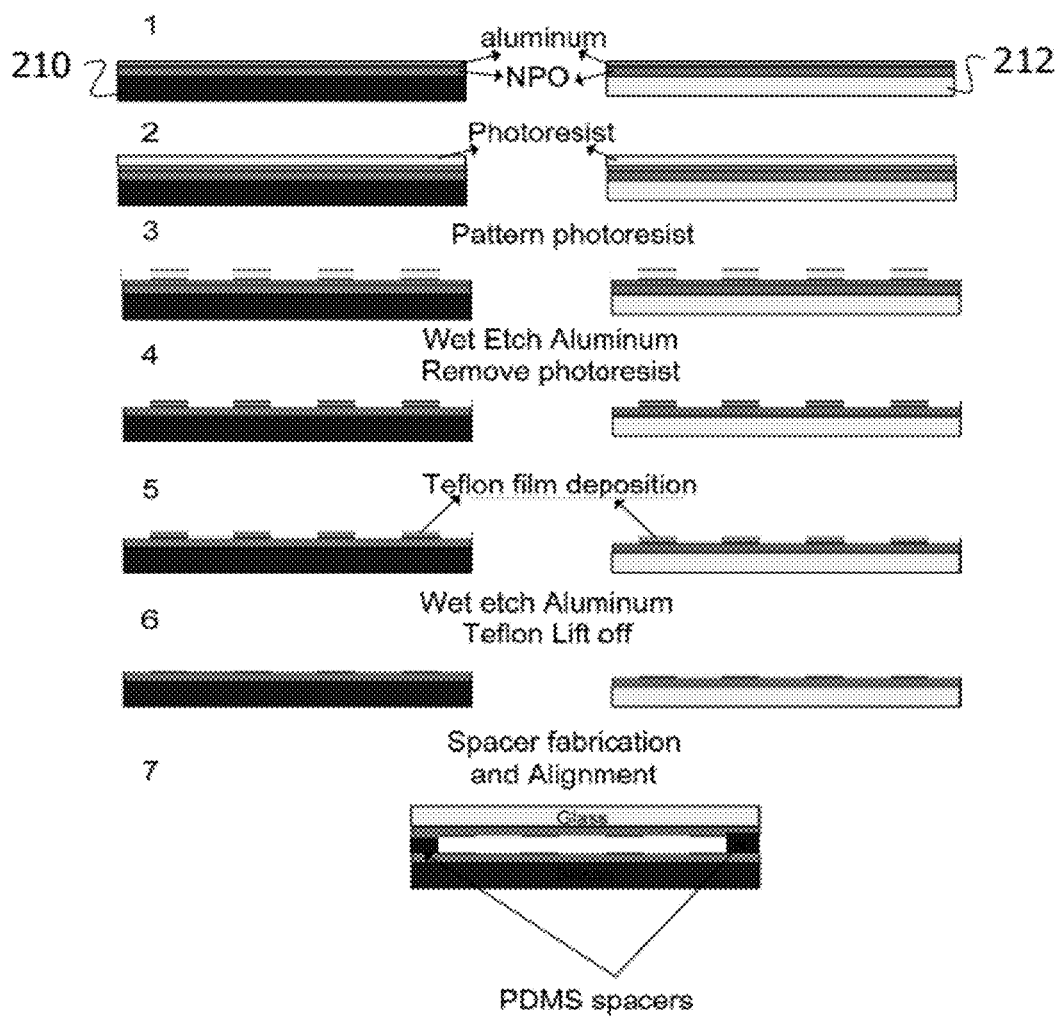
FIG. 21 is a fabrication flow chart for the liquid core waveguide as described in Example 11.

The fabrication flow chart for the process is given in FIG. 21, with the silicon substrate at 210 and the glass substrate at 212. After the patterning of photoresist with the above masks, the substrates were dipped in an aluminum etchant solution (85% Phosporic acid, 5% Nitric acid, 5% acetic acid, 5% DI water at 70 C) to pattern the aluminum. At this point, the channels to be used for the liquid core waveguide are the regions containing aluminum channels. Photoresist was then washed off with acetone following the aluminum etch.

Teflon Film Deposition

Patterning Teflon can be challenging as the surface of Teflon has such low surface energy that no material readily sticks to it, including photoresist. Thus, the lift-off process for Teflon patterning was employed. Since aluminum was used instead of photoresist for the lift off process and as it is uneconomical to have very thick films of aluminum (>1 micron) to achieve lift off, an ultra thin coating of Teflon (<10 nm) was used so that the lift-off process could be performed with a 300 nm thick aluminum patterns. The aluminum patterned substrates from the previous step were first coated with a thin (monolayer) of FSM (fluoro silane coating, FSM 660, 3M Corp.) and baked at 95 C for 10 mins as prescribed by the manufacturer. A 0.05% Teflon solution (Teflon AF 1600) was prepared in FC 75 solvent (3M Corp.) and films were spin coated at 3000 rpm for 30 s to obtain ultra thin coatings of Teflon (<10 nm thick). A 0.5% Teflon coating prepared in similar way gave a thickness of 40 nm. The surface properties are characteristic of Teflon surfaces, having contact angles with water ~120 degrees. The substrates were then heated at 135° C. for 5 minutes, 225° C. for 5 minutes and 300° C. for 10 minutes to cure Teflon and improve its adhesion properties with the substrates. After the heat treatment step, the substrates were allowed to cool down before being taken off from the hot plate for further processing.

The Teflon coated substrates were later dipped in the aluminum etchant solution to lift off aluminum thereby pattering Teflon. Thus, in effect, the substrate has been patterned with hydrophobic-hydrophilic regions where the hydrophilic regions (channels) will be utilized for the liquid core waveguide.

Spacer Fabrication

For the initial prototype design, PDMS spacers were fabricated and used. For the future devices, SU 8 spacers will be utilized such that the SU 8 waveguides coupling the liquid core waveguide as well as the spacers will be defined in a single lithography step. For the fabrication of the PDMS spacers, an adhesive tape of known thickness was used and stuck around the perimeter of a glass substrate. 1:10 PDMS mix was then poured into the well. Excess PDMS was carefully removed by traversing a flat blade across the surface of the glass substrate such that the level of PDMS in the well was flush with the top of the adhesive tape. Thus, the thickness of the spacer is defined by the thickness of the adhesive tape. PDMS was chosen in this case as the surface of PDMS is tacky which would prevent substrates from moving once they were aligned.

Characterization of the Liquid Core Waveguide.

Loss characterization of the waveguides was performed by filling the channels with a 0.05 mM concentration flourescien dye. Approximately 10 microliters of the dye was taken introduced into the hydrophilic channels of the waveguide. Capillary action from the hydrophilic channels together with the hydrostatic force pushes the solution to completely fill the channels. The channels were transversly illuminated with a Blue LED light (470 nm wavelength). A microscopic objective (20x) was used to focus the light onto the channels. The excitation source was moved through the length of the waveguide and the fluorescence counts were recorded using a spectrometer (Ocean Optics, USB 4000). A 600 micron core fiber optical cable coupled to one end of the channels was used to collect the fluorescence signal from the waveguide into the spectrometer. For these experiments, a PDMS spacer having a thickness of 150 microns (as defined by the adhesive tape) was used.

Figure 22:
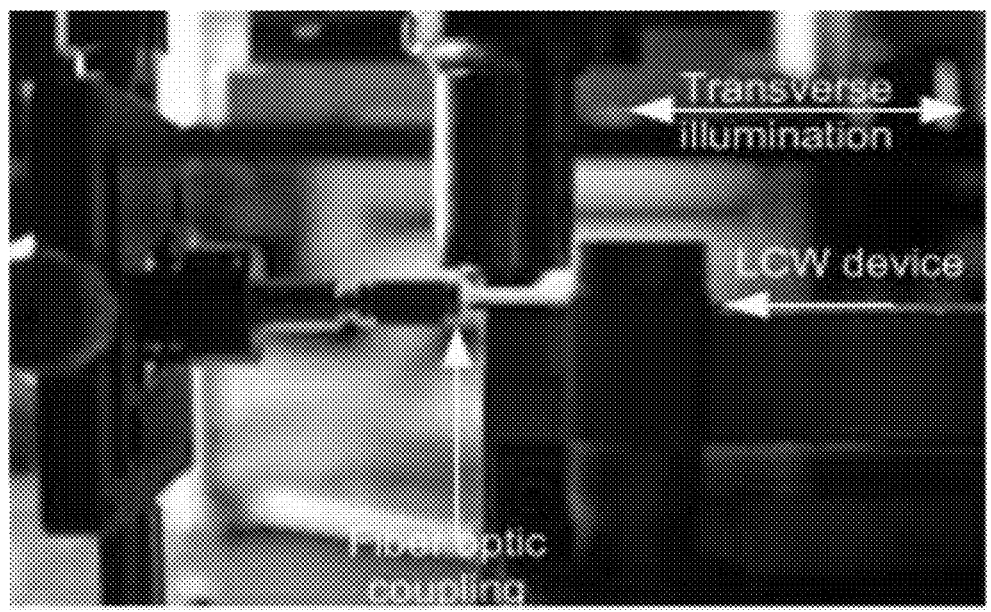
FIG. 22 is a photograph of the experimental setup for loss characterization of the prototype liquid core waveguide as described in Example 11.
Figure 23A:
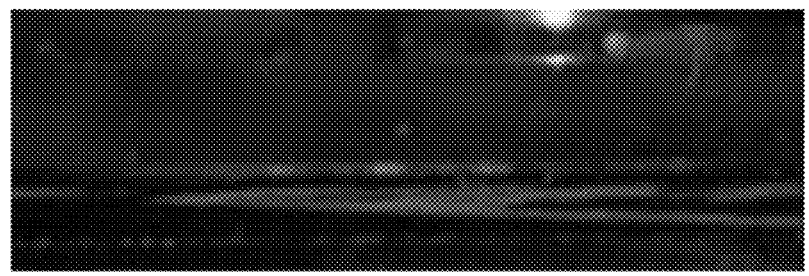
FIG. 23 is a photograph, illustrating the waveguiding effect using a prototype liquid core waveguide as described in Example 11.
Figure 23B:
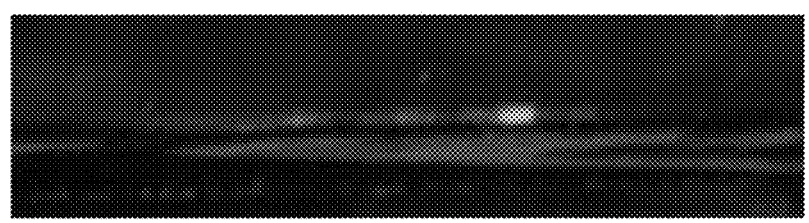
Figure 23C:
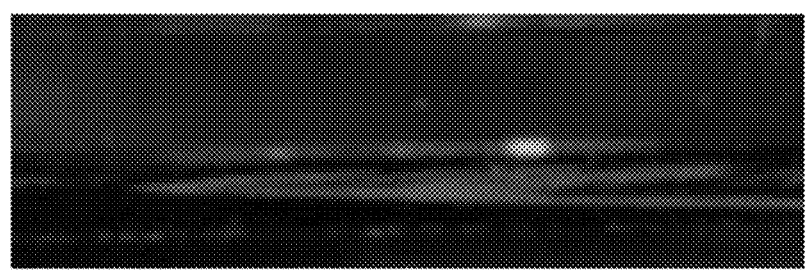
Figure 23D:
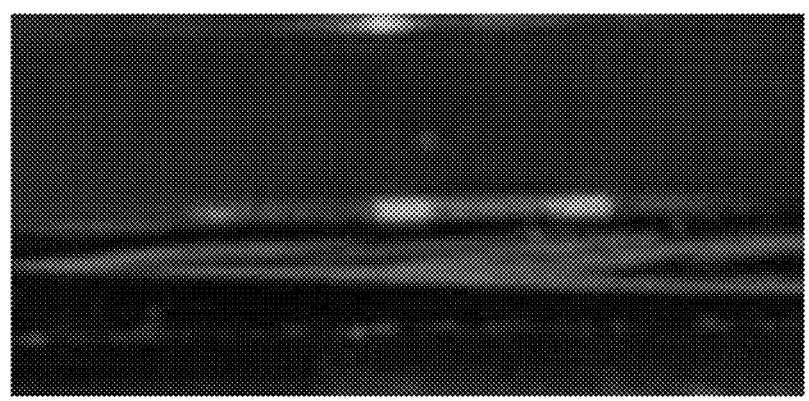
Figure 23E:
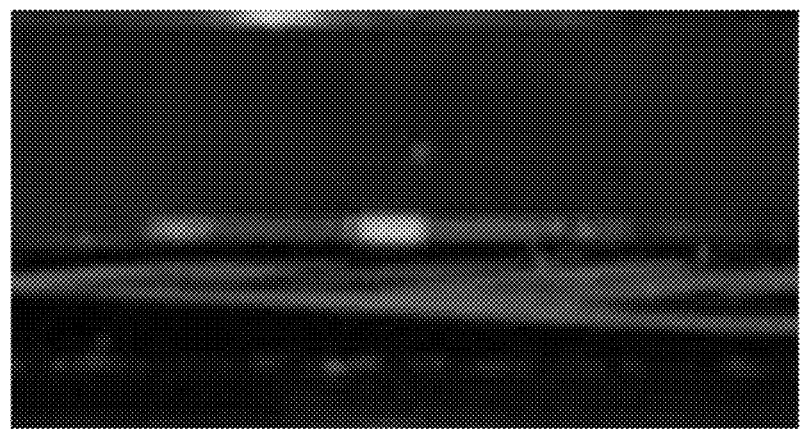
Figure 23F:
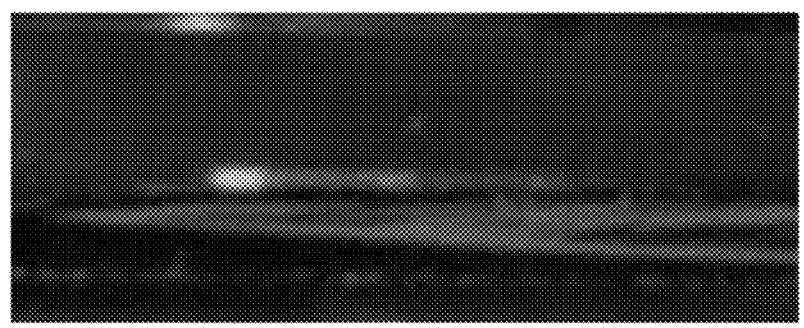
Figure 23G:
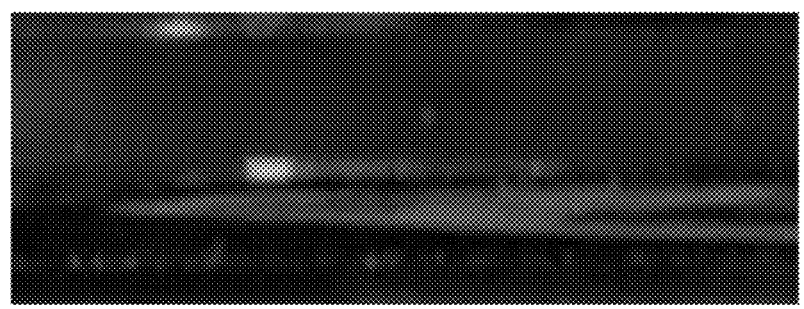
Figure 24:
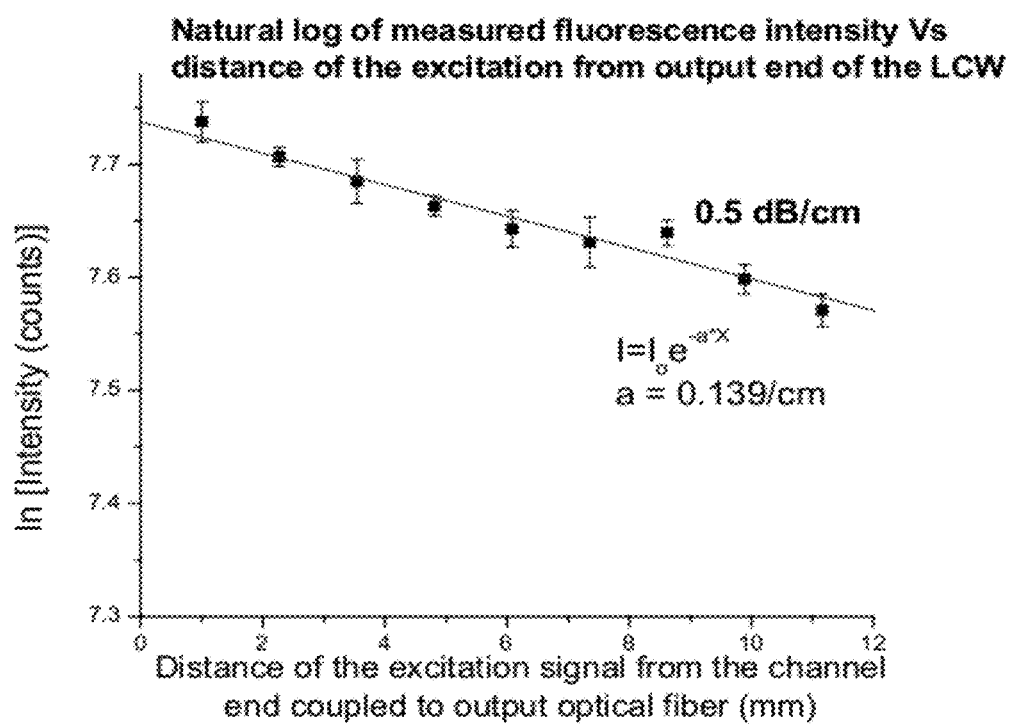
FIG. 24 is a graph showing the loss characteristics for the prototype liquid core waveguide as described in Example 11.
Figure 25A:
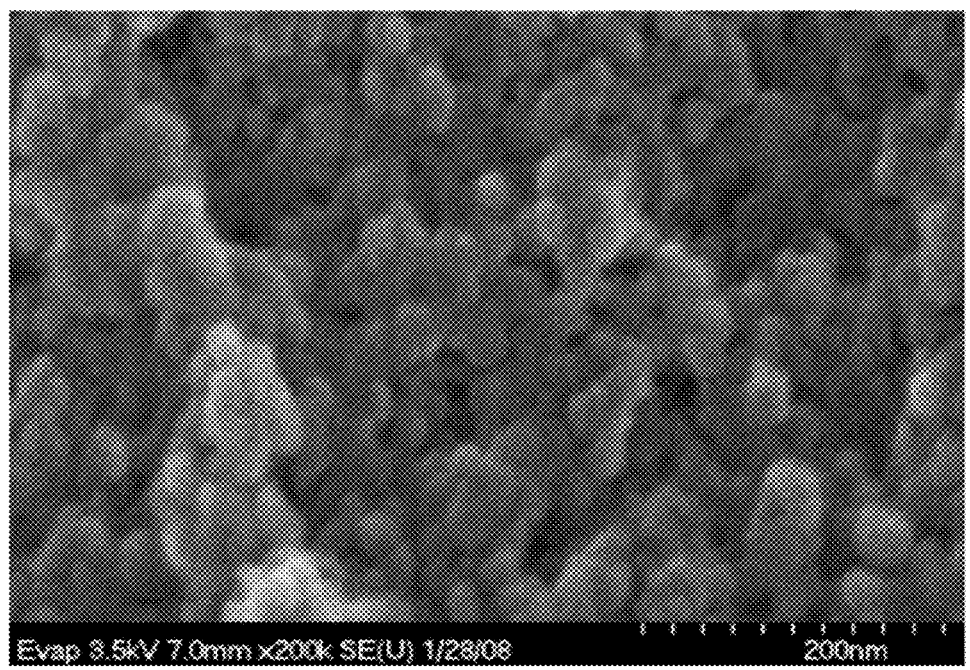
FIGS. 25A-25F are a series of SEM micrographs of the nanoparticulate organosilicate films obtained as described in Example 12.
Figure 25B:
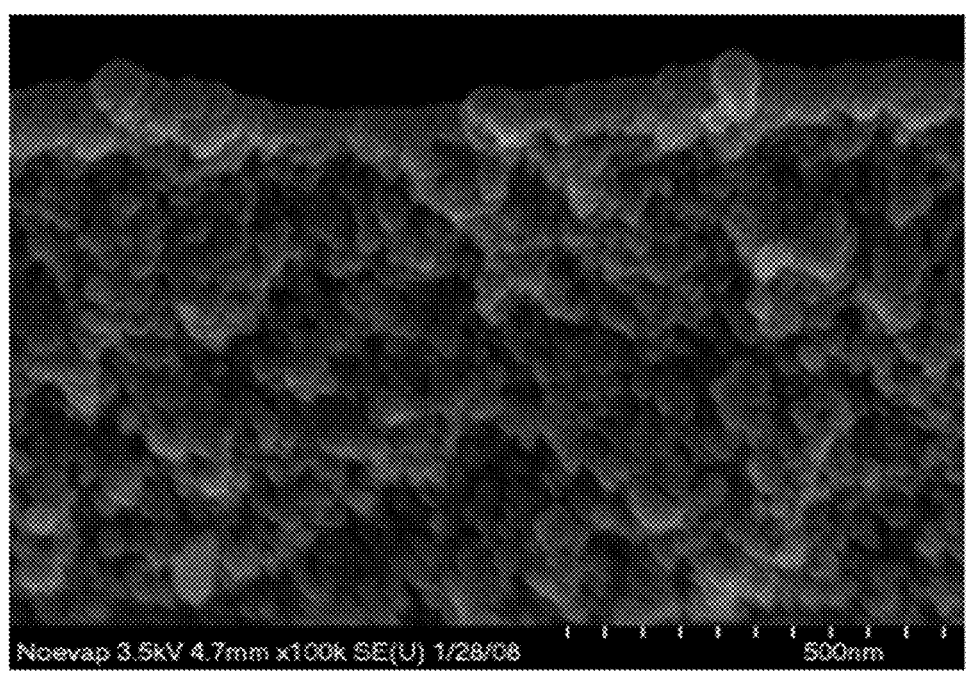
Figure 25C:
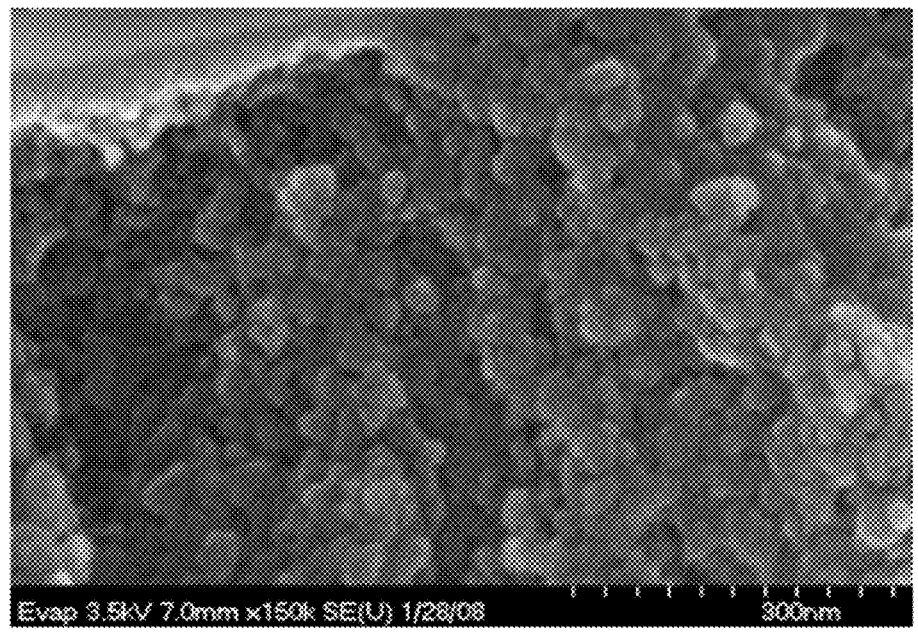
Figure 25D:
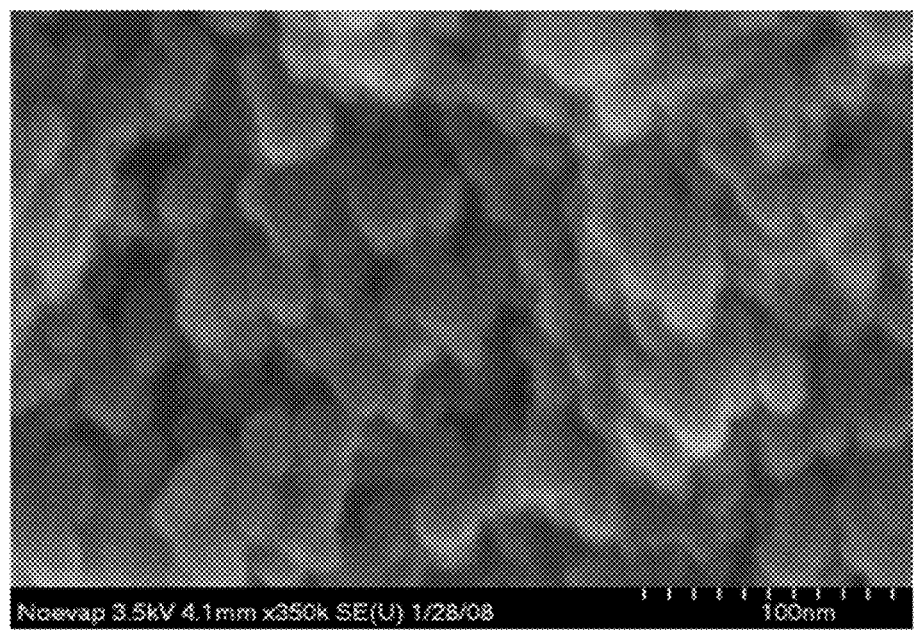
Figure 25E:
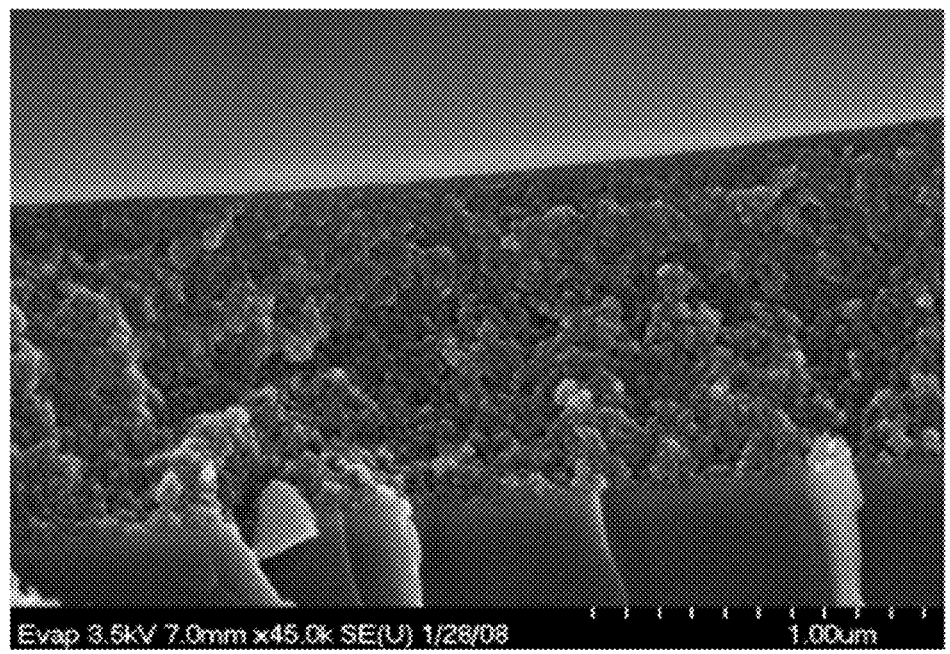
Figure 25F:
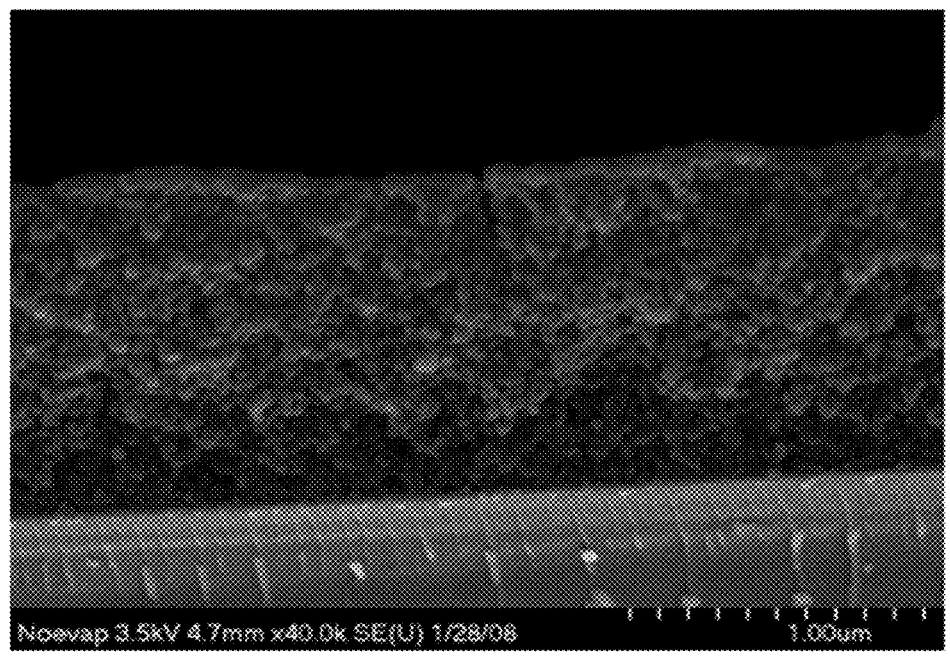

FIG. 22 illustrates the experimental set-up for loss characterization and waveguide effect is illustrated in FIG. 23. The waveguide was illuminated transversally and the illumination source was moved across the width of the device traversing three liquid channels in the process. The plot of the loss characteristics of the waveguide is shown in FIG. 24. From the plots, the waveguide loss has been calculated to be about 0.5 dB/cm. Further reduction in the loss can be accomplished by the use of a high quality hard mask for patterning purposes.

Example 12

Figure 26A:
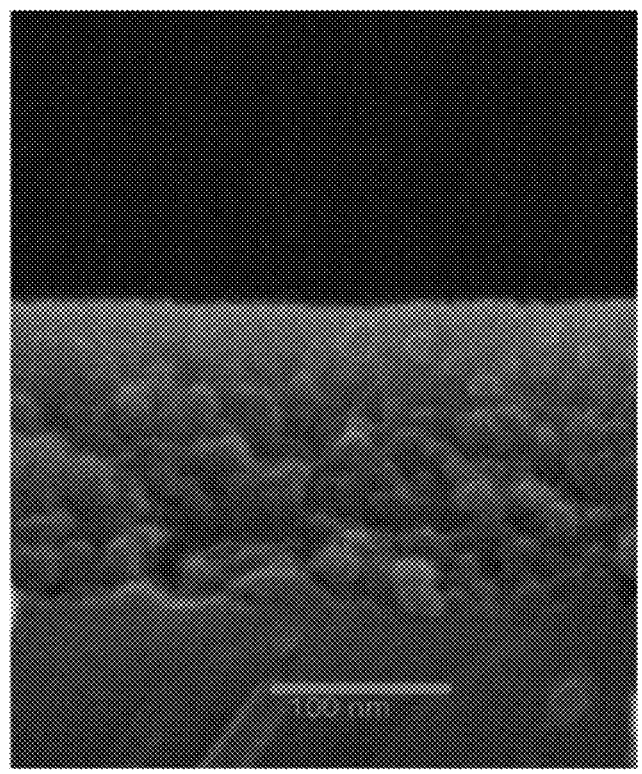
FIGS. 26A-26B are a series of SEM micrographs of the nanoparticulate organosilicate films obtained as described in Example 12.
Figure 26B:
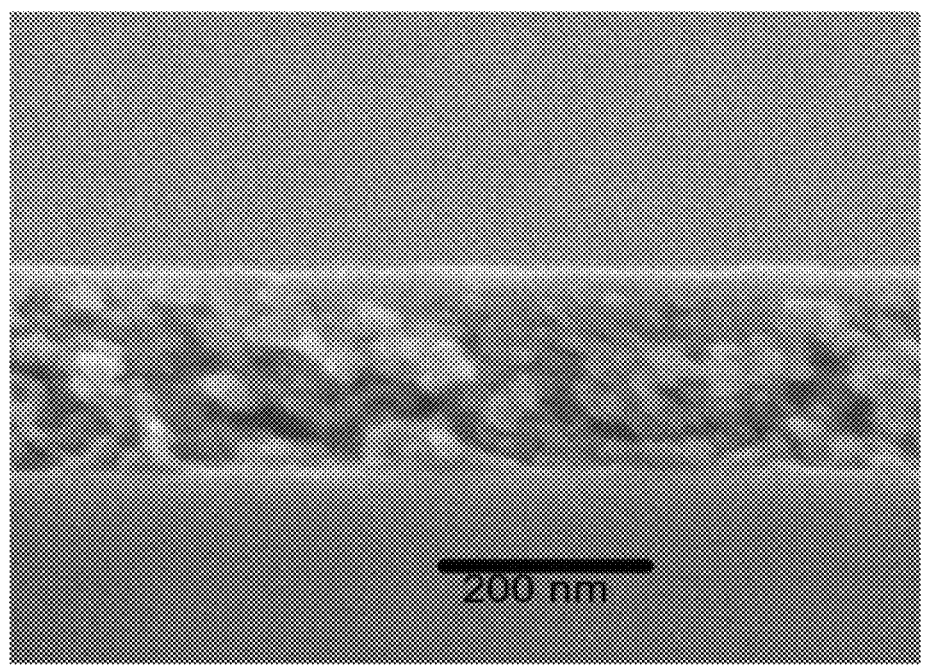
Figure 27A:
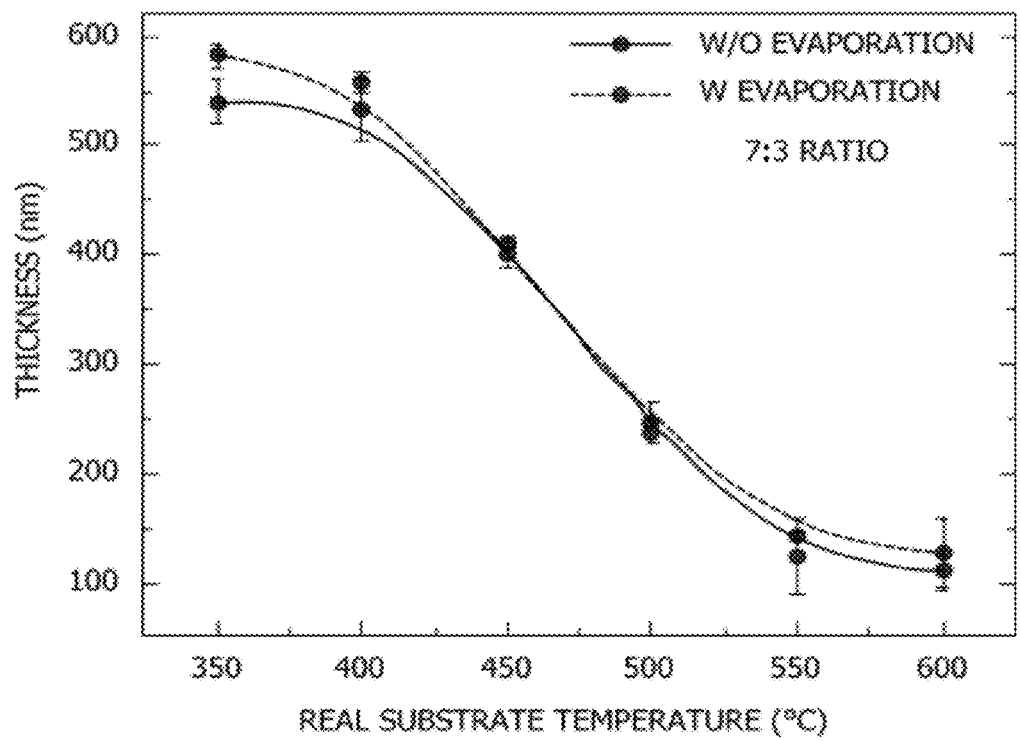
FIGS. 27A-27E are a series of graphs of thickness, refractive index and dielectric constant for films prepared as described in Example 12.
Figure 27B:
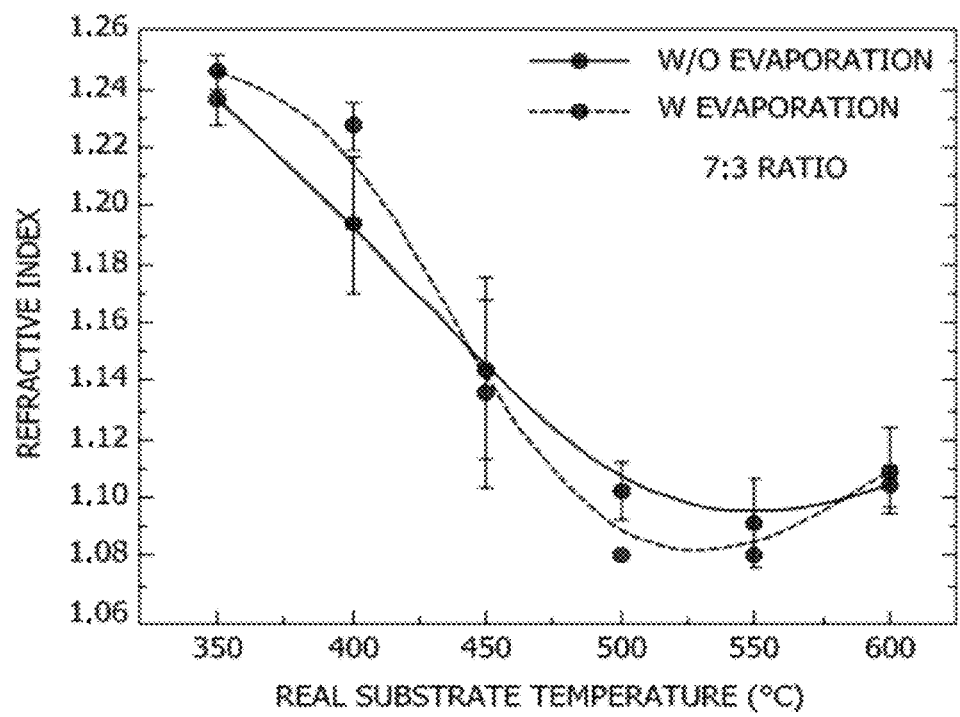
Figure 27C:
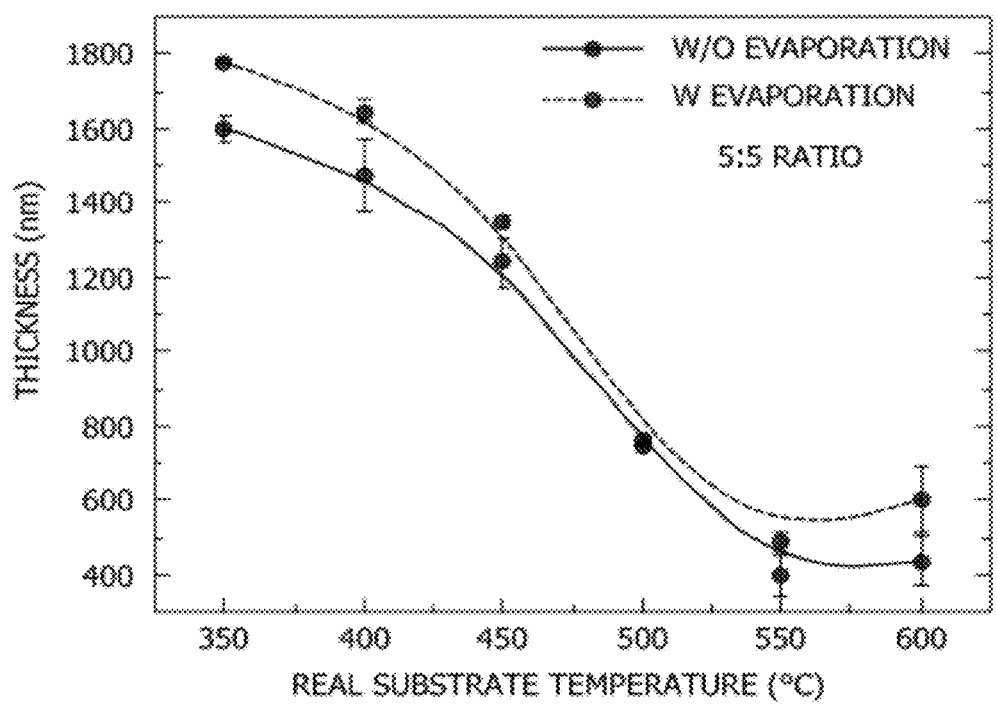
Figure 27D:
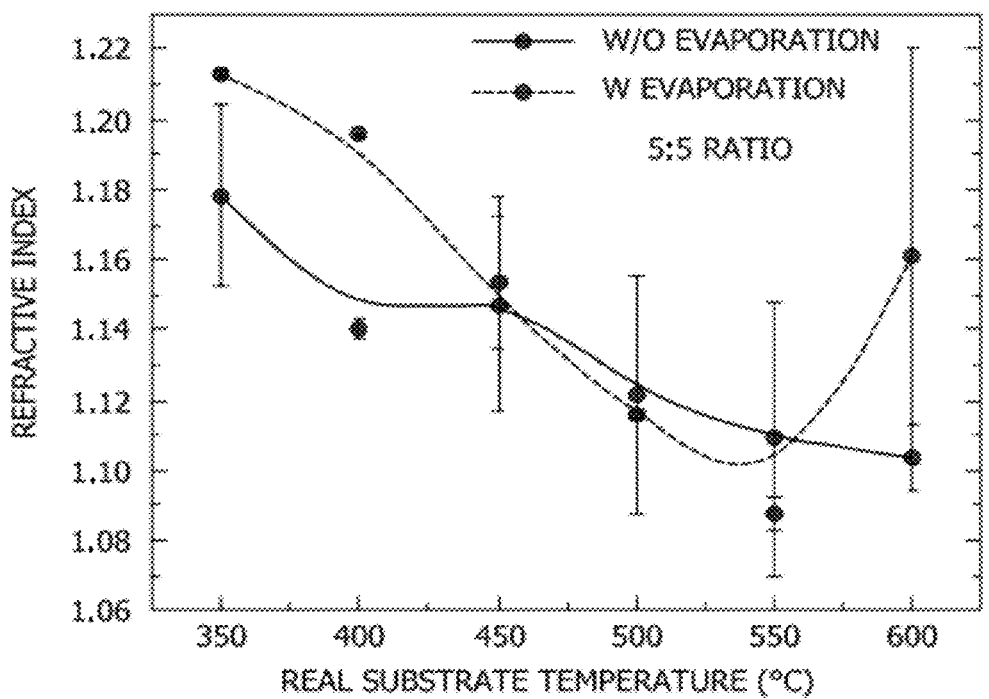
Figure 27E:
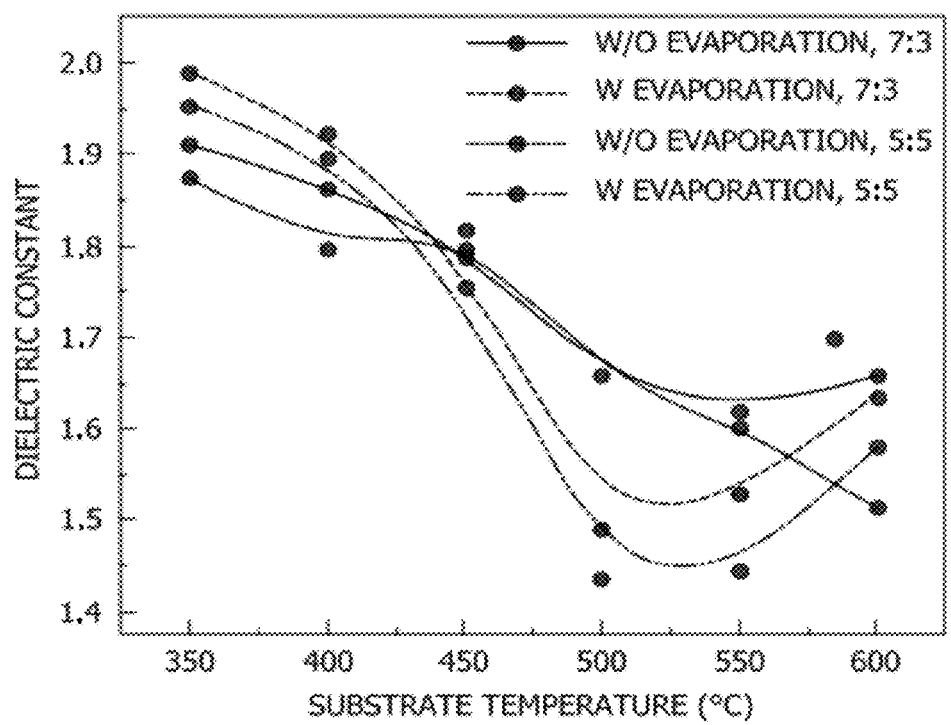
Figure 28A:
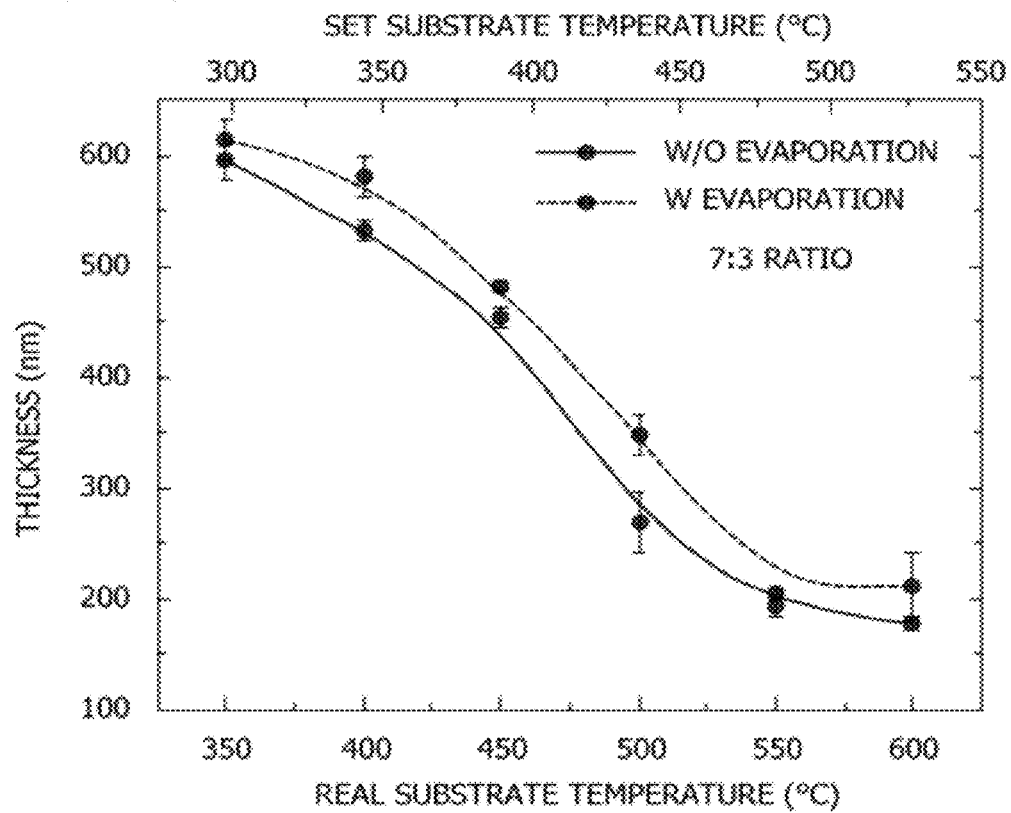
FIGS. 28A-28E are a series of graphs of thickness, refractive index and dielectric constant for films prepared as described in Example 12.
Figure 28B:
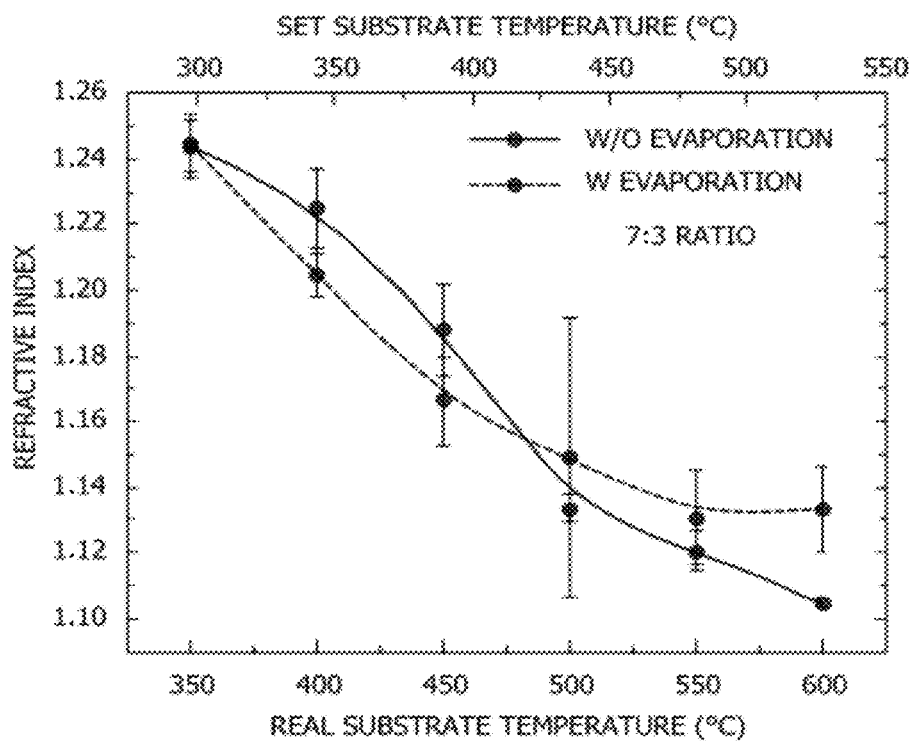
Figure 28C:
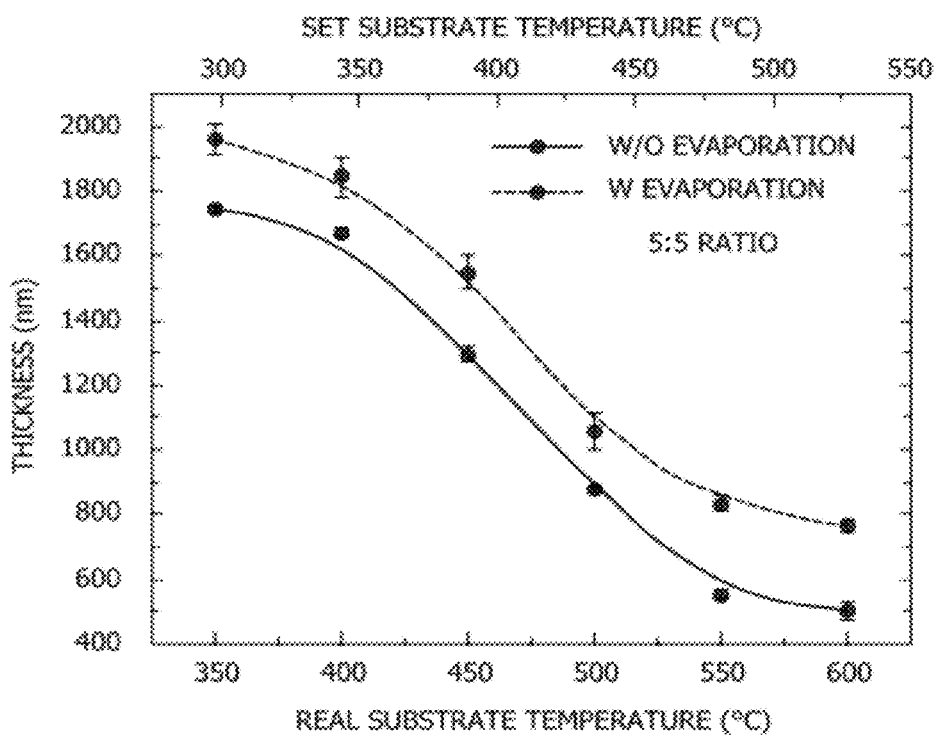
Figure 28D:
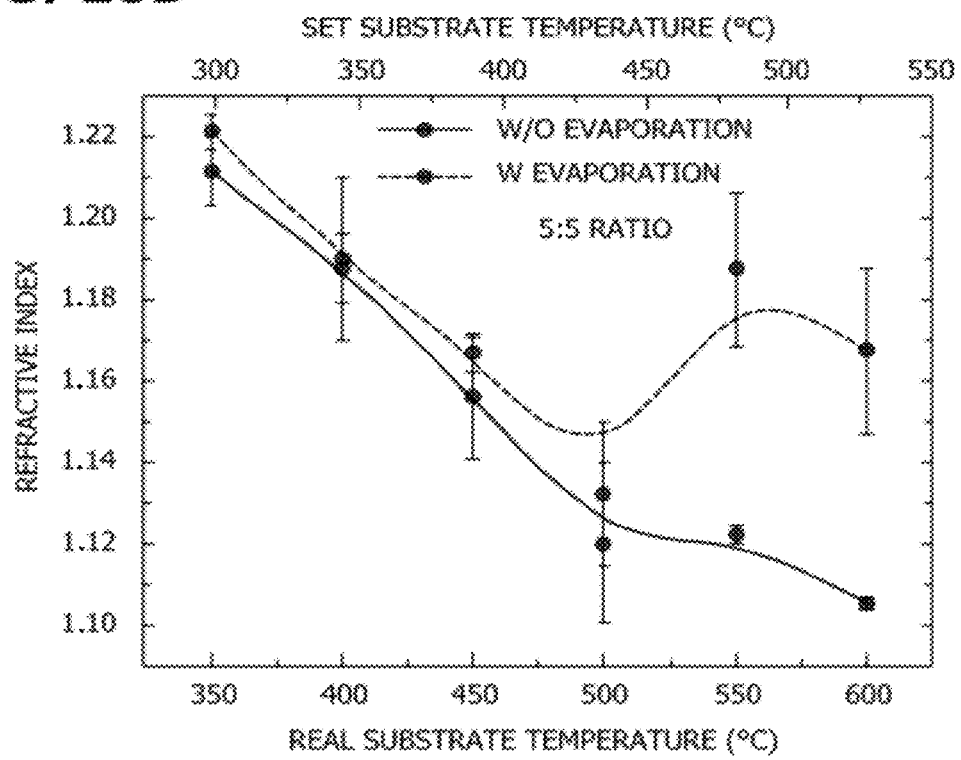
Figure 28E:
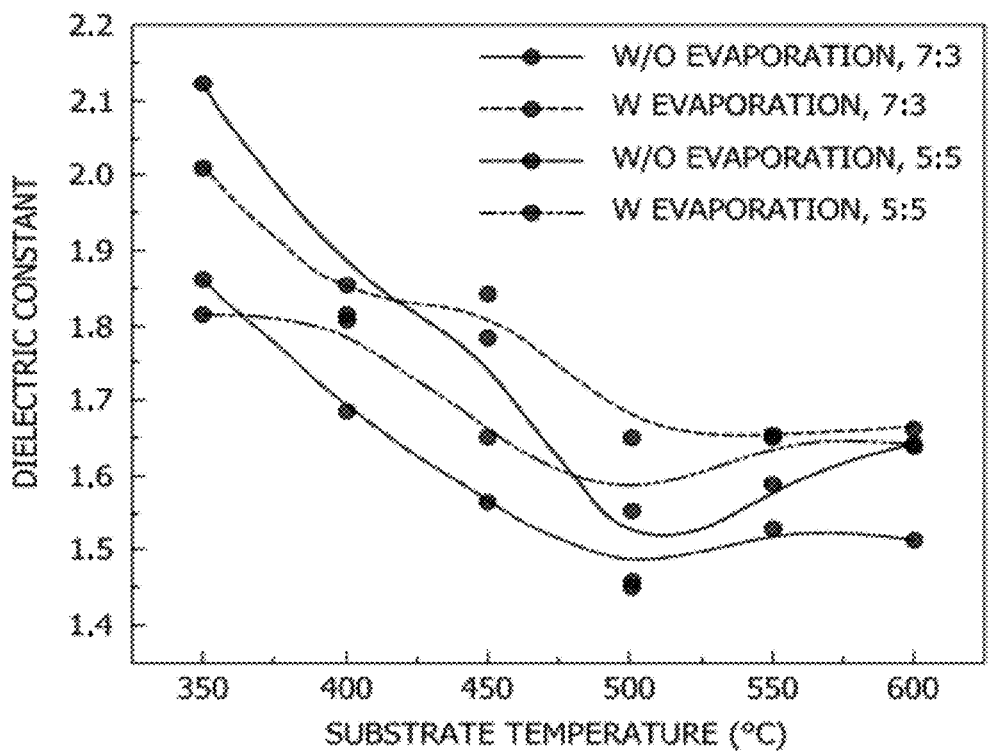

Dielectric constant and refractive index measurements were performed on these films at different processing (calcination) temperatures. It was observed that the temperature of calcinations played an important role in determining the dielectric constant (and refractive index) of the final films. Two types of PMSSQ precursors were used (2% OH content PMSSQ from Gelest, Inc, and 14% OH content PMSSQ from Techneglas). Solutions of PMSSQ and PPG in PGMEA were prepared in different ratios: PPG:PGMEA ratios of 3:7 and 5:5 were used, PMSSQ:PGMEA ratios of 3:7 and 5:5 were used. Solutions designated 7:3 are the ones obtained by mixing 3:7 PPG:PGMEA solution with 3:7 PMSSQ:PGMEA solution in 1:1 ratio. Similarly the solutions designated 5:5 are the ones obtained by mixing 5:5 PPG:PGMEA with 5:5 PMSSQ:PGMEA solutions. Furthermore, these solutions were either subjected to an evaporation step (films produced thereof designated as w/ evaporation, see details of the NPO precursor solution preparation in previous sections) or no evaporation prior to film deposition. It was observed that regardless of evaporation or dilutions, nanoparticle formation was evident in all the cases. FIGS. 25 and 26 are SEM micrographs of the resulting nanoparticulate (NPO) films from the 14% OH precursor. FIGS. 25 A, C, and E were obtained from the 5:5 solutions with evaporation; Figures B, D, and F without evaporation. FIG. 26A was obtained from the 7:3 solution with evaporation; FIG. 26B without evaporation.

FIGS. 27 and 28 give the thickness, refractive index and dielectric constant of the obtained films from the 2% OH precursor (FIG. 27) and the 14% OH precursor (FIG. 28) processed in different ways as a function of annealing temperature. FIG. 27A is the thickness of the 7:3 films (2% OH). FIG. 27B is the refractive index of the 7:3 films (2% OH). FIG. 27C is the thickness of the 5:5 films (2% OH). FIG. 27D is the refractive index of the 5:5 films (2% OH). FIG. 27E is the dielectric constant of the films (2% OH) as a function of processing temperature. FIG. 28A is the thickness of the 7:3 films (14% OH). FIG. 28B is the refractive index of the 7:3 films (14% OH). FIG. 28C is the thickness of the 5:5 films (14% OH). FIG. 28D is the refractive index of the 5:5 films (14% OH). FIG. 28E is the dielectric constant of the films (14% OH) as a function of processing temperature.

Example 13

Figure 29A:
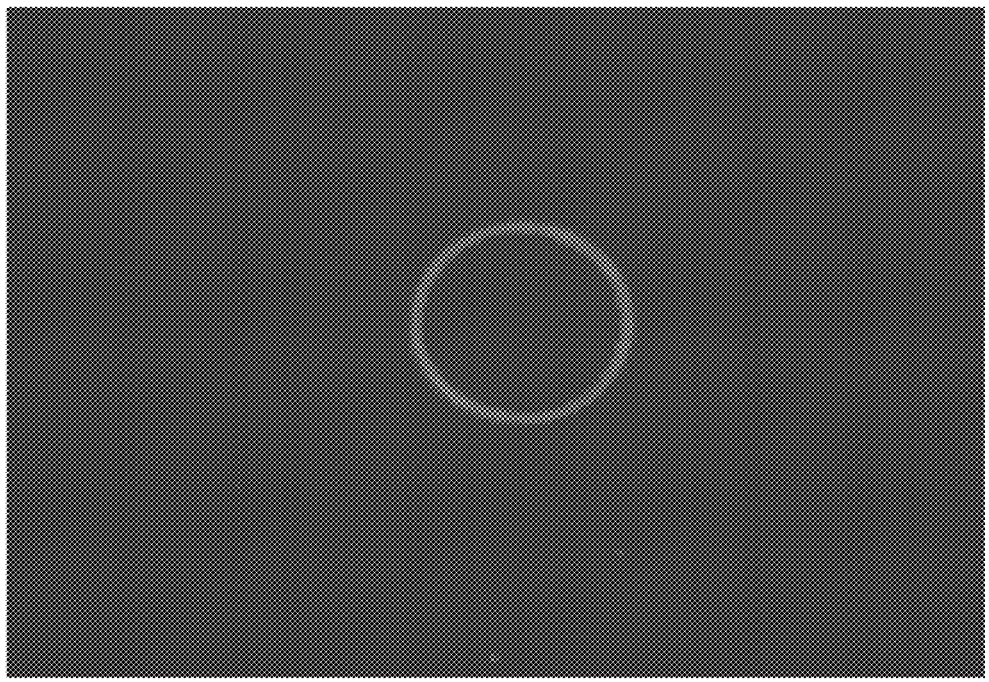
FIGS. 29A and 29B are photographs of circularly patterned photon-emitting films of Example 13.
Figure 29B:
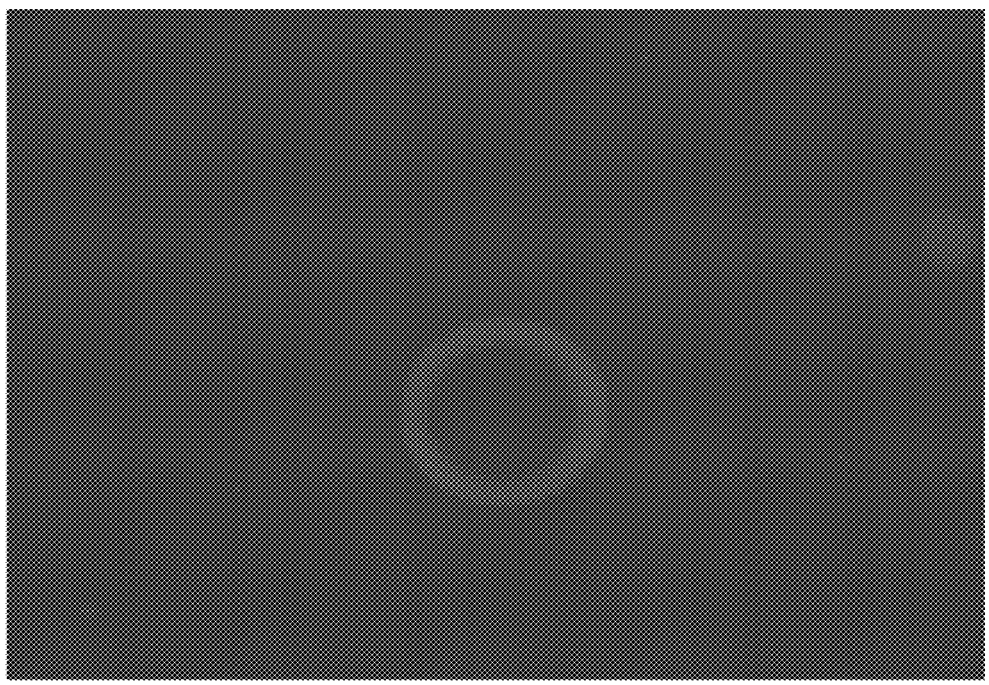

A thin film laser without using an external cavity or constructing a periodic spatial structure is of great interest for its potential application to integrated photonic devices. Dye-incorporated porous thin films as prepared in accordance with Example 8 were prepared to contain rhodamine 6G incorporated into organosilicate nanoparticles. Although the film is porous, the refractive index (RI) of the film (RI=1.3) is still higher than air acting as a wave guide. The film is then excited with a laser, and each of the dye-incorporated particles in the film emits photons which are guided by interconnected particles. While the photons are guided by the film, more photons are generated due to continuous excitation resulting in lasing effect. The circularly patterned film is excited at different wavelengths and emits photons at the edge as shown in FIGS. 29A and 29B. Due to waveguiding effect, no photon is observed at the center region of the circles.

Example 14

Figure 30:
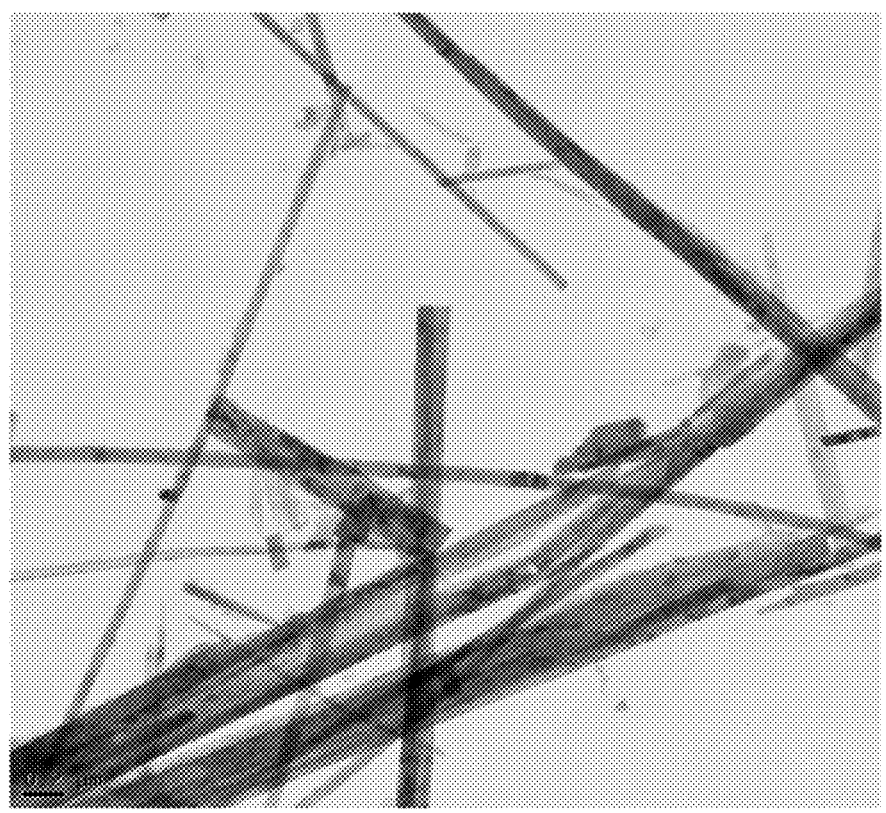
FIG. 30 is TEM image of nanorods prepared in accordance with Example 14.

The formation of nanorods is described and demonstrated above. A PMSSQ solution with five-day old dye incorporated therein was spin coated and annealed at 240° C. for 30 seconds. The solution was prepared as explained in Example 8 with PMSSQ containing 2% OH. Other procedures such as scraping were also performed as in Example 8. The rods are longer than 2 microns with diameters of about 50 nm as shown in FIG. 30 (scale bar=0.2 micron).

Example 15

NPO Films as High Surface Area Substrates for Chemical-Biological Assays

As described above, the high surface area associated with the nanoporous films of the invention can be utilized for chemical-biological assays for increased density of binding to enhance sensitivity. By this example, nanoporous films were prepared with 50% PPG loading, calcinated at 550° C. to give films with refractive indices 1.13-1.15 and about 220 nm thickness. The films were exposed to a low power $CO_2$ plasma (4 W, 1 min) to obtain —COOH functionality on the particle surfaces. As a control, flat (non-porous) PMMSQ films were prepared by spin coating PMSSQ solution dispersed in PMA solvent followed by heat treatment at 550° C. for 5 minutes. $CO_2$ plasma treatment was performed on these films similar to NPO films and Protein A-FITC conjugate was immobilized, following published protocol, on these substrates.

Figure 31:
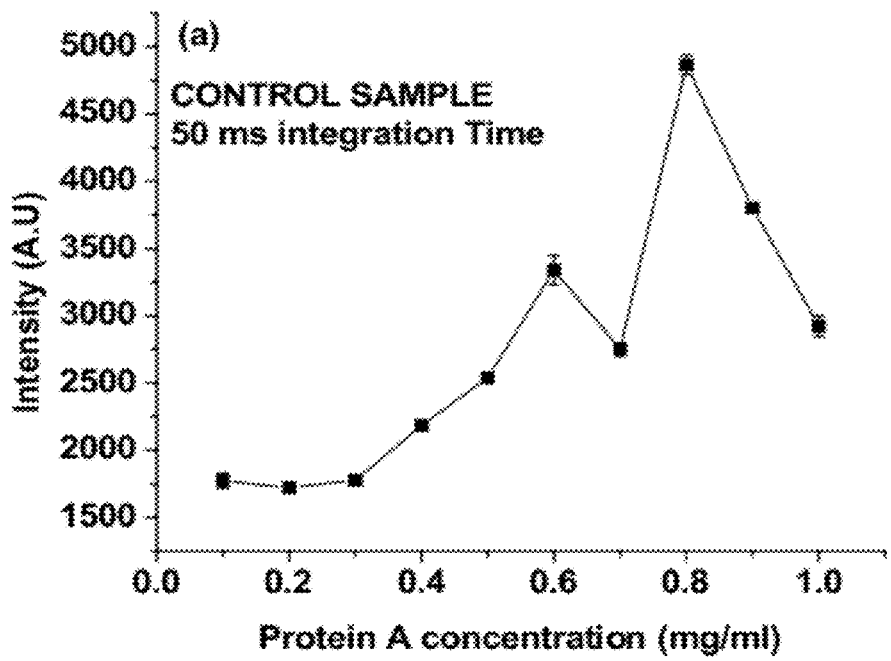
FIGS. 31 and 32 are fluorescence intensity plots of Example 15.
Figure 32:
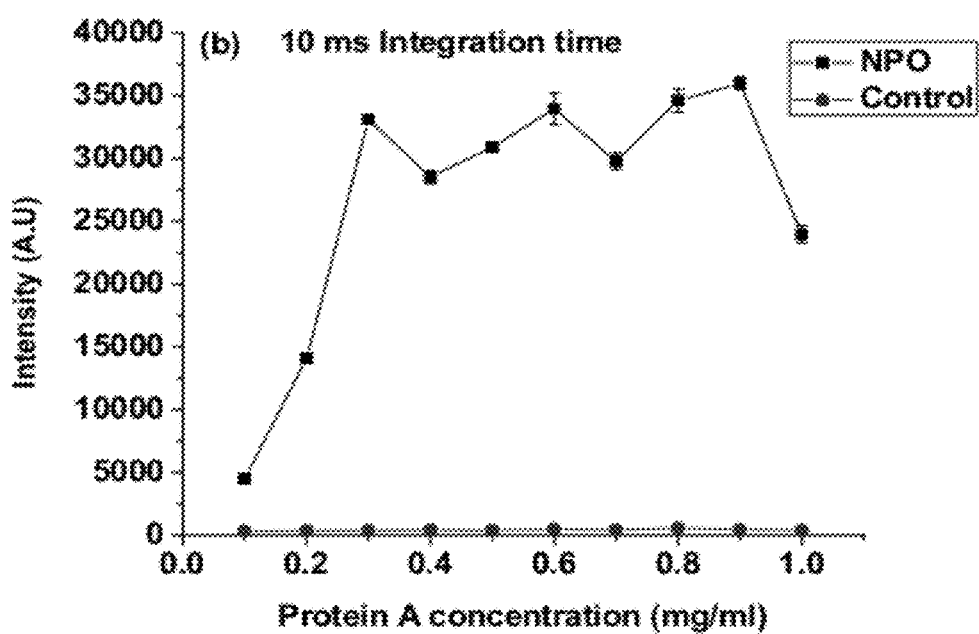

Protein A-FITC binding on the NPO surfaces and controls was evaluated at different concentrations of Protein A (from 0.1 mg/ml to 1 mg/ml). FIGS. 31 and 32 show the plot of the fluorescence intensity from the protein A-FITC immobilized NPO and control substrates with 1 minute $CO_2$ plasma exposure time. It can be concluded that the optimum concentration of Protein A to yield the highest fluorescence intensity is about 0.3 mg/ml. Also, compared to the control samples, a roughly two orders of magnitude increase in the fluorescence signal was achieved due to the high surface area of the nanoporous films of the invention.

For the foregoing studies, low $CO_2$ plasma was used to modify the NPO surfaces to obtain —COOH groups. For initial tests, fluorescently tagged Protein A-FITC (Fluorescein Isothiocynate) conjugate was used for immobilization in these studies. Protein A is a 40-60 kD surface protein originally found in the cell wall of the bacteria *Staphylococcus aureus*. It has been extensively used in biochemical research because of its ability to bind immunoglobulins (i.e., antibodies). NPO films prepared with 50% PPG loading were used for all the tests. Non porous PMSSQ films, prepared by dissolving PMSSQ in PMA followed by spin coating and high temperature curing (500 C), were used as controls for the tests. Protein A-FITC immobilization was performed following published protocol from Pierce Biotechnology.

A two-step coupling protocol using 1-ethyl-3-(3-dimethylaminopropyl) carbodiimide hydrochloride (EDS) and Sulfo-NHS protocol was employed. EDC (2 mM) and 1.1 mg of sulfo-NHS were mixed in 1 ml activation buffer (0.1 M Mes, 0.5 M NaCL, pH 6.0). The samples were covered with this solution and allowed to react for 15 minutes at room temperature. Then EDS was quenched by adding 1.4 microL of 2-mercaptoethanol (Sigma, Aldrich) for 5 minutes at room temperature. Then the substrates were washed 3 times with PBS followed by a wash with the activation buffer. Protein A-FITC (Sigma Aldrich) was diluted to different concentrations in PBS (pH 8.5), and the substrates were immersed in this solution for at least 2 hours at room temperature or overnight at 4° C. Finally the reaction was quenched by adding hydroxylamine HCl (Pierce Biotechnology) to a final concentration of 10 nM for 5 minutes at room temperature. The excess quenching reagent was removed and the samples were washed 3 times with PBS. Measurements and storage were made in PBS+4% BSA (Sigma Aldrich) to remove any unbound protein A.

The intensity of fluorescence from the Protein A-FITC immobilized surfaces was evaluated by using an Olympus BX51WI microscope with a 150 Hg lamp and a FITC-3540B filter set "zero pixel shift" (Exciter 482+/−17 nm, Emitter 536+/−20 nm Dichroic 446-500 center wavelength with a bandwith of 513-725 nm—Semrock, Rochester, N.Y.). The samples were observed and focused using a water immersion lens LumPlanFI/IR 40x/0.80w Olympus America, Melville, N.Y.), which produces a 0.026 W/cm2 light intensity on the surface of the sample.

The fluorescence produced by the dye in the antibodies was routed to a fiber optic fiber (50 micron) coupled to a spectrometer USB-4000, under the control of the Spectra Suite software (Ocean Optics, Dunedin, Fla.) running in a homemade PC computer. Spectra were taken from 8-10 different regions of each sample and stored in the computer for further analysis using Origin 8.0 (Origin, Northampton, Mass.).

Example 16

NPO—Au Nanoparticulate Films as Surface Enhanced Raman (SERS) Active Substrates for Detection of Explosives NPO films were deposited on silicon substrates following the process described above. These substrates were loaded into a sputter chamber for gold nanoparticle deposition. The percentage PPG content in the precursor solution determines the final porosity (and the refractive index) of the NPO films, while the Au sputter deposition time determines the density of gold nanoparticles on the substrates. Raman scattering studies of Rhodamine 590 fluorescent dye was performed on these substrates. Rhodamine dye solutions with different concentrations were prepared and deposited on these substrates followed by solvent evaporation. NPO films with 70% PPG loadings with gold nanoparticle deposition times of 2 minutes gave the best signal enhancement. In addition to this, it was observed that heating the NPO substrates following gold nanoparticle deposition rearranges the distribution of the gold nanoparticles on the substrates. This was evident from the UV-Vis spectra obtained for the NPO—Au film before and after heat treatment (450 C for 60 seconds) in the reflectance mode. That is, slight peak shift along with peak narrowing could be observed for the after heat-treated sample. An obvious color change in the substrates could be observed following the heat treatment step. Table 2 summarizes the peak signal intensity values obtained for the Rhodamine 6G concentration of $10^{-6}$ M concentration on different substrates. Discernable peaks were observed for Rhodamine concentration as low as $10^{-9}$ M concentration.

TABLE 2

The peak comparison table for different depositing time of Au and different condition of samples

|  | With CO2 treatment | | Without CO2 treatment | | | |
| --- | --- | --- | --- | --- | --- | --- |
|  | NPO - w/o heat treatment | NPO - w heat treatment | NPO - w/o heat treatment | NPO - w heat treatment | Si - w/o heat treatment | Si - w heat treatment |
| Au(45 sec) | 26146 | 4836 | 14279 | 5882 | 1471 | 601 |
| Au(2 min) | 23140 | 2694 | 36146 | 29226 | 2665 | 12659 |
| Au(7.5 min) | 17950 | 36175 | 11393 | 28481 | 2258 | 0 |
| Flat Au | 10059 | / | 4051 | / | 2147 | / |

A Raman scattering plot was generated for a) rhodamine deposited on a flat gold film on silicon, b) gold nanoparticles deposited on silicon, and c) gold nanoparticles deposited on NPO films under similar conditions. A three-fold enhancement could be observed in the case of Rhodamine deposited on NPO—Au nanoparticle substrate compared that of Au nanoparticles on flat silicon. It appears that having a stack of multiple layers of NPO—Au films on the substrate would greatly improve the signal sensitivity. Accordingly, novel SERS substrates were been fabricated combining the top-down technology (sputtered Au nanoparticle films) and bottom-up technology (NPO films) of the invention. A three-fold enhancement in the SERS signal was observed in the case of rhodamine dye deposited on NPO—Au nanoparticle substrates compared to Au-nanoparticles on flat silicon substrates.

Example 17

A thin film (~14 nm thick) of PMSSQ was deposited on silicon substrates by spin coating a 1 wt % PMSSQ solution in PGMEA at 3000 rpm for 30 seconds followed by a curing step of 450 C for two minutes. The films were then exposed to low power carbon dioxide plasma using a customized capacitively-coupled plasma enhanced chemical vapor deposition (PECVD) device. The following conditions were used for the plasma treatment: Base pressure, 20 mTorr; Working pressure, 550 mTorr; $CO_2$ flow rate, 50 sccm; Power: 6 W; and treatment time, 4 minutes. The exposed substrate was then spun coated with a thin layer of photoresist (S18183) and selectively exposing regions of the film to UV light through a photomask. The exposed film was then developed using a photoresist developer (MF 321) to achieve patterned regions of photoresist film on the plasma-exposed PMSSQ layer. The patterned substrate was then dipped into a dilute hydrofluoric acid (HF) solution (1:10 HF:DI water) which rapidly etched the unprotected regions of the PMSSQ film. The areas covered by the photoresist were protected from etching. A typical etch was completed within 30 seconds, as evidenced by the displacement of the aqueous etchant solution from the etched regions due to increased hydrophobicity of the resultant Si—H terminated surfaces.

A nanoporous organosilicate precursor solution was prepared separately. Commercially available PMSSQ (GR650F, Tehneglas, Inc.) was used for the preparation of PMMSQ nanoparticles. Propylene glycol methyl ether acetate (PGMEA 98%, Sigma-Aldrich) and Polypropylene Glycol (PPG, average molecular weight (Mw) 425, Sigma-Aldrich) were used as received. Briefly, 3:7 wt % compositions of PMSSQ and PPG with respect to PGMEA were prepared separately and sonicated to ensure complete dissolution of the respective solutes. These solutions, the 3:7 PMSSQ:PGMEA and 3:7 PPG:PGMEA solutions, were mixed together in a 1:1 wt % composition and sonicated to achieve a homogenous solution with a final PMSSQ:PPG:PGMEA wt % composition of 3:3:14, respectively.

This PMSSQ nanoparticle nanoporous organosilicate precursor solution was then deposited subsequently on the surface energy-patterned substrate surfaces followed by high-temperature curing/calcination to form spontaneous micropatterns of porous regions. Film deposition was performed by spin coating at 3000 rpm for 30 seconds followed by immediate subjection to high temperature by placing the substrates on a pre-heated hotplate. Temperatures of 250 C, 350 C, 450 C and 550 C were used in this study. All films were cured for 5 minutes, after which they were removed from the hotplate and allowed to cool to room temperature.

Patterning of porous films is important for multiplexing (in biosensors/diagnostic assays), wherein the high surface area provides for increased sensitivities of detection. Patterning also provides better contrast, especially in sensing applications. Accordingly, the patterned films were subjected to bioconjugation of Protein A Fluorescein Isothiocyanate (Protein A-FITC) (from Sigma-Aldrich, St. Louis, Mo.). Buffers used were 2-(N-morpholino)ethanesulfonic acid (MES, Sigma-Aldrich) and Dulbecco's Phosphate Buffered Saline (PBS, Sigma-Aldrich). EDC (1-Ethyl-3-[3-dimethylaminopropyl] carbodiimide hydrochloride) and Sulfo-NHS (N-hydroxysulfosuccinimide) (from Pierce Biotechnology) were used for the conjugation of Protein A-FITC to NPO surfaces. Immediately prior to bioconjugation, the patterned films were subjected to a mild $CO_2$ plasma treatment to functionalize the surfaces with Carboxyl groups. The following conditions were used for the plasma treatment: Base pressure, 20 mTorr; Working pressure, 550 mTorr; CO2 flow rate, 50 sccm; Power: 6 W; and treatment time, 4 minutes.

Figure 34:
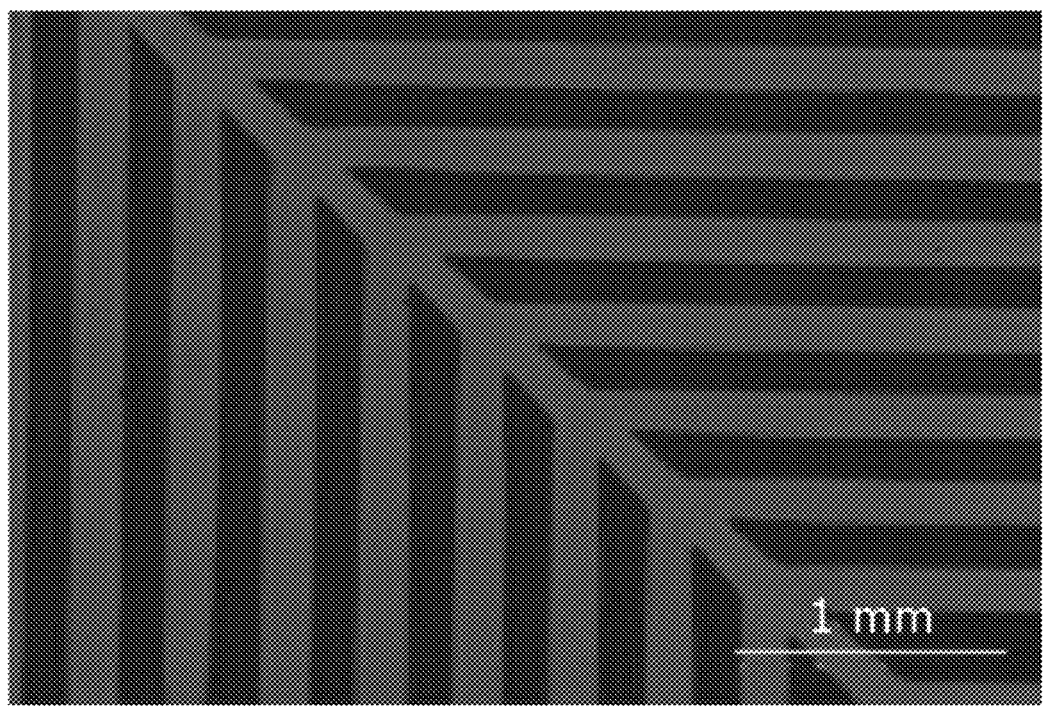
FIG. 34 is an image of patterned substrate prepared in Example 17.

A two-step coupling protocol with EDC and Sulfo-NHS was used to convert carboxyl-functionalized films into amine-reactive surfaces (published online by Pierce Biotechnology). When used in conjunction with Sulfo-NHS, EDC forms a semi-stable amine-reactive NHS ester that forms a stable amide bond upon interaction with primary amines present on the protein surface, linking the proteins covalently to the NPO surface. Briefly, for every 1 ml of activation buffer (0.1 M MES, 0.5 M NaCl, pH 6.0), 0.4 mg EDC and 1.1 mg of Sulfo-NHS were added. The films were then covered with this solution for 15 minutes at room temperature. Following this incubation, the films were subsequently washed with PBS buffer. Protein A-FITC was diluted to a final concentration of 10 µg/ml in PBS buffer (pH 7.1) and enough protein solution was added to cover the entire film surface (~2 ml) and incubated for at least 2 hours at room temperature (RT, 22 C)

and stored overnight at 4 C. Following the incubation period, loosely bound protein molecules were removed by washing the substrates 3× with fresh PBS (pH 7.1). The bioconjugated substrates were stored in PBS prior to fluorescence imaging. Imaging was performed using an Olympus BX51W1 fluorescence microscope with a 150 W Hg lamp and a FITC-3540B filter set to "zero pixel shift" (Exciter 482+/−17 nm, Emitter 536+/−20 nm, Dichroic 446-500 nm center wavelength with a bandwith of 513-725 nm, Semrock, Rochester, N.Y.). The samples were observed and imaged using a 4× objective lens (Olympus), as shown in FIG. 34.

In view of the above, it will be seen that the several objects of the invention are achieved and other advantageous results attained.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above compositions and methods without departing from the scope of the invention, it is intended that all matter contained in the above description and shown in the accompanying drawings shall be interpreted as illustrative and not in a limiting sense.

What is claimed is:

1. A method for forming a nanoporous film pattern on a substrate comprising:
   depositing a PMSSQ polymer film on a surface of a substrate;
   imparting differential surface energy to the film surface of the substrate to define first areas having a first surface energy conducive to maintenance of a nanoporous film thereon and second areas having a second surface energy non-conducive to maintenance of a nanoporous film thereon, said first and second areas defining a differential surface energy pattern on the substrate;
   depositing a nanoporous film precursor onto the differential surface energy pattern and forming a nanoporous precursor film over the differential surface energy pattern comprising the first areas having the first surface energy and the second areas having the second surface energy; and
   curing the nanoporous film precursor to form the nanoporous film pattern.

2. The method of claim 1 wherein the imparting differential surface energy comprises:
   imparting to the first areas and the second areas one of either a) the second surface energy non-conducive to nanoporous film maintenance or b) the first surface energy conducive to nanoporous film maintenance; and
   treating the first areas to impart thereto the first surface energy conducive to nanoporous film maintenance in the event of (a), or treating the second areas to impart thereto the second surface energy non-conducive to nanoporous film maintenance in the event of (b).

3. The method of claim 1 wherein the imparting differential surface energy comprises:
   selective deposition of the PMSSQ polymer film to define the pattern;
   wherein one of either the pattern material or the substrate surface having the PMSSQ film thereon has the first surface energy conducive to nanoporous film maintenance and the other has the second surface energy non-conducive to nanoporous film maintenance.

4. The method of claim 1 wherein:
   i) the imparting differential surface energy comprises:
   imparting to the first areas and the second areas the second surface energy non-conducive to nanoporous film maintenance; and
   treating the first areas to impart thereto the first surface energy conducive to nanoporous film maintenance;
   ii) followed by said depositing and said curing steps.

5. The method of claim 1
   further comprising applying a photoresist material over the substrate surface having the PMSSQ film thereon prior to imparting the differential surface energy thereto;
   selectively exposing and developing the photoresist material to form patterned areas of photoresist film on the second areas and exposed polymer film on the first areas;
   etching to remove the exposed polymer film from the first areas and to perform said imparting to the first areas the first surface energy conducive to nanoporous film maintenance;
   removing the photoresist material from the second areas to expose said second areas having the second surface energy;
   followed by said depositing the nanoporous film precursor and said curing steps.

6. The method of claim 1 wherein the nanoporous film precursor is a solution comprising a nanoparticle precursor in a mixed solvent system comprising a first solvent and a second solvent, wherein the first solvent is different from the second solvent, wherein the second solvent has a boiling point which is greater than a boiling point of the first solvent, and wherein the nanoparticle precursor has a greater solubility in the first solvent than in the second solvent.

7. The method of claim 1 comprising:
   depositing a thin film in a mold reflecting the film pattern, wherein the thin film has a surface energy different from a surface energy of the substrate having the PMSSQ film thereon;
   transferring the thin film to the substrate having the PMSSQ film thereon, thereby imparting the differential surface energy to the surface of the substrate to define the first areas having the first surface energy conducive to maintenance of the nanoporous film thereon and the second areas having the second surface energy non-conducive to maintenance of the nanoporous film thereon, said first and second areas defining the differential surface energy pattern on the substrate;
   followed by said depositing the nanoporous film precursor and said curing.

8. The method of claim 1 wherein said curing comprises calcination at a temperature of at least about 200° C.

9. The method of claim 1 wherein said curing comprises calcination at a temperature of at least about 300° C.

10. The method of claim 1 wherein the nanoporous film precursor is a nanoporous organosilicate film precursor and the nanoporous film pattern is a nanoporous organosilicate film pattern.

11. The method of claim 3 wherein:
    the PMSSQ polymer film has said first surface energy conducive to nanoporous film maintenance; and
    wherein substrate surface not covered by the PMSSQ polymer film has said second surface energy non-conducive to nanoporous film maintenance.

12. The method of claim 3 wherein:
    the PMSSQ polymer film has said second surface energy non-conducive to nanoporous film maintenance; and wherein substrate surface not covered by the PMSSQ polymer film has said first surface energy conducive to nanoporous film maintenance.

13. The method of claim 7 wherein the mold is constructed from PDMS (polydimethylsiloxane).

14. The method of claim 7 wherein the thin film has the first surface energy conducive to maintenance of the nanoporous film, and substrate surface not covered by the thin film has the second surface energy not conducive to the maintenance of the nanoporous film.

15. The method of claim 7 wherein the thin film has the second surface energy non-conducive to maintenance of the nanoporous film, and substrate surface not covered by the thin film has the first surface energy conducive to the maintenance of the nanoporous film.

16. A method for forming a nanoporous film pattern on a substrate comprising:
   imparting differential surface energy to a surface of a substrate to define:
      (i) first areas having a first surface energy conducive to maintenance of a nanoporous film thereon; and
      (ii) second areas having a second surface energy non-conducive to maintenance of a nanoporous film thereon;
   said first and second areas defining a differential surface energy pattern on the substrate;
   depositing a nanoporous film precursor onto the differential surface energy pattern and forming a nanoporous precursor film over the differential surface energy pattern comprising the first areas and the second areas; and
   curing the nanoporous film precursor to form the nanoporous film pattern;
   wherein the step of imparting differential surface energy to the surface of the substrate comprises:
   depositing polymer film on the substrate encompassing the first and second areas on the substrate surface to impart the second surface energy thereto;
   applying a photoresist material over the polymer film;
   selectively exposing and developing the photoresist material to form patterned areas of photoresist film on the second areas and exposed polymer film on the first areas;
   etching to remove the exposed polymer film from the first areas, thereby revealing the substrate surface, and imparting the first surface energy thereto; and
   removing the photoresist material from the second areas, thereby revealing the polymer film surface with the second surface energy imparted thereto;
   wherein the polymer film is PMSSQ.

17. The method of claim 16, wherein the nanoporous film precursor comprises PMSSQ.

18. The method of claim 16
   wherein the nanoporous film precursor is a solution comprising a nanoparticle precursor in a mixed solvent system comprising a first solvent and a second solvent, wherein the first solvent is different from the second solvent, wherein the second solvent has a boiling point which is greater than a boiling point of the first solvent, and wherein the nanoparticle precursor has a greater solubility in the first solvent than in the second solvent.

19. The method of claim 16 wherein the substrate is a silicon wafer.

20. A method for forming a nanoporous film pattern on a substrate comprising:
   imparting differential surface energy to a surface of a substrate to define first areas having a first surface energy conducive to maintenance of a nanoporous film thereon and second areas having a second surface energy non-conducive to maintenance of a nanoporous film thereon, said first and second areas defining a differential surface energy pattern on the substrate;
   depositing a nanoporous film precursor onto the differential surface energy pattern and forming a nanoporous precursor film over the differential surface energy pattern comprising the first areas having the first surface energy and the second areas having the second surface energy; and
   curing the nanoporous film precursor to form the nanoporous film pattern;
   wherein said imparting comprises depositing a PMSSQ polymer film encompassing the first and second areas on the substrate surface, followed by treatment with a plasma to impart to the first areas and the second areas the second surface energy non-conducive to nanoporous film maintenance, wherein said second surface energy is greater than about 50 $mJ/cm^2$;
   applying a photoresist material over the substrate surface;
   selectively exposing and developing the photoresist material to form patterned areas of photoresist film on the second areas and exposed PMSSQ polymer film on the first areas;
   etching with an etchant containing HF acid to remove the exposed polymer film from the first areas and to perform said imparting to the first areas the first surface energy conducive to nanoporous film maintenance, wherein the first energy is in the range of about 28 to about 50 $mJ/cm^2$;
   removing the photoresist material from the second areas with a solvent to expose said second areas having the second surface energy greater than about 50 $mJ/cm^2$;
   followed by said depositing the nanoporous film precursor onto the differential surface energy pattern, wherein the nanoporous film precursor is a solution comprising a nanoparticle precursor in a mixed solvent system comprising a first solvent and a second solvent, wherein PMSSQ is the nanoparticle precursor, PGMEA is the first solvent and PPG is the second solvent; and
   said curing the nanoporous film precursor to form the nanoporous film pattern, wherein the nanoporous film is on the first areas and is not on the second areas.

21. A method for forming a nanoporous film pattern on a substrate comprising:
   depositing a thin film in a mold reflecting the film pattern, wherein the thin film has a surface energy different from a surface energy of the substrate;
   transferring the thin film to the substrate, thereby imparting differential surface energy to the surface of the substrate to define first areas having a first surface energy conducive to maintenance of a nanoporous film thereon and second areas having a second surface energy non-conducive to maintenance of a nanoporous film thereon, said first and second areas defining the differential surface energy pattern on the substrate;
   depositing a nanoporous film precursor onto the differential surface energy pattern; and
   curing the nanoporous film precursor to form the nanoporous film pattern;
   wherein the thin film comprises PMSSQ.

* * * * *